United States Patent
Fini et al.

(10) Patent No.: US 11,822,119 B2
(45) Date of Patent: Nov. 21, 2023

(54) TERAPHY CHIPLET OPTICAL INPUT/OUTPUT SYSTEM

(71) Applicant: Ayar Labs, Inc., Santa Clara, CA (US)

(72) Inventors: John Fini, Oakland, CA (US); Vladimir Stojanovic, Berkeley, CA (US); Chen Sun, Berkeley, CA (US); Derek van Orden, San Francisco, CA (US); Mark Taylor Wade, Berkeley, CA (US)

(73) Assignee: Ayar Labs, Inc., Santa Clara, CA (US)

( * ) Notice: Subject to any disclaimer, the term of this patent is extended or adjusted under 35 U.S.C. 154(b) by 0 days.

(21) Appl. No.: 18/168,555

(22) Filed: Feb. 13, 2023

(65) Prior Publication Data
US 2023/0194782 A1   Jun. 22, 2023

Related U.S. Application Data

(63) Continuation of application No. 17/184,537, filed on Feb. 24, 2021, now Pat. No. 11,579,361.

(60) Provisional application No. 62/981,726, filed on Feb. 26, 2020.

(51) Int. Cl.
| | |
|---|---|
| *G02B 6/12* | (2006.01) |
| *G02B 6/293* | (2006.01) |
| *G02B 6/125* | (2006.01) |
| *G02B 6/43* | (2006.01) |
| *H04B 10/25* | (2013.01) |

(52) U.S. Cl.
CPC ......... *G02B 6/12019* (2013.01); *G02B 6/125* (2013.01); *G02B 6/12016* (2013.01); *G02B 6/29335* (2013.01); *G02B 6/43* (2013.01); *G02B 2006/12107* (2013.01); *G02F 2203/15* (2013.01); *H04B 10/25* (2013.01)

(58) Field of Classification Search
None
See application file for complete search history.

(56) References Cited

U.S. PATENT DOCUMENTS

| | | | |
|---|---|---|---|
| 2014/0193155 A1* | 7/2014 | Popovic | H04J 14/02 29/428 |
| 2018/0217344 A1* | 8/2018 | Fini | G02B 6/4243 |
| 2019/0317288 A1* | 10/2019 | Fini | G02B 6/4249 |
| 2020/0021899 A1* | 1/2020 | Stojanovic | H04Q 11/0071 |

* cited by examiner

Primary Examiner — Jerry Rahll
(74) Attorney, Agent, or Firm — Penilla IP, APC

(57) ABSTRACT

An electro-optical chip includes an optical input port, an optical output port, and an optical waveguide having a first end optically connected to the optical input port and a second end optically connected to the optical output port. The optical waveguide includes one or more segments. Different segments of the optical waveguide extends in either a horizontal direction, a vertical direction, a direction between horizontal and vertical, or a curved direction. The electro-optical chip also includes a plurality of optical microring resonators is positioned along at least one segment of the optical waveguide. Each microring resonator of the plurality of optical microring resonators is optically coupled to a different location along the optical waveguide. The electro-optical chip also includes electronic circuitry for controlling a resonant wavelength of each microring resonator of the plurality of optical microring resonators.

20 Claims, 20 Drawing Sheets

TERAPHY CHIPLET OPTICAL INPUT/OUTPUT SYSTEM

CROSS-REFERENCE TO RELATED APPLICATIONS

This application is a continuation application under 35 U.S.C. 120 of prior U.S. application Ser. No. 17/184,537, filed Feb. 24, 2021, issued as U.S. Pat. No. 11,579,361, on Feb. 14, 2023, which claims priority under 35 U.S.C. 119(e) to U.S. Provisional Patent Application No. 62/981,726, filed on Feb. 26, 2020. The disclosure of each above-identified application is incorporated herein by reference in its entirety for all purposes.

BACKGROUND OF THE INVENTION

To date, optical communications have targeted pluggable and discrete form factors. Some of the form factors of the optical modules are standardized, such as the QSFP28 or QSFP-DD form factors, and are far too large to achieve the density needed for chip input/output (I/O). Although recent attempts to bring optics closer to the connected host ASIC (application-specific integrated circuit), such as the on-board form factors explored by COBO (Consortium for On-Board Optics), have motivated tighter form factors, the types of optical devices and integration methods used in contemporary optical transceivers are not suitable for chip I/O, both from a size and power perspective. It is within this context that the present invention arises.

SUMMARY OF THE INVENTION

In an example embodiment, an electro-optical chip is disclosed. The electro-optical chip includes an optical input port located on a first side of the electro-optical chip. The electro-optical chip also includes an optical output port located on the first side of the electro-optical chip. The electro-optical chip also includes an optical waveguide that has a first end optically connected to the optical input port. The optical waveguide also has a second end optically connected to the optical output port. The optical waveguide includes a first segment extending in a first direction. The optical waveguide also includes a second segment that extends from the first segment and that turns from the first direction to a second direction that is substantially opposite of the first direction. The optical waveguide also includes a third segment that extends from the second segment in the second direction. The first, second, and third segments collectively form a substantially U-shaped portion of the optical waveguide. The electro-optical chip also includes a plurality of optical microring resonators positioned along the first segment of the optical waveguide. Each microring resonator of the plurality of optical microring resonators is optically coupled to a different location along the first segment of the optical waveguide. The electro-optical chip also includes electronic circuitry for controlling a resonant wavelength of each microring resonator of the plurality of optical microring resonators.

In an example embodiment, an electro-optical chip is disclosed. The electro-optical chip includes an optical input port located on a first side of the electro-optical chip. The electro-optical chip also includes an optical output port located on the first side of the electro-optical chip. The electro-optical chip also includes an optical waveguide that has a first end optically connected to the optical input port. The optical waveguide also has a second end optically connected to the optical output port. The optical waveguide includes a first segment extending in a first direction. The optical waveguide also includes a second segment that extends from the first segment and that turns from the first direction to a second direction that is substantially perpendicular to the first direction. The optical waveguide also includes a third segment that extends from the second segment in the second direction. The optical waveguide also includes a fourth segment that extends from the third segment and that turns from the second direction to a third direction that is substantially opposite of the first direction. The optical waveguide also includes a fifth segment that extends from the fourth segment in the third direction. The first, second, third, fourth, and fifth segments collectively form a substantially C-shaped portion of the optical waveguide. The electro-optical chip also includes a plurality of optical microring resonators positioned along the third segment of the optical waveguide. Each microring resonator of the plurality of optical microring resonators is optically coupled to a different location along the third segment of the optical waveguide. The electro-optical chip also includes electronic circuitry for controlling a resonant wavelength of each microring resonator of the plurality of optical microring resonators.

In an example embodiment, an electro-optical chip is disclosed. The electro-optical chip includes an optical input port located on a first side of the electro-optical chip. The electro-optical chip also includes an optical output port located on a second side of the electro-optical chip. The electro-optical chip also includes an optical waveguide that has a first end optically connected to the optical input port. The optical waveguide also has a second end optically connected to the optical output port. The electro-optical chip also includes a plurality of optical microring resonators positioned along the optical waveguide. Each microring resonator of the plurality of optical microring resonators is optically coupled to a different location along the optical waveguide. The electro-optical chip also includes electronic circuitry formed alongside the plurality of optical microring resonators for controlling a resonant wavelength of each microring resonator of the plurality of optical microring resonators.

Other aspects and advantages of the invention will become more apparent from the following detailed description, taken in conjunction with the accompanying drawings, illustrating by way of example the present invention.

DETAILED DESCRIPTION OF THE INVENTION

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

Monolithic integration of electronics and optics, including implementation of microring-based optical devices, enables much tighter integration of optical components and devices with integrated circuit chips at a far lower power requirement. The combination of integrated circuit technology and photonics technology enables in-package optical I/O with different floorplans and provides a roadmap for addressing the chip I/O challenge. Embodiments are disclosed herein for various layouts, organizations, and floorplans of electronic-photonic macros for an integrated photonic input/output (I/O) chiplet, such as the TeraPHY chiplet provided by Ayar Labs, Inc. of Santa Clara, Calif.

Figure 1:
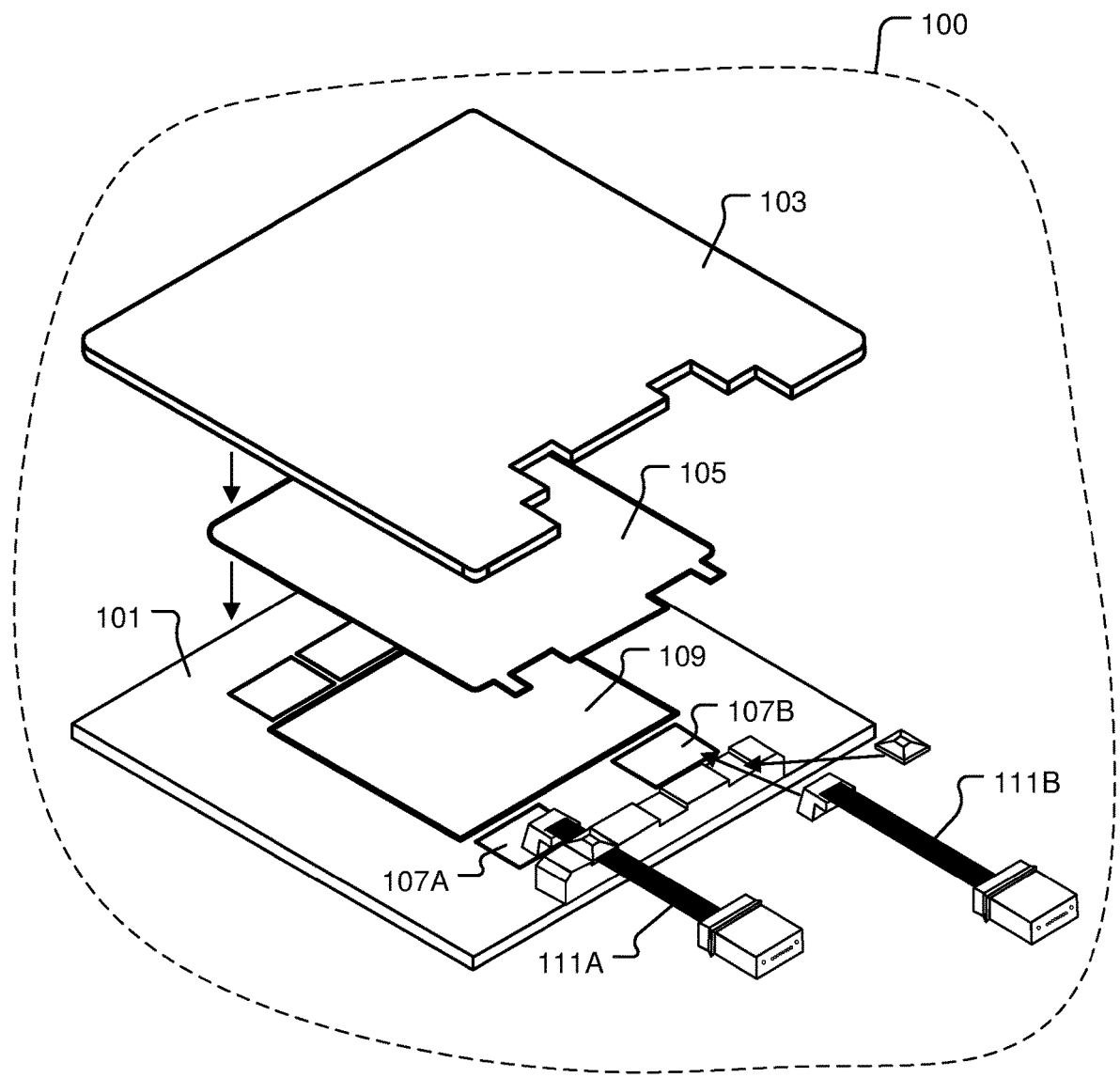
FIG. 1 shows a vertically exploded view of an example multi-chip package (MCP) assembly, in accordance with some embodiment.

FIG. 1 shows a vertically exploded view of an example multi-chip package (MCP) assembly 100, in accordance with some embodiment. The MCP assembly 100 includes an MCP 101 and a lid 103 disposed over the MCP 100, with a thermal interface material (TIM) 105 disposed between the MCP 101 and the lid 103. In some embodiments, the MCP 101 includes multiple TeraPHY optical I/O chiplets 107A and 107B, and an integrated circuit chip 109. In some embodiments, the TIM 105 is disposed over the multiple TeraPHY optical I/O chiplets 107A, 107B and the integrated circuit chip 109. The lid 103 is configured to encapsulate the multiple TeraPHY optical I/O chiplets 107A, 107B and the integrated circuit chip 109. In various embodiments, the integrated circuit chip 109 is either a system-on-chip (SoC) processor, an ASIC chip, a field programmable gate array (FPGA) chip, or essentially any other type of integrated circuit chip. In various embodiments, the multiple TeraPHY optical I/O chiplets 107A, 107B are co-packaged with the integrated circuit chip 109 using a variety of technologies (including, but not limited to, organic substrate, 2.5D integration—Si interposer, embedded interconnect bridge, high-density build-up fanout, etc.) corresponding to the type of electrical I/O interface for the integrated circuit chip 109. The TeraPHY optical I/O chiplets 107A, 107B are designed to adapt to the electrical I/O interface of the integrated circuit chip 109, so as to optimize I/O bandwidth density, energy efficiency, and packaging costs for a given application. Each of the multiple TeraPHY optical I/O chiplets 107A and 107B is configured to optically couple with a corresponding optical fiber array 111A and 111B, respectively.

Figure 2A:
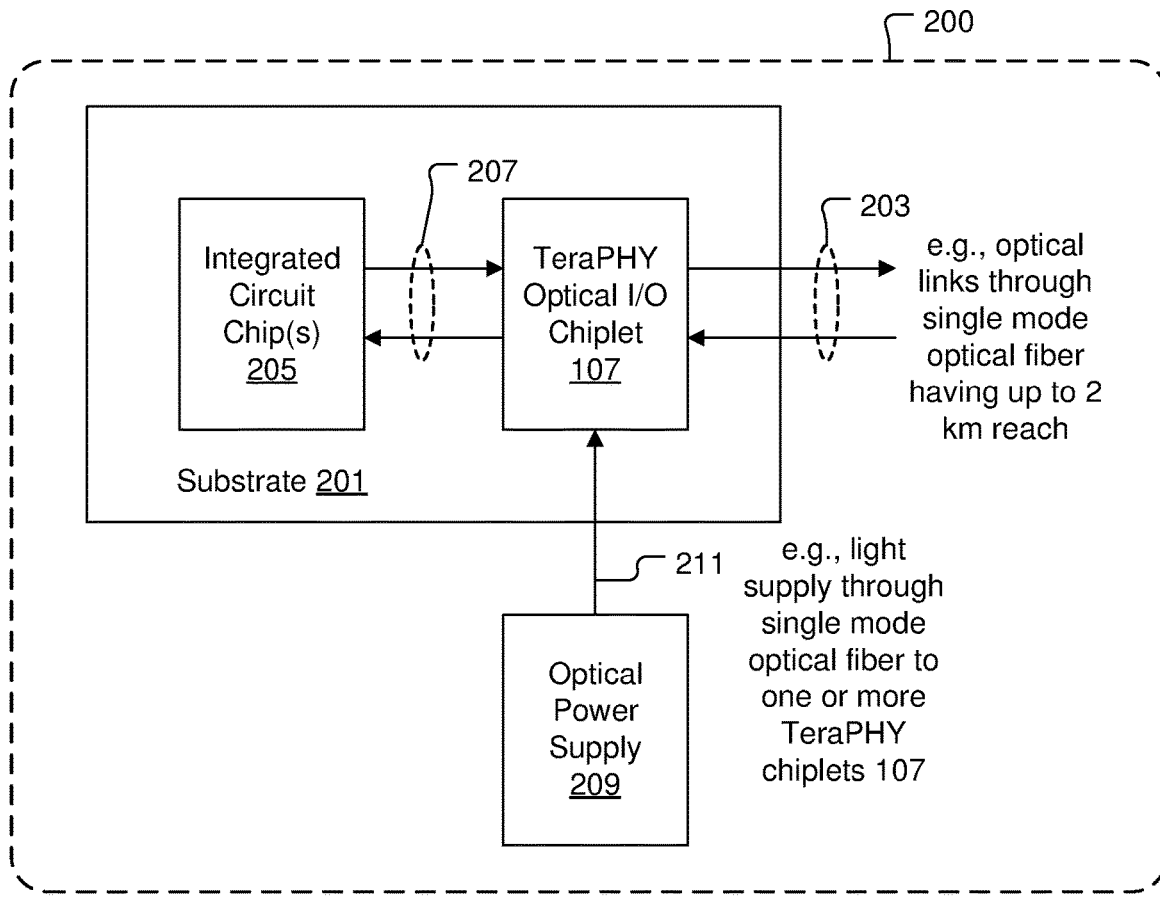
FIG. 2A shows an example block-level architecture of a system implementing a TeraPHY chiplet, in accordance with some embodiments.

FIG. 2A shows an example block-level architecture of a system 200 implementing a TeraPHY chiplet 107, in accordance with some embodiments. The system 200 provides a general representation of any type of MCP referred to herein that is implemented to include the TeraPHY chiplet. The system 200 includes the TeraPHY chiplet 107 attached to a substrate 201. The TeraPHY chiplet 107 includes an optical interface that is optically connected to an optical link 203 through which bi-directional optical data communication is performed with another electro-optic device, such as with another TeraPHY chiplet. The system 200 also includes one or more integrated circuit chips 205 (semiconductor chips) attached to the substrate 201. In various embodiments, the one or more integrated circuit chips 205 includes one or more of a central processing unit (CPU), a graphics processing unit (GPU), a visual processing unit (VPU), an application specific integrated circuit (ASIC), a field programmable gate array (FPGA), a memory chip, an HBM stack, an SoC, a microprocessor, a microcontroller, a digital signal processor (DSP), an accelerator chip, and/or essentially any other type of semiconductor chip. In various embodiments, the substrate 201 is an organic package and/or interposer. In some embodiments, the substrate 201 includes electrical connections/routings 207 between the TeraPHY chiplet 107 and the one or more integrated circuit chips 205. In some embodiments, the electrical connections/routings 207 are formed within a redistribution layer (RDL) structure formed within the substrate 201. In various embodiments, the RDL structure is implemented in accordance with essentially any RDL structure topology and technology available within the semiconductor packaging industry. Some of the electrical connections/routings 207 within the substrate 201 are configured and used to provide electrical power and reference ground potential to the TeraPHY chiplet 107 and to each of the one or more semiconductor chips 205. Also, some electrical connections/routings 207 within the substrate 201 are configured and used to transmit electrical signals that provide for bi-directional digital data communication between the TeraPHY chiplet 107 and the one or more semiconductor chips 205. In various embodiments, digital data communication through the electrical connections/routings 207 between the TeraPHY chiplet 107 and the one or more semiconductor chips 205 is implemented in accordance with a digital data interconnect standard, such as the Peripheral Component Interconnect Express (PCIe) standard, the Compute Express Link (CXL) standard, the Gen-Z standard, the Open Coherent Accelerator Processor Interface (OpenCAPI), and/or the Open Memory Interface (OMI), among essentially any other digital data interconnect standard.

The system 200 also includes an optical power supply 209 optically connected to supply continuous wave laser light of one or more controlled wavelengths to the TeraPHY chiplet 107. In some embodiments, the optical power supply 209 is a SuperNova multi-wavelength, multi-port light supply provided by Ayar Labs, Inc. The optical power supply 209 supplies continuous wave (CW) light that optically powers the TeraPHY chiplet 107. In some embodiments, the optical power supply 209 is configured as a photonic integrated circuit (PIC) that generates multiple wavelengths of the CW light, multiplexes the multiple wavelengths of CW light onto a common optical fiber or optical waveguide, and splits and amplifies the multiplexed optical power to multiple output ports of the optical power supply 209 for transmission to multiple corresponding CW light input ports of the TeraPHY chiplet 107.

In various embodiments, the optical power supply 209 is optically connected to the TeraPHY chiplet 107 through one or more optical waveguides 211. In various embodiments, the one or more optical waveguides 211 includes one or more optical fibers and/or one or more optical waveguide structures formed within the substrate 201. In some embodiments, the optical power supply 209 is attached to the substrate 201. In some embodiments, the optical power supply 209 receives electrical power and electrical control signals through electrical connections/routings formed within the substrate 201. In some embodiments, the optical power supply 209 is implemented as a device physically separate from the substrate 201. In some of these embodiments, the optical power supply 209 is optically connected to the TeraPHY chiplet 107 through one or more optical fibers. In some of these embodiments, the optical power supply 209 is optically connected to the TeraPHY chiplet 107 through one or more optical fibers that are optically connected to the substrate 201 and through one or more optical waveguides formed within the substrate 201.

Figure 2B:
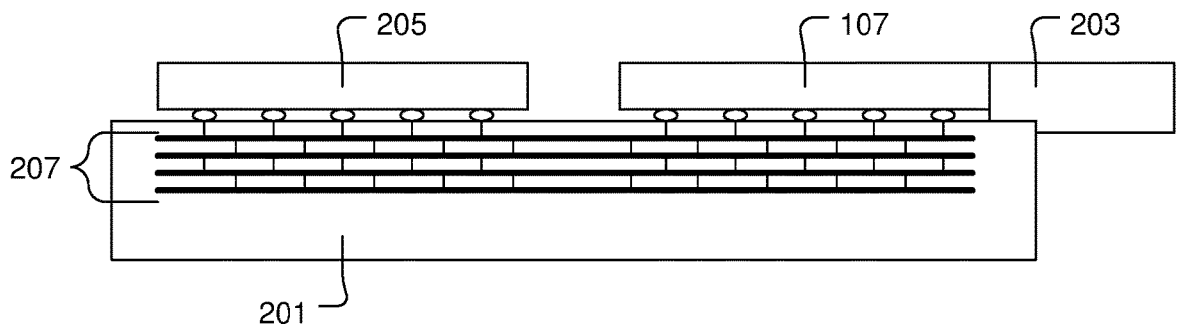
FIG. 2B shows a vertical cross-section diagram of the substrate of FIG. 2A, in accordance with some embodiments.

In some embodiments, the substrate 201 includes routings of electrical traces configured to carry electrical power, electrical ground, electrical data input signals, and electrical data output signals for the TeraPHY optical I/O chiplet 107 and the integrated circuit chip 205. In some embodiments, the integrated circuit chip 205 is electrically connected to the TeraPHY optical I/O chiplet 107 through the electrical connections/routings 207 formed within the substrate 201. In some embodiments, the electrical connections/routings 207 are implemented within the substrate 201 as one or more RDL structure(s). FIG. 2B shows a vertical cross-section diagram of the substrate 201 of FIG. 2A, in accordance with some embodiments. In some embodiments, the electrical connections/routings 207 of the RDL structure(s) are formed in multiple levels of the substrate 201. In some embodiments, the electrical connections/routings 207 include electrically conductive via structures formed to provide electrical connections between electrical traces formed in different levels of the substrate 201, as represented by the vertical lines between different levels of the electrical connections/routings 207 in FIG. 2B. It should be understood that in various embodiments the electrical connections/routings 207 are configured in essentially any manner as needed to provide required electrical connectivity between the integrated circuit chip 205 and the TeraPHY optical I/O chiplet 107, and to provide electrical power to each of the integrated circuit chip 205 and the TeraPHY optical I/O chiplet 107, and to provide a reference ground potential connection to each of the integrated circuit chip 205 and the TeraPHY optical I/O chiplet 107.

Figure 2C:
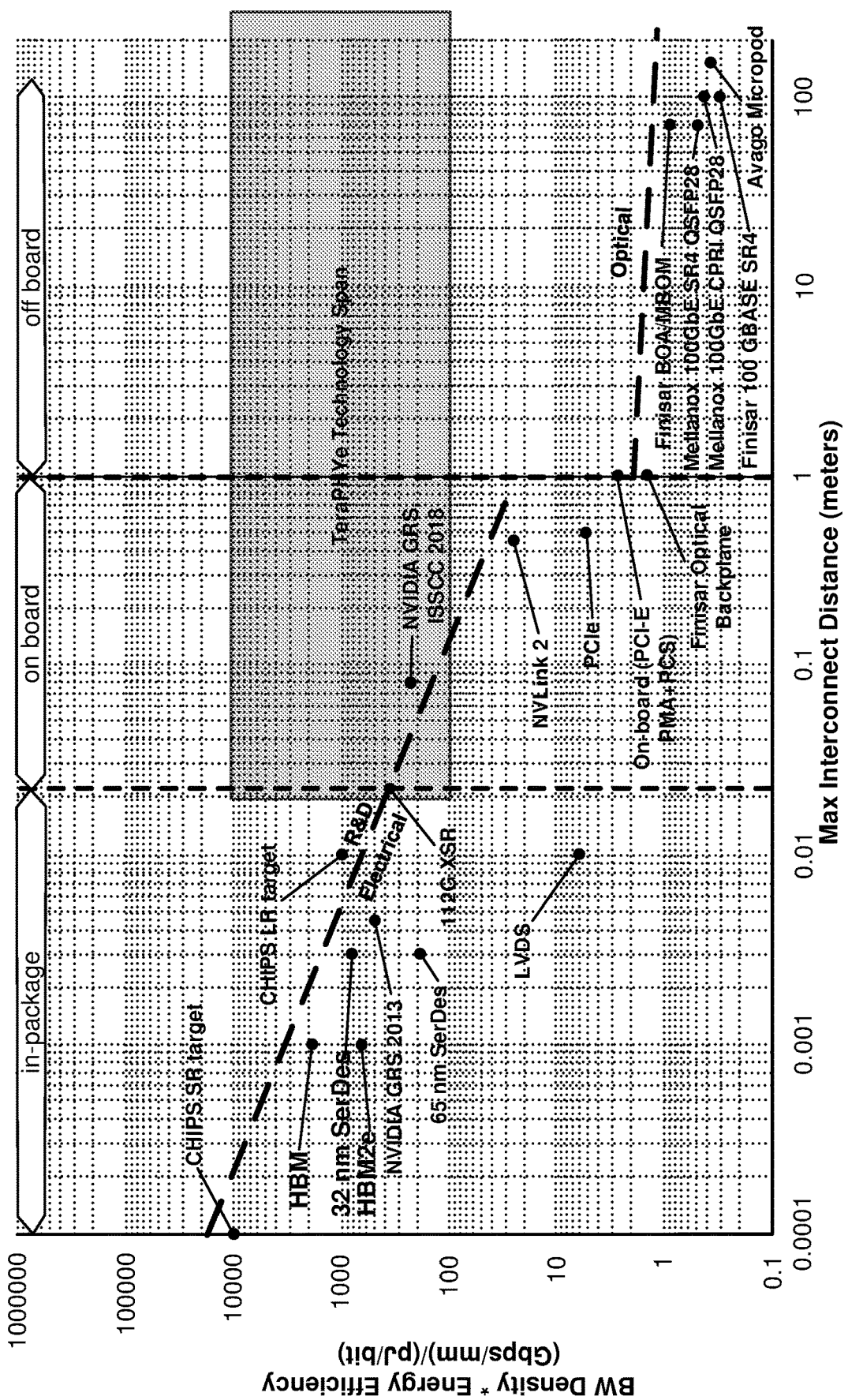
FIG. 2C shows interconnect metrics versus reach tradeoffs for various electrical and electro-optical semiconductor chip technologies, including the TeraPHY chiplets discussed herein, in accordance with some embodiments.

FIG. 2C shows interconnect metrics versus reach tradeoffs for various electrical and electro-optical semiconductor chip technologies, including the TeraPHY chiplets discussed herein, in accordance with some embodiments. More specifically, FIG. 2C shows where the TeraPHY chiplets discussed herein that implement wavelength division multiplexing (WDM) technology reside within a plot of a product of energy efficiency and bandwidth density versus maximum interconnect span (or data communication reach) for various interconnect technologies. The product of energy efficiency and bandwidth density is plotted in units of Gigabit per second per millimeter divided by picojoule per bit [(Gbps/mm)/(pJ/bit)]. The maximum interconnect span is plotted in units of meters (m). FIG. 2C shows that the TeraPHY chiplet WDM technology is capable of providing communication over distances of a several kilometers (km) at the bandwidth-density and energy-cost of in-package interconnects. FIG. 2C also shows various technology metrics and comparison of the TeraPHY chiplet WDM technology with existing electrical and optical technologies. In this manner, FIG. 2C shows an example of where the TeraPHY chiplet WDM technology capability is particularly relevant. FIG. 2C also shows that the TeraPHY chiplet WDM technology enables an off-package data communication reach of more than two km with power, bandwidth, and latency properties similar to an in-package electrical interconnect. The TeraPHY chiplet integrates tens of millions of transistors and hundreds of optical devices to provide multiple Tbps of I/O bandwidth off of a single semiconductor chiplet, e.g., complementary metal-oxide-semiconductor (CMOS) chip or silicon-on-insulator (SOI) chip. Monolithic integration of transistors with optical devices, such as microring resonators, enables seamless insertion of the TeraPHY chiplet into the CMOS/SOI multi-chip packaging ecosystems, while at the same time enabling a flexible electrical interface toward the host integrated circuit chip.

Figure 3:
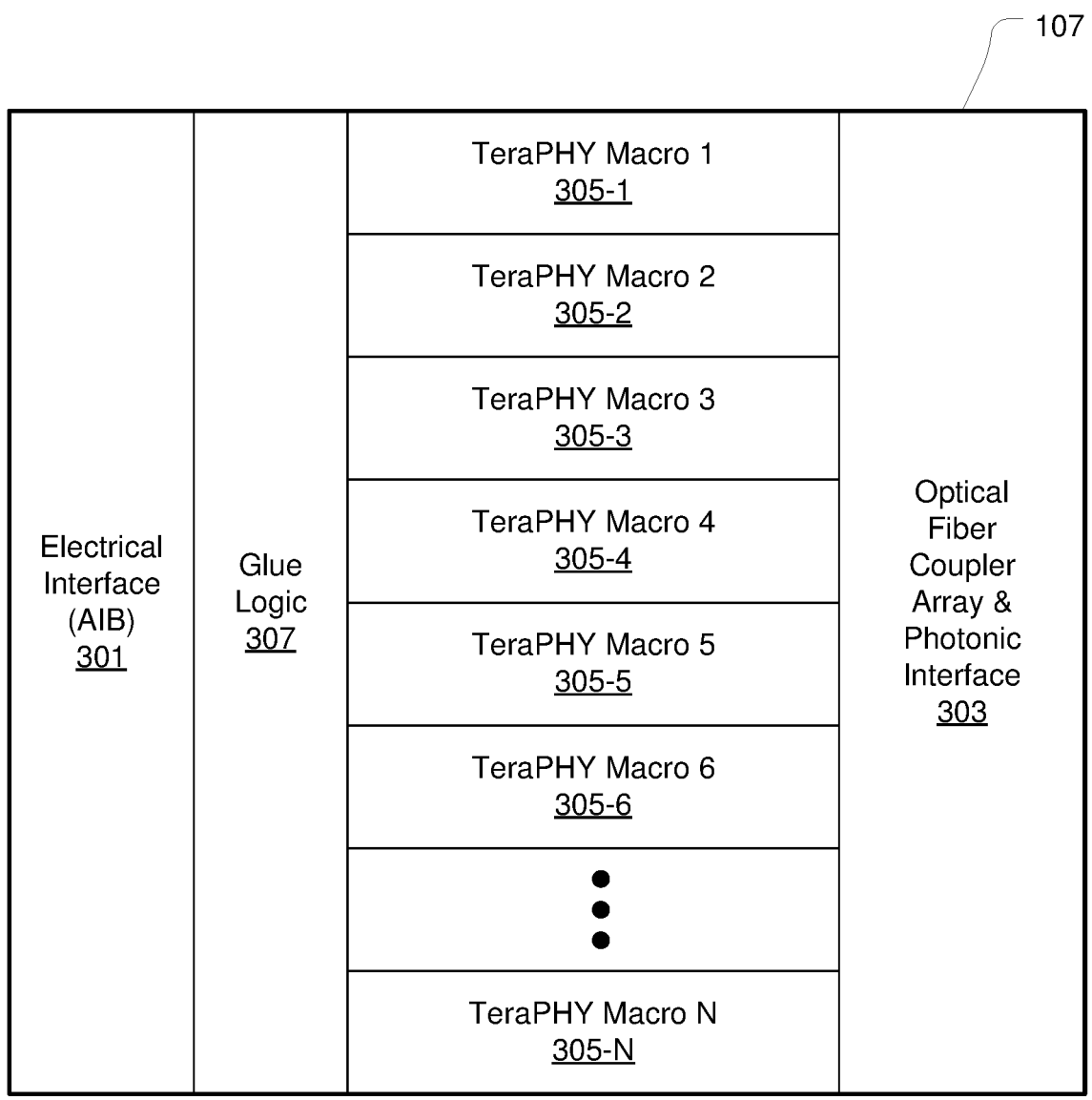
FIG. 3 shows an example organizational diagram of the TeraPHY chiplet referenced herein, in accordance with some embodiments.

FIG. 3 shows an example organizational diagram of the TeraPHY chiplet 107 referenced herein, in accordance with some embodiments. The organizational diagram has an electrical interface 301 separated (split) from a photonic interface 303. The photonic interface 303 is configured to optically couple with a corresponding fiber array unit (FAU) 111 (see FIG. 6B). In the example of FIG. 3, the electrical interface 301 is on a left side of the TeraPHY chiplet 107, and the photonic interface 303 (for the FAU 111) is on a right side of the TeraPHY chiplet 107. A number (1 to N) of optical macros 305-1 to 305-N are located between the photonic interface 303 and the electrical interface 301. The electrical interface 301 is connected to the optical macros 305-1 to 305-N by glue logic 307. The electrical interface 301 of the TeraPHY chiplet 107 is adaptable to the logic of an integrated circuit chip to which the TeraPHY chiplet 107 connects. In the example of FIG. 3, the flow of data from electronics-to-optics is from left-to-right. Conversely, in the example of FIG. 3, the flow of data from optics-to-electronics is from right-to-left.

The electrical interface 301 is a block of circuitry configured to handle all electrical I/O to and from the integrated circuit chip to which the TeraPHY chiplet 107 connects, such as an Ethernet switch chip/die, or other type of integrated circuit chip. The optical macros 305-1 to 305-N are responsible for conversion of data signals between the optical and electrical domains. Specifically, each of the optical macros 305-1 to 305-N is configured to convert electrical data signals received through the electrical interface 301 into optical data signals for transmission through the photonic interface 303. Also, each of the optical macros 305-1 to 305-N is configured to convert optical data signals received through the photonic interface 303 into electrical data signals for transmission through the electrical interface 301. The photonic interface 303 is responsible for coupling optical signals to and from the optical macros 305-1 to 305-N. The glue logic 307 enables flexible (dynamic or static) mapping of the electrical interface 301 to the optical macros 305-1 to 305-N and associated optical wavelengths. In this manner, the glue logic 307 (also called crossbar circuitry) provides dynamic routing of electrical signals between the optical macros 305-1 to 305-N and the electrical interface 301. The glue logic 307 also provides for retiming, rebuffering, and flit reorganization functions at the phy-level. Also, in some embodiments, the glue logic 307 implements various error correction and data-level link protocols to offload some processing from the integrated circuit chip to which the TeraPHY chiplet 107 connects.

Figure 4:
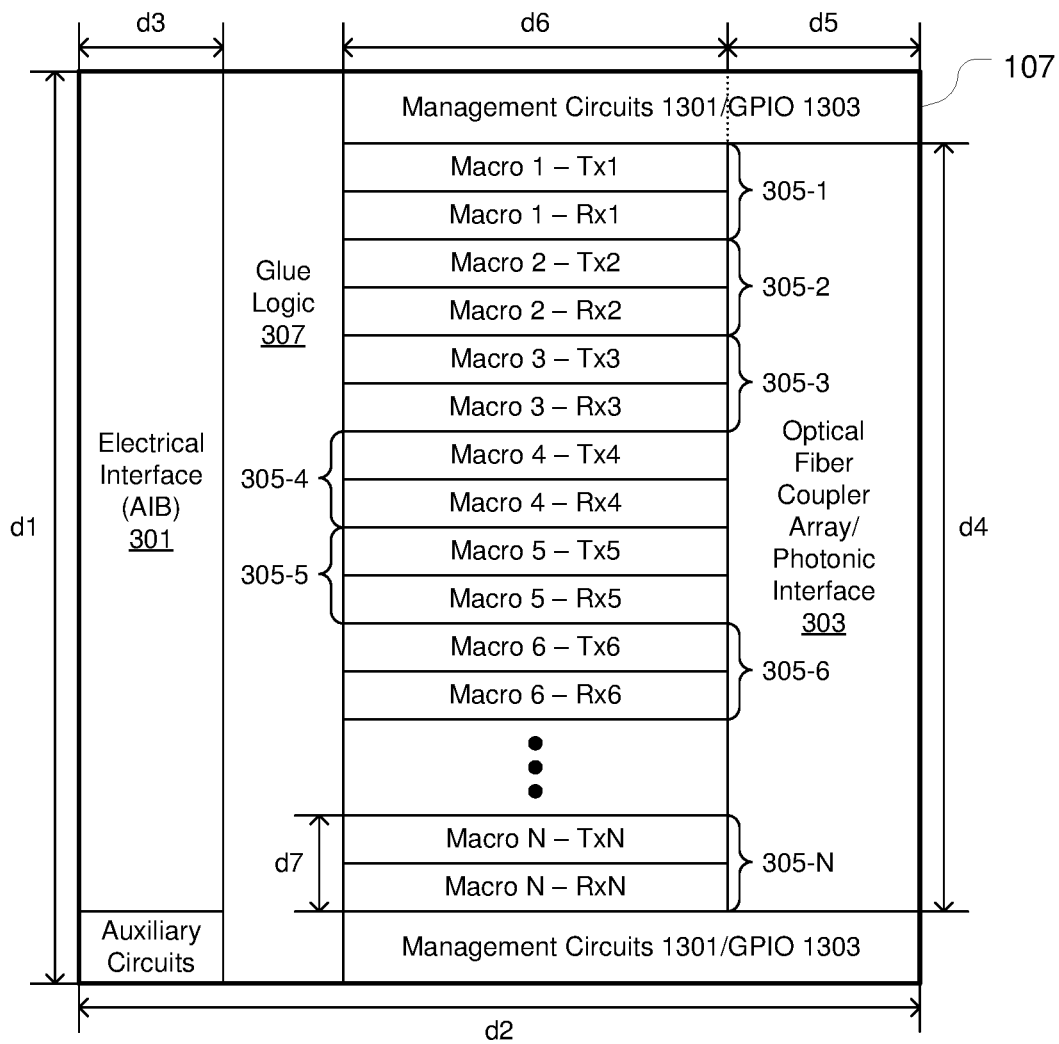
FIG. 4 shows an example layout of the TeraPHY chiplet, in accordance with some embodiments.

FIG. 4 shows an example layout of the TeraPHY chiplet 107, in accordance with some embodiments. The layout of the optical and electrical components of the TeraPHY chiplet 107 is designed to optimize area efficiency, energy efficiency, performance, and practical considerations such as avoiding optical waveguide crossings. In some embodiments, the electrical interface 301 is laid out along one chip edge (left side edge in FIG. 4), and the photonic interface 303 for optical coupling with the FAU 111 is laid out along the opposite chip edge (right side edge in FIG. 4). In some embodiments, the photonic interface 303 includes an optical grating coupler for each of the optical fibers in the FAU 111. In various embodiments, the photonic interface 303 includes vertical optical grating couplers, edge optical couplers, or essentially any other type of optical coupling device, or combination thereof to enable optical coupling of the FAU 111 with the optical macros 305-1 to 305-N. In some embodiments, the photonic interface 303 is configured to interface with 24 optical fibers within the FAU 111. In some embodiments, the photonic interface 303 is configured to interface with 16 optical fibers within the FAU 111.

The glue logic 307 routes data between the electrical interface 301 and the optical macros 305-1 to 305-N. The glue logic 307 includes cross-bar switches and other circuitry as needed to interface the electrical interface 301 connections with the optical macros 305-1 to 305-N. In some embodiments, the optical transmitters (Tx) and optical receivers (Rx) of the optical macros 305-1 to 305-N are combined in pairs, with each Tx/Rx pair forming an optical transceiver. The glue logic 307 enables dynamic mapping of electrical lanes/channels to optical lanes/channels. The optical macros 305-1 to 305-N (for data transmitting (Tx) and data receiving (Rx)) are laid out in between the glue logic 307 and the photonic interface 303 that couples with the FAU 111. The optical macros 305-1 to 305-N include both optical and electrical circuitry responsible for converting electrical signals to optical signals and for converting optical signals to electrical signals.

In some embodiments, the electrical interface 301 is configured to implement the Advanced Interface Bus (AIB) protocol to enable electrical interface between the TeraPHY chiplet 107 and one or more other integrated circuit chips. It should be understood, however, that in other embodiments the electrical interface 107 can be configured to implement essentially any electrical data communication interface other than AIB. For example, in some embodiments, the electrical interface 107 includes a High Bandwidth Memory (HBM) and Kandou Bus for serialization/deserialization of data.

In some embodiments, the TeraPHY chiplet 107 has a length d1 and a width d2, where d1 is about 8.9 millimeters (mm) and d2 is about 5.5 mm. It should be understood that the term "about," as used herein, means +/−10% of a given value. In some embodiments, the length d1 is less than about 8.9 mm. In some embodiments, the length d1 is greater than about 8.9 mm. In some embodiments, the width d2 is less than about 5.5 mm. In some embodiments, the width d2 is greater than about 5.5 mm. In some embodiments, the electrical interface 301 has a width d3 of about 1.3 mm. In some embodiments, the width d3 is less than about 1.3 mm. In some embodiments, the width d3 is greater than about 1.3 mm. In some embodiments, the photonic interface 303 for the optical fiber array has a length d4 of about 5.2 mm and a width d5 of about 2.3 mm. In some embodiments, the length d4 is less than about 5.2 mm. In some embodiments, the length d4 is greater than about 5.2 mm. In some embodiments, the optical macros 305-1 to 305-N have a width d6 of about 1.8 mm. In some embodiments, the width d6 is less than about 1.8 mm. In some embodiments, the width d6 is greater than about 1.8 mm. In some embodiments, each transmitter Tx and receiver Rx optical macro 305-1 to 305-N pair has a length d7 of about 0.75 mm. In some embodiments, the length d7 is less than about 0.75 mm. In some embodiments, the length d7 is greater than about 0.75 mm. In some embodiments, the transmitter Tx and receiver Rx optical macros 305-1 to 305-N are positioned to align with an optical fiber pitch within the photonic interface 303. In some embodiments, the length d7 of each optical macro 305-1 to 305-N (pair of transmitter (Tx) and receiver (Rx) optical macros) is matched to the pitch of the optical fibers in a standard optical fiber ribbon. For example, if the optical fiber pitch is 250 micrometers, and three of the optical fibers in the optical fiber ribbon correspond to one optical macro 305-1 to 305-N (one optical fiber brings continuous wave light to the transmitter (Tx) optical macro from a laser, one optical fiber transmits data as modulated light from the transmitter (Tx) optical macro, and one optical fiber brings modulated light carrying encoded data to the receiver (Rx) optical macro), then the optical macro length d7 is 750 micrometers.

In some embodiments, the number N of optical macros 305-1 to 305-N is 8. In some embodiments, the number N of optical macros 305-1 to 305-N is less than 8. In some embodiments, the number N of optical macros 305-1 to 305-N is greater than 8. Also, each of the optical macros 305-1 to 305-M represents at least one optical port. In some embodiments, a dual phase lock loop (PLL) circuit is shared by each transmitter Tx/receiver Rx pair within the optical macros 305-1 to 305-N. In some embodiments, the dual PLL includes a PLLU that covers a frequency range from 24 GigaHertz (GHz) to 32 GHz, and a PLLD that covers a frequency range from 15 GHz to 24 GHz.

The TeraPHY chiplet 107 also includes management circuits 401 and general purpose input/output (GPIO) components 403 for communicating electrical data signals to and from the TeraPHY chiplet 107. In various embodiments, the GPIO components 403 include Serial Peripheral Interface (SPI) components and/or another type of component to enable off-chip data communication. Also, in some embodiments, the TeraPHY chiplet 107 includes many other circuits, such as memory (e.g., SRAM), a CPU, analog circuits, and/or any other circuit that is implementable in CMOS.

In some embodiments, the TeraPHY optical I/O chiplet 107 has a coarse wavelength division multiplexing 4-lane (CWDM4) configuration in which each of the optical macros 305-1 to 305-N includes four serializer/deserializer (SerDes) slices (FR-4) or eight SerDes slices (FR-8). In some embodiments, the optical macros 305-1 to 305-N are divided into wavelength transmit (Tx)/receive (Rx) slices, with each Tx/Rx slice including fully integrated analog Tx/Rx front-ends, serialization/deserialization, clock-data-recovery, and microring resonator thermal tuning digital control. In some embodiments, the photonic components integrated in each Tx/Rx slice/optical macro 305-x optical port are based on microring resonators (such as modulators, filters, etc.). In some embodiments, the TeraPHY optical I/O chiplet 107 optically couples to the FAU 111 through edge-coupled V-groove structures with embedded mode-converters.

Figure 5A:
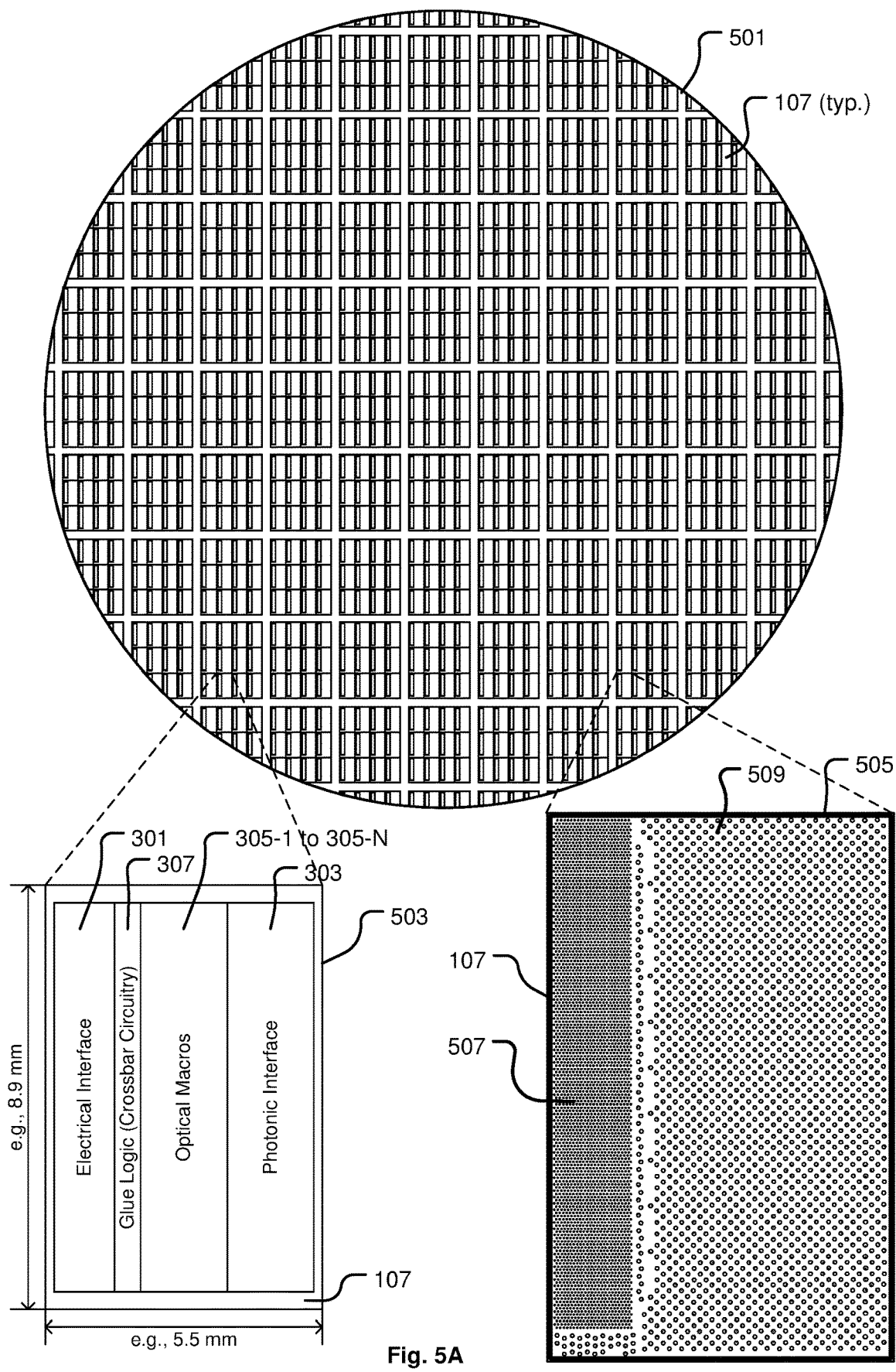
FIG. 5A shows a top view of a semiconductor wafer on which many TeraPHY optical I/O chiplets are fabricated, in accordance with some embodiments.

FIG. 5A shows a top view of a semiconductor wafer 501 on which many TeraPHY optical I/O chiplets 107 are fabricated, in accordance with some embodiments. FIG. 5A also shows a close-up view 503 of a substrate side of a given TeraPHY optical I/O chiplet 107 singulated from the wafer 501, after removal of a substrate thickness from the given TeraPHY optical I/O chiplet 107. FIG. 5A also shows the electrical interface 301 (AIB Interface), the glue logic 307 (Crossbar), the optical macros 305-1 to 305-N (TeraPHY ports), and the photonic interface 303 (Fiber Couplers) of the given TeraPHY optical I/O chiplet 107. FIG. 5A also shows a close-up view 505 of the electrical connection side of the given TeraPHY optical I/O chiplet 107 that includes a parallel interface section 507 and a parallel electrical interface bump pitch pattern section 509 used to electrically connect the given TeraPHY optical I/O chiplet 301 to electrical connections/routings 207 in the substrate 201, as discussed with regard to FIG. 2A. In various embodiments, the TeraPHY optical I/O chiplet 107 is electrically connected to the integrated circuit chip 205 with low-power, short reach in-package electrical interconnect technologies, such as through a redistribution layer (RDL) structure formed within the substrate 201.

Figure 5B:
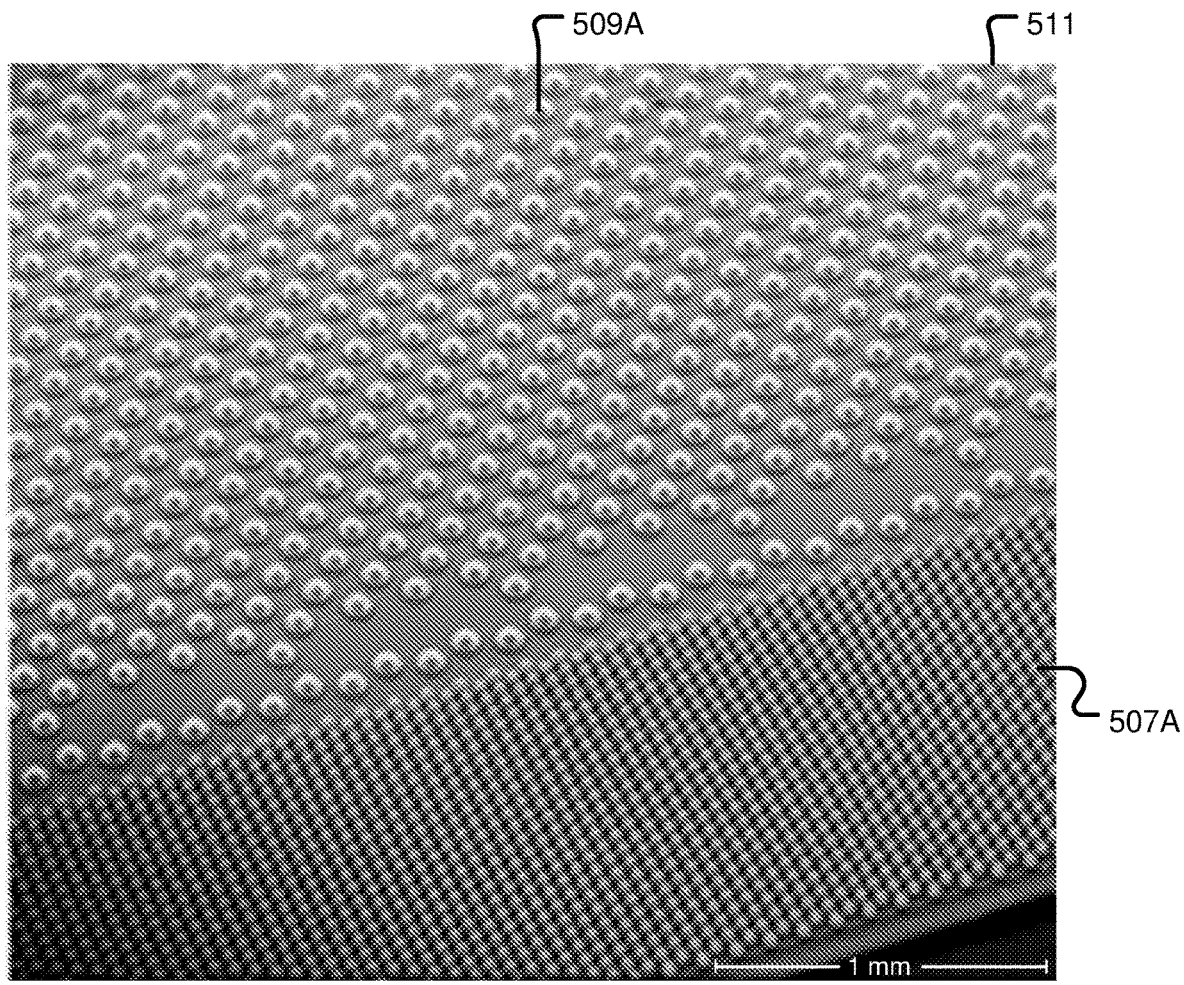
FIG. 5B shows a scanning electron microscope (SEM) image of a portion of the TeraPHY optical I/O chiplet, in accordance with some embodiments.

FIG. 5B shows a scanning electron microscope (SEM) image 511 of a portion of the electrical connection bumps 507A in the parallel interface section 507 and a portion of the electrical connection bumps 509A in the parallel electrical interface bump pitch pattern section 509 of the TeraPHY optical I/O chiplet 107, in accordance with some embodiments. In some embodiments, the electrical connection bumps 507A are arranged in accordance with a bump pitch (bump center-to-bump center distance) of about 55 micrometers. However, it should be understood that in various embodiments, the electrical connection bumps 507A are arranged in accordance with a pitch that is either less than or greater than about 55 micrometers.

Figure 6A:
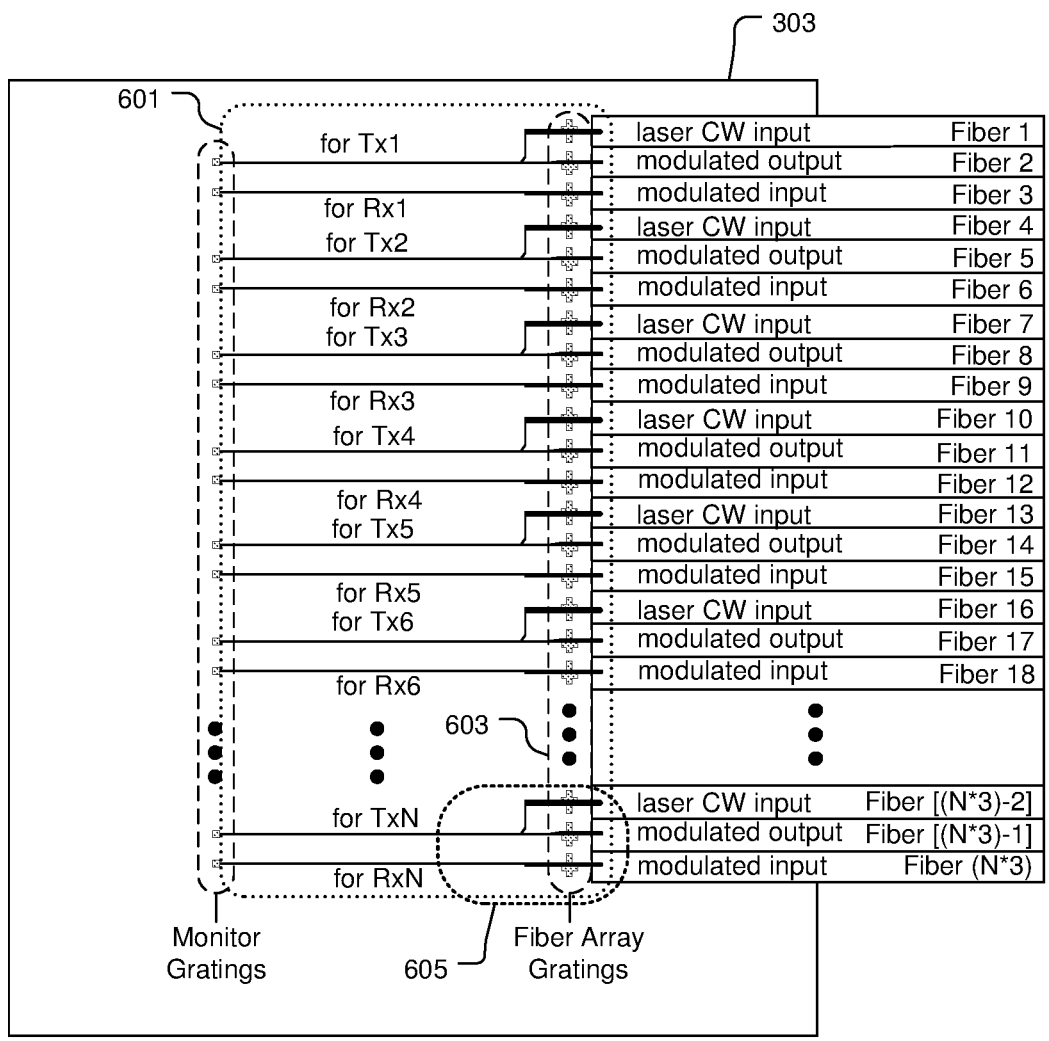
FIG. 6A shows an example layout of photonic structures of the TeraPHY optical I/O chiplet, in accordance with some embodiments.

FIG. 6A shows an example layout of photonic structures of the TeraPHY optical I/O chiplet 107, in accordance with some embodiments. FIG. 6A shows some optical waveguides 601 and associated optical grating structures 603 of the optical layout of the TeraPHY optical I/O chiplet 107, but some portions of the electro-optical layout such as optical microring resonators and associated electronics are not shown in order to avoid obscuring the optical layout of FIG. 6A. The floorplan of the TeraPHY optical I/O chiplet 107 has the optical fibers coming in on the right side of the TeraPHY optical I/O chiplet 107. Light is coupled from the optical fibers into the optical grating couplers 603 on the TeraPHY optical I/O chiplet 107. The light coupled into the optical grating couplers 603 is guided by the optical waveguides 601 to the inputs of the optical macros 305-1 to 305-N. In some embodiments, each optical macro 305-1 to 305-N has three optical fiber connections, including one optical fiber connection for the continuous wave laser light input to the optical transmitter (Tx input), one optical fiber connection for the optical output from the optical transmitter (Tx output), and one optical fiber connection for the modulated optical input to the optical receiver (Rx input).

In some embodiments, the optical layout shown in FIG. 6A uses single-polarization optical grating couplers 603 as the optical coupling structures from the optical fibers to the TeraPHY optical I/O chiplet 107. In some embodiments, when the TeraPHY optical I/O chiplet 107 uses dual-polarization inputs, the optical layout includes polarization splitting optical grating couplers 603 followed by an optical combiner structure. In some embodiments, when the TeraPHY optical I/O chiplet 107 uses dual-polarization inputs and the optical grating couplers 603 support both TE/TM polarization states, the optical layout includes a polarization splitter-rotator followed by an optical combiner structure, such that the optical waveguide interfaces (Tx input, Tx output, Rx input) to the optical macros 305-1 to 305-N have a single polarization. In various embodiments, the optical layout of FIG. 6A is mirrored, rotated, or both mirrored and rotated. Also, in some embodiments, the optical fiber coupler array 303 organization of the TeraPHY optical I/O chiplet 107 includes optical edge couplers based on mode converters, V-grooves, and/or other optical fiber coupling mechanisms.

Figure 6B:
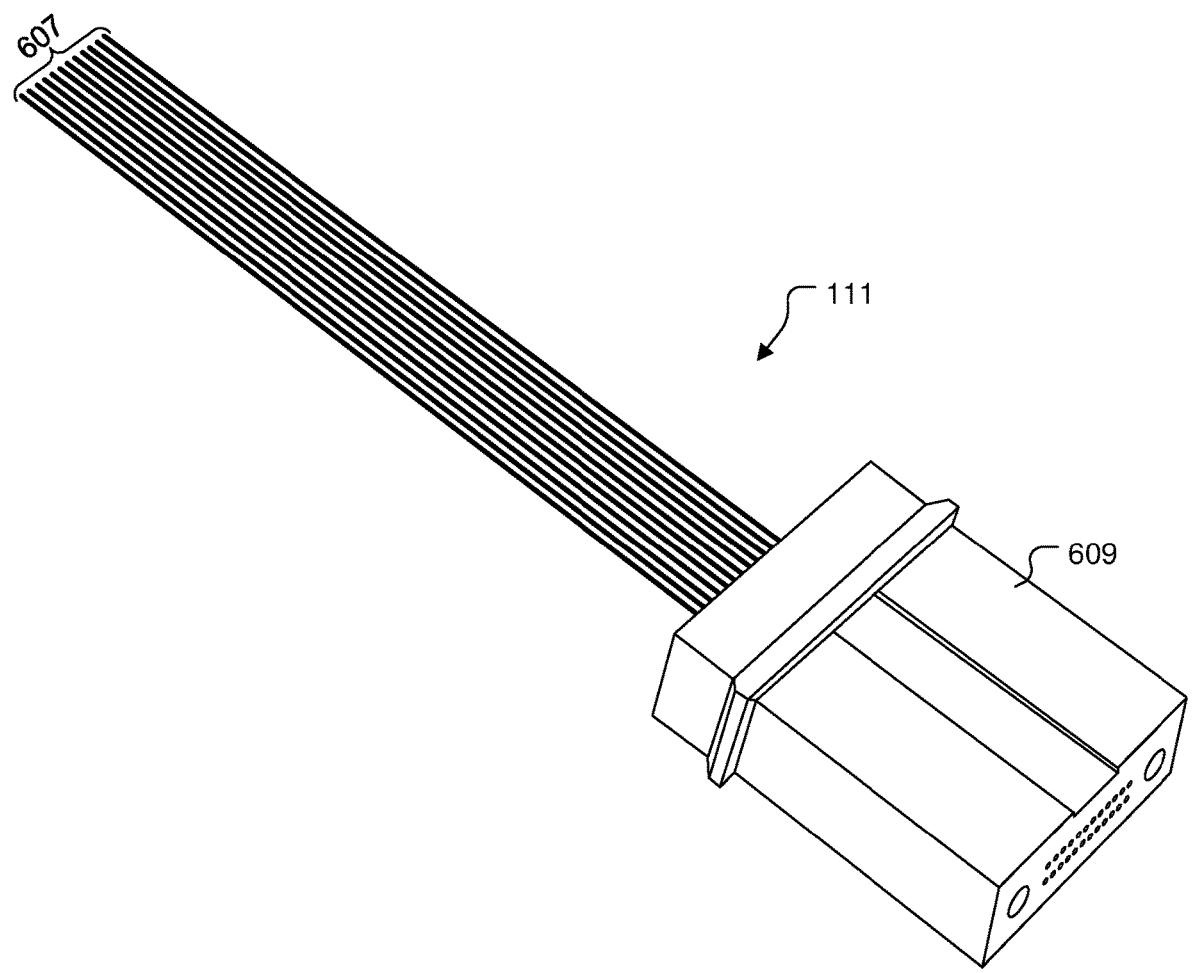
FIG. 6B shows the example FAU for connection to the TeraPHY optical I/O chiplet, in accordance with some embodiments.

FIG. 6B shows the example FAU 111 for connection to the TeraPHY optical I/O chiplet 107, in accordance with some embodiments. In some embodiments, the FAU 111 connects multiple optical fibers to the TeraPHY optical I/O chiplet 107. In some embodiments, the FAU 111 includes an optical fiber pigtail 607 that includes multiple optical fibers that connect to the optical fiber coupler array 303 of the TeraPHY optical I/O chiplet 107. In some embodiments, some of the optical fibers within the optical fiber pigtail 607 are polarization maintaining single mode optical fibers (PMF), such as used for carrying continuous wave laser light from an external laser device to the TeraPHY chiplet 107. Also, in some embodiments, some of the optical fibers within the optical fiber pigtail 607 are non-polarization maintaining single mode optical fibers (SMF) for carrying modulated light signals to and/or from the TeraPHY optical I/O chiplet 107. In some embodiments, the FAU 111 includes a mechanical transfer (MT) ferrule 609, such as an MTP® connector, or other similar type of optical connector. In some embodiments, the FAU 111 is configured to connect up to 24 optical fibers to the TeraPHY optical I/O chiplet 107. For example, in some embodiments, the MT ferrule 609 is configured as a 2×12 MTP® connector ferrule, or other similar type of optical connector.

Figure 6C:
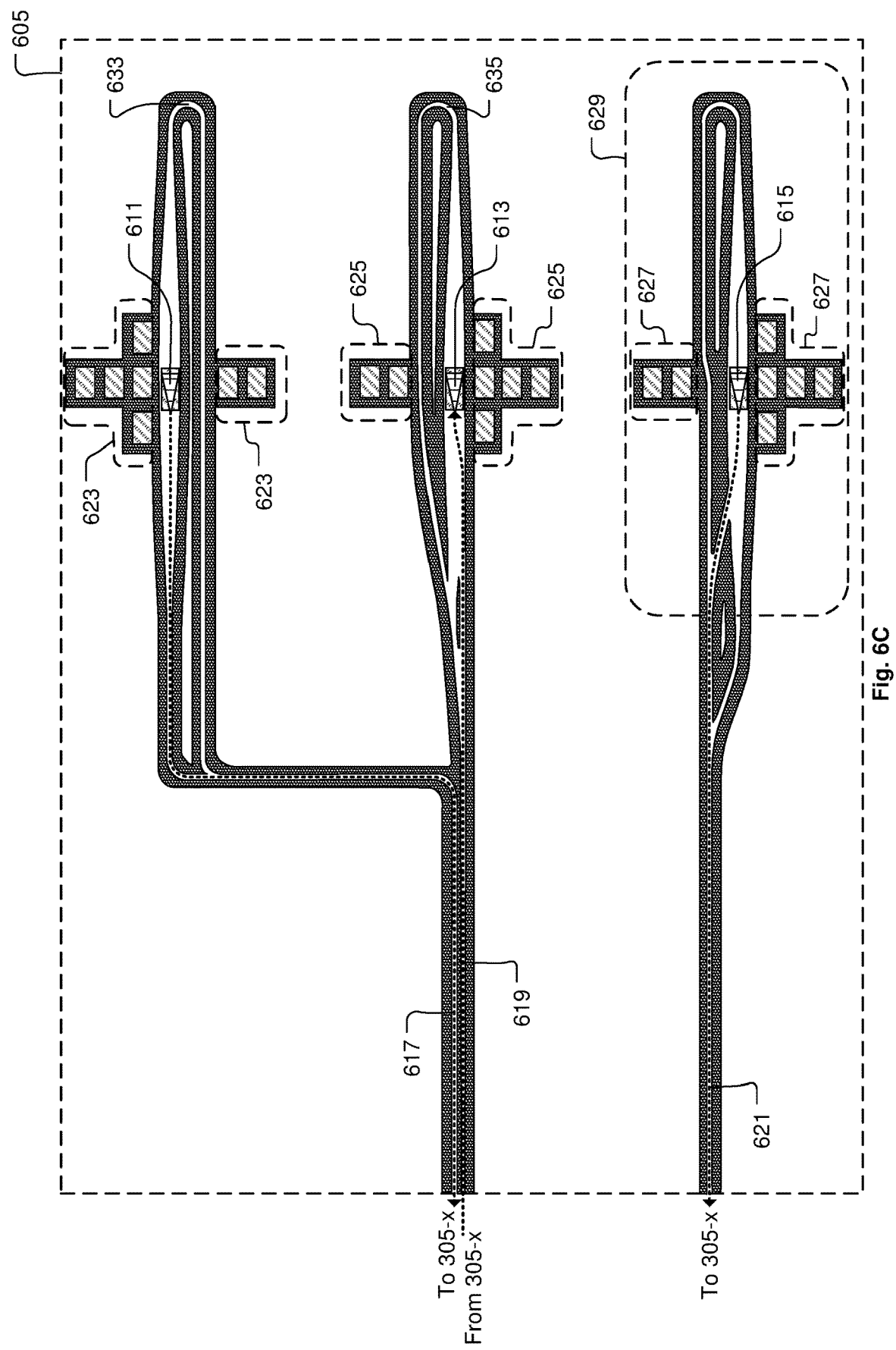
FIG. 6C shows a close-up layout view of a set of optical grating couplers for a given optical macro corresponding to an optical port region as shown in FIG. 6A, in accordance with some embodiments.

FIG. 6C shows a close-up layout view of a set of optical grating couplers 611, 613, 615 for a given optical macro 305-$x$ of the optical macros 305-1 to 305-N, corresponding to an optical port region 605 as shown in FIG. 6A, in accordance with some embodiments. Each optical grating coupler 611, 613, 615 is optically coupled to a corresponding optical fiber. In some embodiments, the optical grating coupler 611 is optically coupled to the corresponding optical fiber through which continuous wave laser light is supplied to the optical macro 305-$x$. In these embodiments, the optical grating coupler 611 is also optically coupled to an optical waveguide 617 that supplies the continuous wave laser light to the optical macro 305-$x$. Also, in these some embodiments, the optical grating coupler 613 is optically coupled to an optical waveguide 619 through which modulated light signals are output from the optical macro 305-$x$. Also, in these some embodiments, the optical grating coupler 613 is also optically coupled to the corresponding optical fiber through which the modulated light signals are transmitted.

In some embodiments, the optical grating coupler 613 is optically coupled to the corresponding optical fiber through which continuous wave laser light is supplied to the optical macro 305-$x$. In these embodiments, the optical grating coupler 613 is also optically coupled to the optical waveguide 619 that supplies the continuous wave laser light to the optical macro 305-$x$. Also, in these embodiments, the optical grating coupler 611 is optically coupled to the optical waveguide 617 through which modulated light signals are output from the optical macro 305-$x$. Also, in these embodiments, the optical grating coupler 611 is also optically coupled to the corresponding optical fiber through which the modulated light signals are transmitted.

The optical grating coupler 615 is optically coupled to an optical fiber through which modulated light signals are received by the TeraPHY optical I/O chiplet 107. The optical grating coupler 615 is also optically coupled to an optical waveguide 621 that supplies the received modulated light signals to the optical macro 305-$x$. The optical waveguides 617, 619, and 621 are formed within the TeraPHY optical I/O chiplet 107 to route/guide light between the optical grating couplers 611, 613, and 615, respectively, and the optical macro 305-$x$. In some embodiments, optical alignment structures 623, 625, and 627 are formed around the optical grating couplers 611, 613, and 615, respectively, to assist with alignment of the corresponding optical fibers to the optical grating couplers 611, 613, and 615.

Figure 6D:
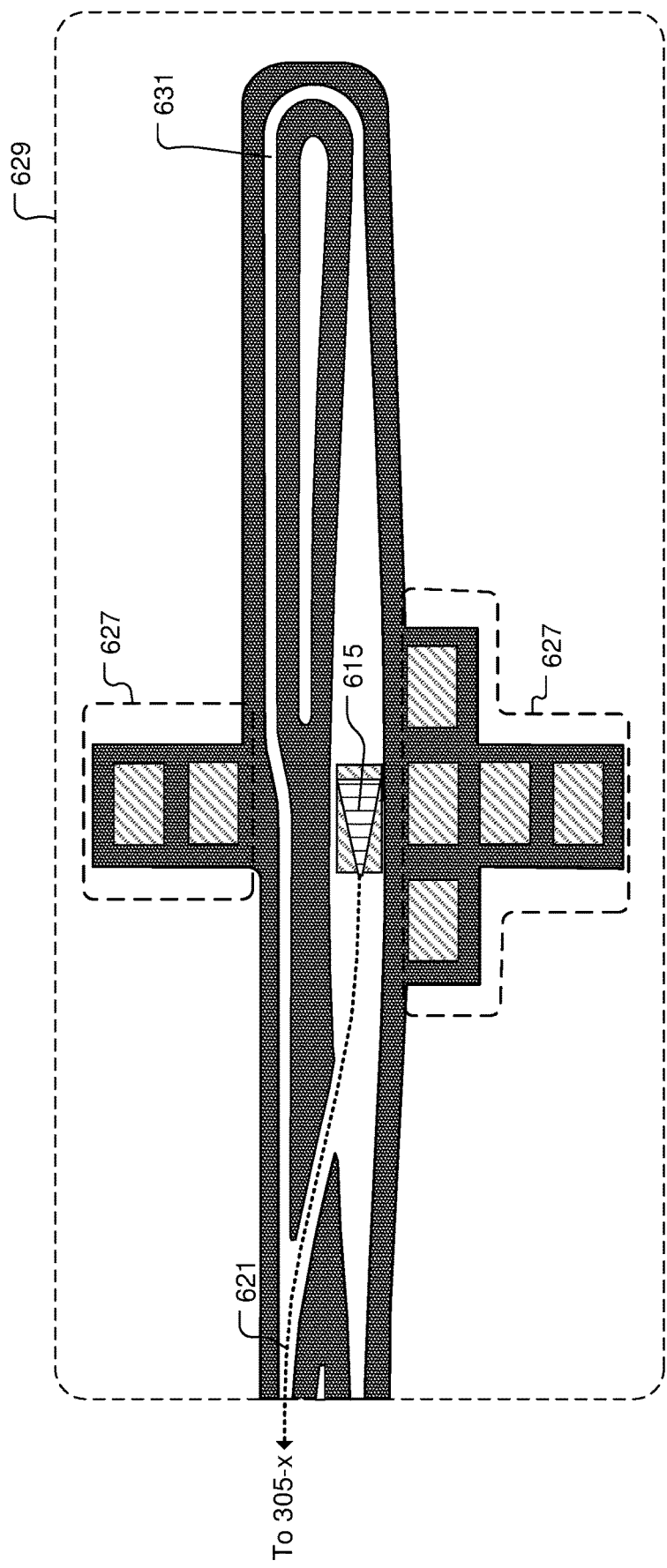
FIG. 6D shows a close-up view of the optical grating coupler corresponding to a region as shown in FIG. 6C, in accordance with some embodiments.

FIG. 6D shows a close-up view of the optical grating coupler 615 corresponding to a region 629 as shown in FIG. 6C, in accordance with some embodiments. The optical grating coupler 615 is configured as a vertical optical grating coupler to which an optical fiber is optically coupled. The optical grating coupler 615 is optically coupled to the optical waveguide 621 that routes light directly to the optical macro 305-$x$. In the example embodiment of FIG. 6D, the optical grating coupler 615 is also optically coupled to an optical waveguide 631 that initially routes light in a direction away from the optical macro 305-$x$ and then routes the light around 180 degrees back towards the optical macro 305-$x$. In various embodiments, the optical waveguide 631 is implemented and used as needed based on whichever initial light propagation direction away from the optical grating coupler 615 is more efficient at coupling light between the corresponding optical fiber and the optical waveguide 621 that optically connects to the optical macro 305-$x$. It should be understood that in some embodiments the optical grating couplers 611 and 613 are formed in a similar manner as the optical grating coupler 615 so as to also optically connect to a loop-back optical waveguide that initially extends from the optical grating coupler in a direction away from the optical macro 305-$x$ and that subsequently turns back toward the optical macro 305-$x$. For example, with reference to FIG. 6C, in some embodiments, the optical grating coupler 611 also optically connects to a loop-back optical waveguide 633, and the optical grating coupler 613 also optically connects to a loop-back optical waveguide 635. Additionally, in some embodiments, one or more of the vertical optical grating couplers 611, 613, and 615 is replaced by a corresponding horizontal optical grating coupler to enable edge-coupling of corresponding optical fiber to the TeraPHY optical I/O chiplet 107.

Figure 7:
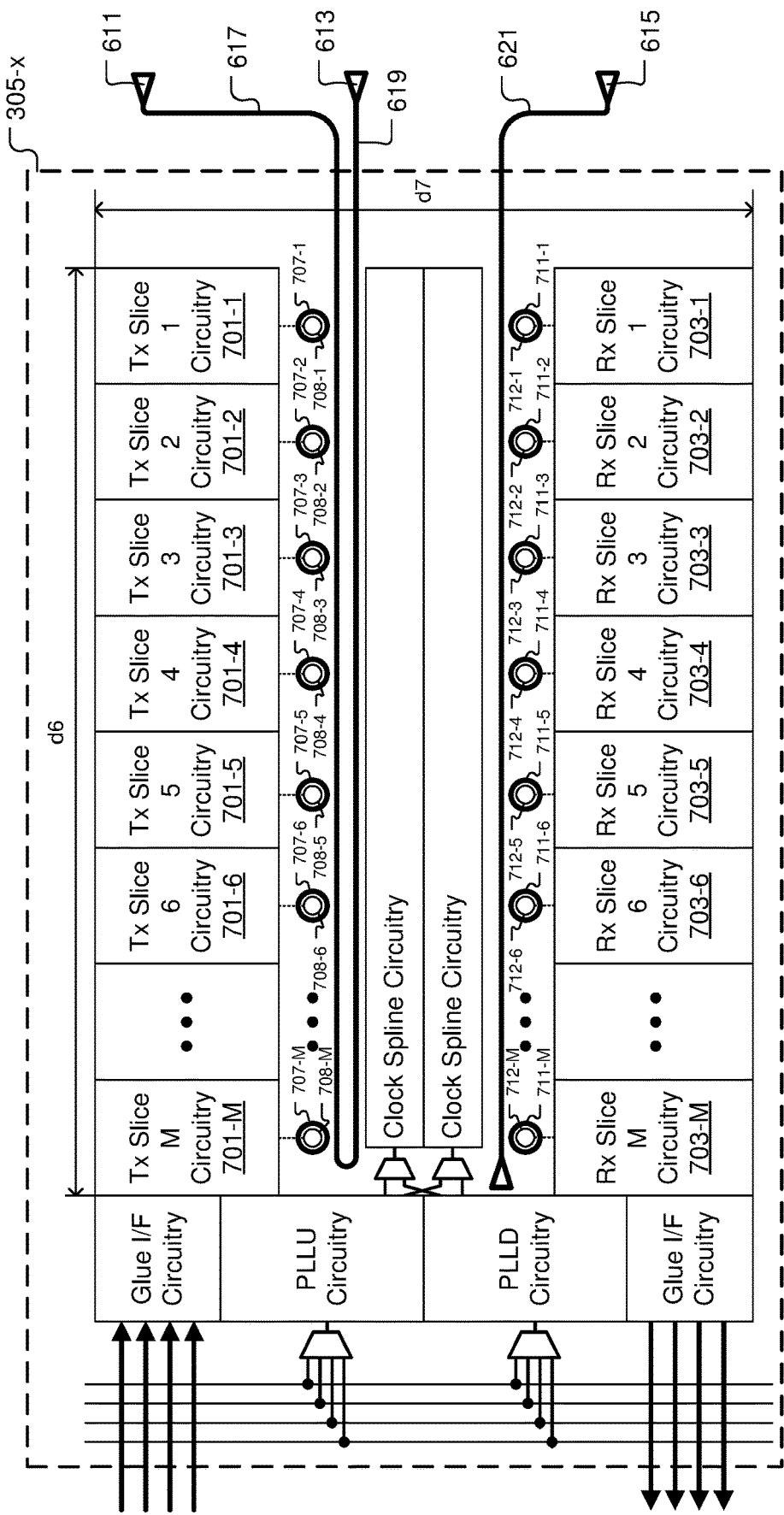
FIG. 7 shows an example layout of a given optical macro, in accordance with some embodiments.

FIG. 7 shows an example layout of a given one of the optical macros 305-1 to 305-N, referred to as optical macro 305-$x$, in accordance with some embodiments. The optical macro 305-$x$ includes a number M of transmit (Tx) slices 701-1 to 701-M and a number M of receive (Rx) slices 703-1 to 703-M. An optical slice of the optical macro 305-$x$ refers to either a single one of the optical transmitter slices 701-1 to 701-M, or a single one of the optical receiver slices 703-1 to 703-M, or a combination of a single one of the optical transmitter slices 701-1 to 701-M and a corresponding single one of the optical receiver slices 703-1 to 703-M, where the single one of the optical transmitter slices 701-1 to 701-M and the single one of the optical receiver slices 703-1 to 703-M are controlled to operate on a single wavelength of light. The example layout of FIG. 7 shows the routing of an optical waveguide 705 and the placement of optical microring resonators 707-1 to 707-M within the transmit (Tx) portion of the optical macro 705-$x$. The microring resonators 707-1 to 707-M function as modulators. The example layout of FIG. 7 also shows the routing of an optical waveguide 709 and the placement of optical microring resonators 711-1 to 711-M within the receive (Rx) portion of the optical macro 705-$x$. The microring resonators 711-1 to 711-M function as photodetectors. In some embodiments, one or more of the microring resonators 707-1 to 707-M and 711-1 to 711-M are controlled to function as an optical multiplexer and/or as an optical demultiplexer.

Each corresponding pair of the transmit (Tx) slices 701-1 to 701-M and the receive (Rx) slices 703-1 to 703-M forms a Tx/Rx slice of the optical macro 305-$x$. For example, Tx Slice 1 701-1 and Rx Slice 1 703-1 together form a Slice 1 of the optical macro 305-$x$. The transmit (Tx) slices 701-1 to 701-M include electrical circuitry for directing translation of electrical data in the form of a bit stream into a stream of modulated light by operating the microring resonators 707-1 to 707-M to modulate the continuous wave laser light at a given wavelength incoming through the optical waveguide 617 from the optical grating coupler 611 into a stream of modulated light at the given wavelength, with the stream of modulated light at the given wavelength being transmitted from the optical macro 305-x through the optical waveguide 619 to the optical grating coupler 613. In some embodiments, each of the transmit (Tx) slices 701-1 to 701-M includes electrical circuitry for inphase signal generation and/or quadrature signal generation, injection locked oscillator circuitry, and phase interpolator circuitry. The receive (Rx) slices 703-1 to 703-M include electrical circuitry for detecting light of a given wavelength within a stream of modulated light incoming through the optical waveguide 621 from the optical grating coupler 615 by operating the microring resonators 711-1 to 711-M. The electrical circuitry within the receive (Rx) slices 703-1 to 703-M translate the light that is detected by the microring resonators 711-1 to 711-M at a corresponding wavelength into a bit stream in the electrical domain. In some embodiments, each of the receive (Rx) slices 703-1 to 703-M includes electrical circuitry for inphase signal generation and/or quadrature signal generation (I/Q signal generation), injection locked oscillator (ILO) circuitry, phase interpolator (PI) circuitry, transimpedance amplifier (TIA) circuitry, and signal equalization (EQ) circuitry. In some embodiments, the receive (Rx) slices 703-1 to 703-M utilize a respective dummy microring photodetector (PD) for better matching in the receiver analog front-end and for robustness to common-mode noise (e.g., supply).

The optical waveguide 617 routes continuous wave laser light from the optical grating coupler 611 to each of the microring resonators 707-1 to 1507-M within the transmit (Tx) slices 701-1 to 701-M. The optical waveguide 619 also routes modulated light from the microring resonators 707-1 to 707-M within the transmit (Tx) slices 701-1 to 701-M to the optical grating coupler 613 for transmission out of the TeraPHY optical I/O chiplet 107. In some embodiments, the optical waveguide 617 and the optical waveguide 619 are parts of a single, continuously formed optical waveguide. In some embodiments, each of the microring resonators 707-1 to 707-M within the transmit (Tx) slices 701-1 to 701-M is tunable to operate at a specified wavelength of light. Also, in some embodiments, the specified wavelength of light at which a given microring resonator 707-x is tuned to operate is different than the specified wavelengths at which the other microring resonators 707-1 to 707-M, excluding 707-x, are tuned to operate. In some embodiments, a corresponding heating device 708-1 to 708-M is positioned near each of the microring resonators 707-1 to 707-M to provide for thermal tuning of the resonant wavelength of the microring resonator. In some embodiments, a corresponding heating device 708-1 to 708-M is positioned within an inner region circumscribed by a given microring resonator 707-x to provide for thermal tuning of the resonant wavelength of the given microring resonator 707-x. In some embodiments, the heating device 708-1 to 708-M of each of the microring resonators 707-1 to 707-M is connected to corresponding electrical control circuitry within the corresponding transmit (Tx) slice that is operated to thermally tune the resonant wavelength of the microring resonator. In some embodiments, each of the microring resonators 707-1 to 707-M is connected to corresponding electrical tuning circuitry within the corresponding transmit (Tx) slice that is operated to electrically tune the resonant wavelength of the microring resonator. In various embodiments, each of the microring resonators 707-1 to 707-M operates as part of an optical modulator and/or optical multiplexer.

The optical waveguide 621 routes incoming modulated light from the optical grating coupler 615 to the microring resonators 711-1 to 711-M within the receive (Rx) slices 703-1 to 703-M. In some embodiments, each of the microring resonators 711-1 to 711-M within the receive (Rx) slices 703-1 to 703-M is tunable to operate at a specified wavelength of light. Also, in some embodiments, the specified wavelength of light at which a given microring resonator 711-x is tuned to operate is different than the specified wavelengths at which the other microring resonators 711-1 to 711-M, excluding 711-x, are tuned to operate. In some embodiments, a corresponding heating device 712-1 to 712-M is positioned near each of the microring resonators 711-1 to 711-M to provide for thermal tuning of the resonant wavelength of the microring resonator. In some embodiments, a corresponding heating device 712-1 to 712-M is positioned within an inner region circumscribed by a given microring resonator 711-x to provide for thermal tuning of the resonant wavelength of the given microring resonator 711-x. In some embodiments, the heating device 712-1 to 712-M of each of the microring resonators 711-1 to 711-M is connected to corresponding electrical control circuitry within the corresponding receive (Rx) slice that is operated to thermally tune the resonant wavelength of the microring resonator. In some embodiments, each of the microring resonators 711-1 to 711-M is connected to corresponding electrical tuning circuitry within the corresponding receive (Rx) slice that is operated to electrically tune the resonant wavelength of the microring resonator. In various embodiments, each of the microring resonators 711-1 to 711-M operates as part of a photodetector and/or optical demultiplexer.

In some embodiments, the architecture and floorplan of the optical macro 305-x is variable by including a different number of PLLs at various positions within the optical macro 305-x. For example, in some embodiments, a centralized PLL is positioned within the clock spine and fans out to the slices at both sides of the optical macro 305-x. In various embodiments, the PLL is replicated as multiple PLL instances across the optical macro 305-x, with each PLL instance either dedicated to a given transmit (Tx)/receive (Rx) slice or shared with a subset of transmit (Tx)/receive (Rx) slices. In various embodiments, other floorplan configurations of the optical macro 305-x include multiple columns of optical macros with pass-through photonic rows, to increase the edge bandwidth density, and/or staggering of the transmit (Tx) and receive (Rx) optical macros side-by-side to increase the edge bandwidth density.

The optical macro 305-x includes both photonic and electronic components. The optical waveguides 617, 619, and 621 are laid out in the optical macro 305-x so as to avoid optical waveguide crossings and so as to minimize optical waveguide length, which minimizes optical losses, and correspondingly improves the energy efficiency of the system. The optical macro 305-x is laid out in such a way as to minimize the distance between the electronic components and the optical components in order to minimize electrical trace length, which improves the energy efficiency of the optical macro 305-x, enables faster signal transmission, and reduces chip size.

The TeraPHY optical I/O chiplet 107 includes the set of (N) optical macros 305-1 to 305-N. Each optical macro 305-x includes the set of (M) optical transmitter slices 701-1 to 701-M and optical receiver slices 703-1 to 703-M that are logically grouped together to transmit or receive bits on a number (W) of different optical wavelengths on the respective optical waveguide 617/619 and 621. In various embodiments, the number (M) of optical transmitter slices 701-1 to 701-M and optical receiver slices 703-1 to 703-M and the number (W) of different optical wavelengths can be defined as needed, considering that any number of optical transmitter slices 701-1 to 701-M and/or optical receiver slices 703-1 to 703-M is tunable to a given one of the number (W) of optical wavelengths. However, if data bits are being transmitted or received by multiple ones of the optical microring resonators 707-1 to 707-M, or by multiple ones of the optical microring resonators 711-1 to 711-M, tuned to the same optical wavelength, channel/wavelength contention is managed. The floorplan and organization of the optical macro 305-x represent adjustable degrees of freedom for controlling the following metrics:

length of optical waveguides 617, 619, 621 (which directly correlates with optical loss)

optical macro 305-x area (which correlates with manufacturing cost)

energy consumed per bit (energy efficiency)

electrical signaling integrity (which correlates with performance)

electrical package escape (the amount of electrical data input and output that is physically available for a given set of chip dimensions and for a given spacing/pitch of electrical bumps)

optical package escape (the amount of optical data input and output that is physically available for a given set of chip dimensions and for a given spacing/pitch of optical fibers).

Figure 8A:
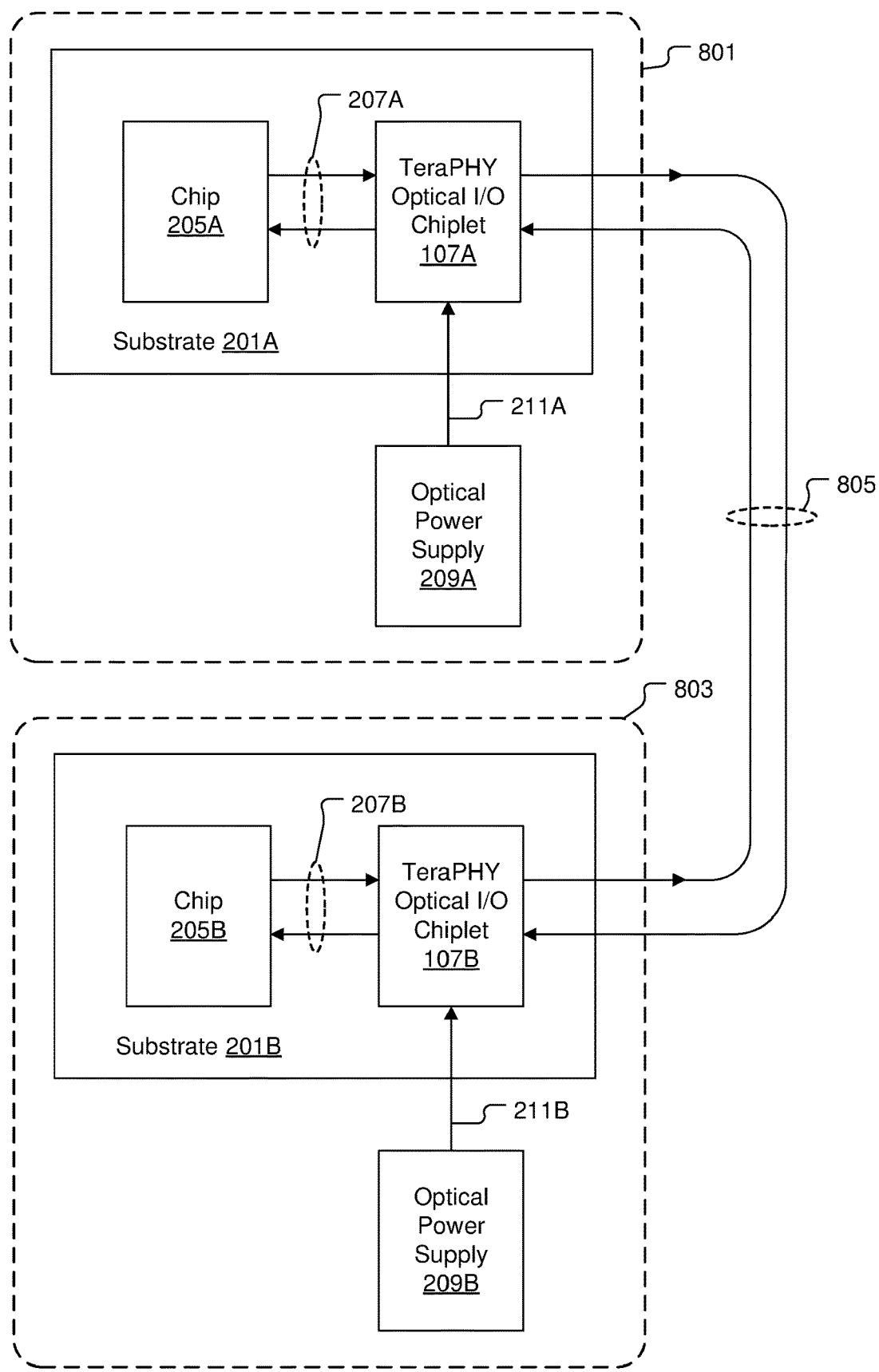
FIG. 8A shows a diagram of a first computer system optically connected to a second computer system through an optical link, in accordance with some embodiments.

FIG. 8A shows a diagram of a first computer system 801 optically connected to a second computer system 803 through an optical link 805, in accordance with some embodiments. In various embodiments, the first computer system 801 represents essentially any packaged set of semiconductor chips that includes at least one integrated circuit chip 205A electrically connected to at least one TeraPHY optical I/O chiplet 107A, as indicated by electrical connections/routings 207A. In some embodiments, the at least one integrated circuit chip 205A and the at least one TeraPHY optical I/O chiplet 107A are packaged on a common substrate 201A. The at least one TeraPHY optical I/O chiplet 107A is connected to receive optical power from an optical power supply 209A through one or more optical waveguides 211A. The at least one TeraPHY optical I/O chiplet 107A corresponds to the TeraPHY chiplet 107 discussed herein. The optical power supply 209A is that same as the optical power supply 209 described with regard to FIG. 2A.

In various embodiments, the second computer system 803 represents essentially any packaged set of semiconductor chips that includes at least one integrated circuit chip 205B electrically connected to at least one TeraPHY optical I/O chiplet 107B, as indicated by electrical connections/routings 207B. In some embodiments, the at least one integrated circuit chip 205B and the at least one TeraPHY optical I/O chiplet 107B are packaged on a common substrate 201B. The at least one TeraPHY optical I/O chiplet 107B is connected to receive optical power from an optical power supply 209B through one or more optical waveguides 211B. The at least one TeraPHY optical I/O chiplet 107B corresponds to the TeraPHY chiplet 107 discussed herein. The optical power supply 209B is that same as the optical power supply 209 described with regard to FIG. 2A. Also, in some embodiments, the optical power supplies 209A and 209B are the same optical power supply. The TeraPHY optical I/O chiplet 107A of the first computer system 801 is optically connected to the TeraPHY optical I/O chiplet 107B of the second computer system 803 through the optical link 805. In some embodiments, the optical link 805 is an optical fiber array.

Figure 8B:
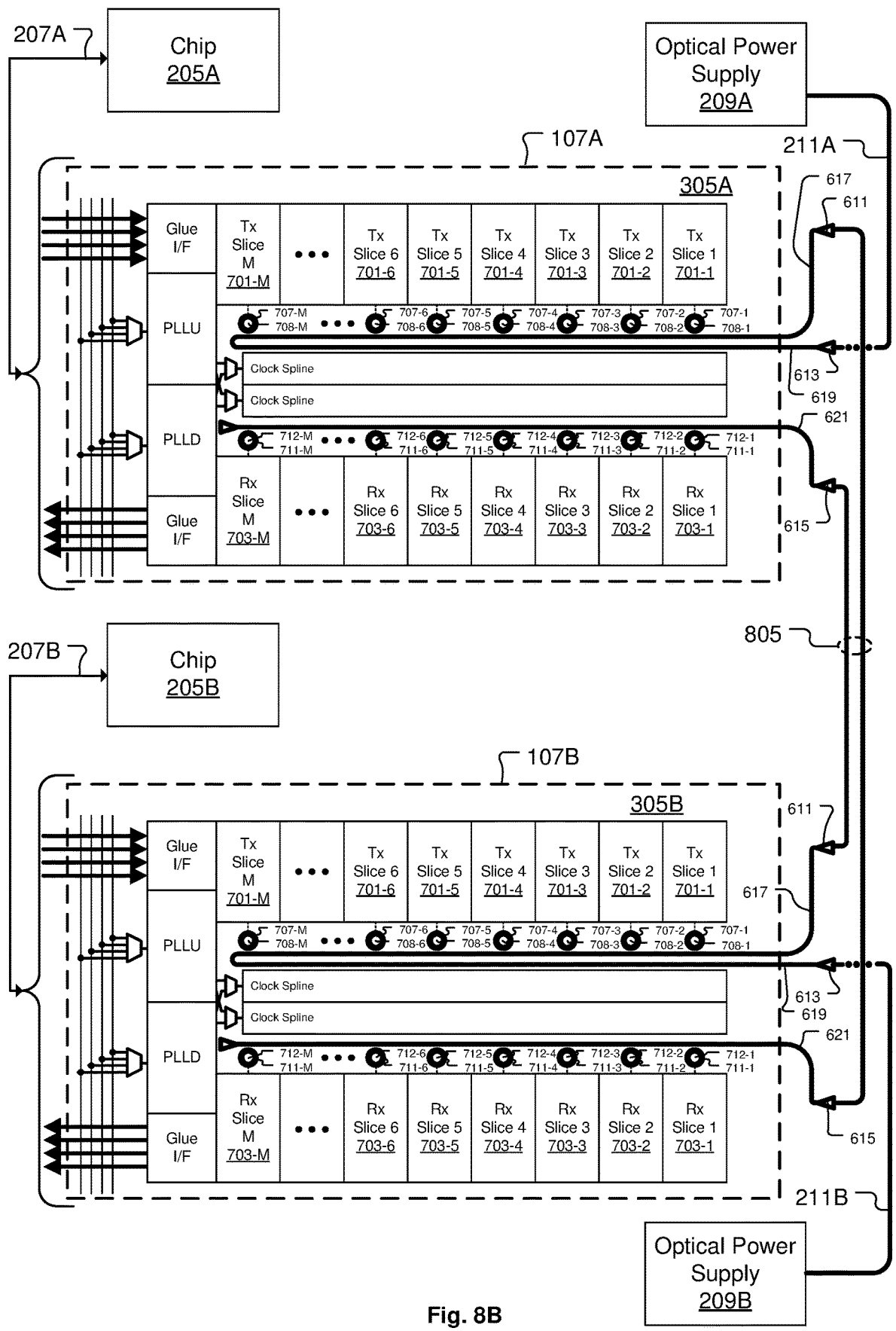
FIG. 8B shows a more detailed view of the optical connections between the TeraPHY optical I/O chiplet of the first computer system and the TeraPHY optical I/O chiplet of the second computer system, in accordance with some embodiments.

FIG. 8B shows a more detailed view of the optical connections between the TeraPHY optical I/O chiplet 107A of the first computer system 801 and the TeraPHY optical I/O chiplet 107B of the second computer system 803, in accordance with some embodiments. In some embodiments, each of the TeraPHY optical I/O chiplets 107A and 107B is configured in the same manner as TeraPHY optical I/O chiplet 107 described herein. The TeraPHY optical I/O chiplet 107A includes at least one optical macro 305A. The TeraPHY optical I/O chiplet 107B includes at least one optical macro 305B. Each of the optical macros 305A and 305B is configured in the same manner as the optical macro 305-x described herein.

The optical grating coupler 613 of the optical macro 305A is optically connected to the optical power supply 209A through one or more optical waveguides 211A, e.g., optical fibers. The optical grating coupler 611 of the optical macro 305A is optically connected to the optical grating coupler 615 of the optical macro 305B. In this manner, modulated optical signals generated by the transmitter slices 701-1 through 701-M of the optical macro 305A are transmitted to the receiver slices 703-1 through 703-M of the optical macro 305B. In some embodiments, the modulated optical signals generated by the transmitter slices 701-1 through 701-M convey data received by the optical macro 305A from the integrated circuit chip 205A in the form of electrical signals. The modulated optical signals that convey the data are optically coupled into the optical microring resonators 711-1 through 711-M of the optical macro 305B and are de-modulated by the receiver slices 703-1 through 703-M of the optical macro 305B into electrical signals that are transmitted to the integrated circuit chip 205B through the electrical connections/routings 207B.

The optical grating coupler 613 of the optical macro 305B is optically connected to the optical power supply 209B through one or more optical waveguides 2111B, e.g., optical fibers. The optical grating coupler 611 of the optical macro 305B is optically connected to the optical grating coupler 615 of the optical macro 305A. In this manner, modulated optical signals generated by the transmitter slices 701-1 through 701-M of the optical macro 305B are transmitted to the receiver slices 703-1 through 703-M of the optical macro 305A. In some embodiments, the modulated optical signals generated by the transmitter slices 701-1 through 701-M of the optical macro 305B convey data provided by the integrated circuit chip 205B through the electrical connections/routings 207B to the optical macro 305B. The modulated optical signals that convey the data provided by the integrated circuit chip 205B are optically coupled into the optical microring resonators 711-1 through 711-M of the optical macro 305A and are de-modulated by the receiver slices 703-1 through 703-M of the optical macro 305A into electrical signals that are transmitted to chip 205A through the electrical connections/routings 207A.

The TeraPHY optical I/O chiplet 107 has a small footprint because the intellectual property (IP) building blocks on the chiplet are dense. These IP building blocks include the optical microring resonators, which are used for multiplexing and demultiplexing multiple wavelengths of light onto optical waveguides, as well as modulating light and functioning as photodetectors, in a very small chip area (for example 10 micrometer diameter per microring resonator). The IP building blocks on the chip are also dense because the electrical circuitry that controls the optical devices is closely integrated on the same chip with the optical devices that they control, making it possible to optimize space efficiency.

In various embodiments, the optical macros 305-1 to 305-N within the TeraPHY optical I/O chiplet 107 can be configured in different ways with regard to optical path layouts (placement, orientation, shape, size, etc., of optical waveguides and microring resonators), routing floorplans (electrical signal routing and/or optical signal routing), and organization of electronic-photonic components and circuitry (e.g., transmit (Tx) slices 701-1 to 701-M, receive (Rx) slices 703-1 to 703-M, clock spline circuitry, electrical interface glue circuitry, phase-lock-loop circuitry, etc.). FIGS. 9 through 16 show various example optical macro 305-1 to 305-N configuration embodiments within the TeraPHY optical I/O chiplet 107 with regard to optical path layouts, routing floorplans, and organization of electronic-photonic components and circuitry. For deeply-scaled planar electrical fabrication processes, such as, but not limited to, 45 nanometer (nm) fabrication technology node processes, the orientation (the long edge) of the transistor gate electrode layer is fixed across the wafer. In some embodiments, the example optical macro 305-1 to 305-N configurations described with regard to FIGS. 9 through 16 assume that the wafer orientation is set such that the longer edges of the gate electrode structures within the gate electrode layer extend in a North-South direction. While FIGS. 9 through 16 show some example optical macro 305-1 to 305-N configuration embodiments for implementation within the TeraPHY optical I/O chiplet 107, it should be understood that various permutations of these optical macro 305-1 to 305-N configuration embodiments are possible and valid. For example, any of the example optical macro 305-1 to 305-N configuration embodiments of FIGS. 9 through 16 can be rotated to essentially any angle (relative to the North-South direction across the wafer) and/or implemented in a mirrored configuration (North-South and/or East-West) from what is shown in FIGS. 9 through 16. Also, in various embodiments, any of the example optical macro 305-1 to 305-N configuration embodiments of FIGS. 9 through 16 can be modified with regard to lengths of optical waveguide segments, curvatures of optical waveguide segments, relative positioning between microring resonators and optical waveguides, relative positioning between microring resonators along a given optical waveguide, number of microring resonators along a given optical waveguide, relative positioning between electronic control circuitry and corresponding microring resonators, among other parameters.

In various embodiments, the gate electrode layer of the TeraPHY optical I/O chiplet 107 (and of the wafer in general) includes gate electrode structures formed of polysilicon, metal, and/or essentially any other material that can be used as the gate electrode of a field effect transistor (e.g., metal-oxide-semiconductor field effect transistor (MOSFET) or junction field effect transistor (JFET)), bipolar junction transistor (BJT), and/or other type of transistor device. It should be understood that the various optical macro 305-1 to 305-N configuration embodiments described herein, such as with regard to FIGS. 7 and 9 through 16, can be fabricated using essentially any semiconductor manufacturing process, and are particularly well-suited for fabrication using CMOS semiconductor manufacturing processes. Also, the various optical macro 305-1 to 305-N configuration embodiments described herein can be implemented independent of whether the transistors formed within the TeraPHY optical I/O chiplet 107 are planar transistors, FinFET transistors, nanowire-FET transistors, silicon-on-insulator transistors, and/or any other type of transistor. Also, the various optical macro 305-1 to 305-N configuration embodiments described herein can be implemented with the photonic components (optical waveguides, microring resonators, etc.) formed in the body silicon of the TeraPHY optical I/O chiplet 107, deposited as polysilicon structures within the TeraPHY optical I/O chiplet 107, and/or formed as structures in another optically enabled layer of the TeraPHY optical I/O chiplet 107.

The various example optical macro 305-x configuration embodiments of FIGS. 7 and 9 through 16 show the routing of optical waveguides, relative locations of optical microring resonators, and relative locations of circuits/electronics. It should be understood that in various embodiments the optical microrings shown in the example optical macro 305-x configurations of FIGS. 9 through 16 can be controlled to operate as optical modulators, optical multiplexers, optical photodetectors, optical demultiplexers, optical add/drop filters, and/or as any other optical component that is implementable as an optical microring resonator. The various optical macro 305-x configuration embodiments of FIGS. 7 and 9 through 16 show examples of various optical path layouts (optical waveguide paths) and microring resonator organizations that: 1) optimize the interconnect parasitics between driver/receiver electronic circuits and photonic components, 2) optimize the global macro clock distribution, and 3) optimize the time-of-flight path length mismatch between the optical macro 305-x coupling points and receiver photodetectors.

Figure 9:
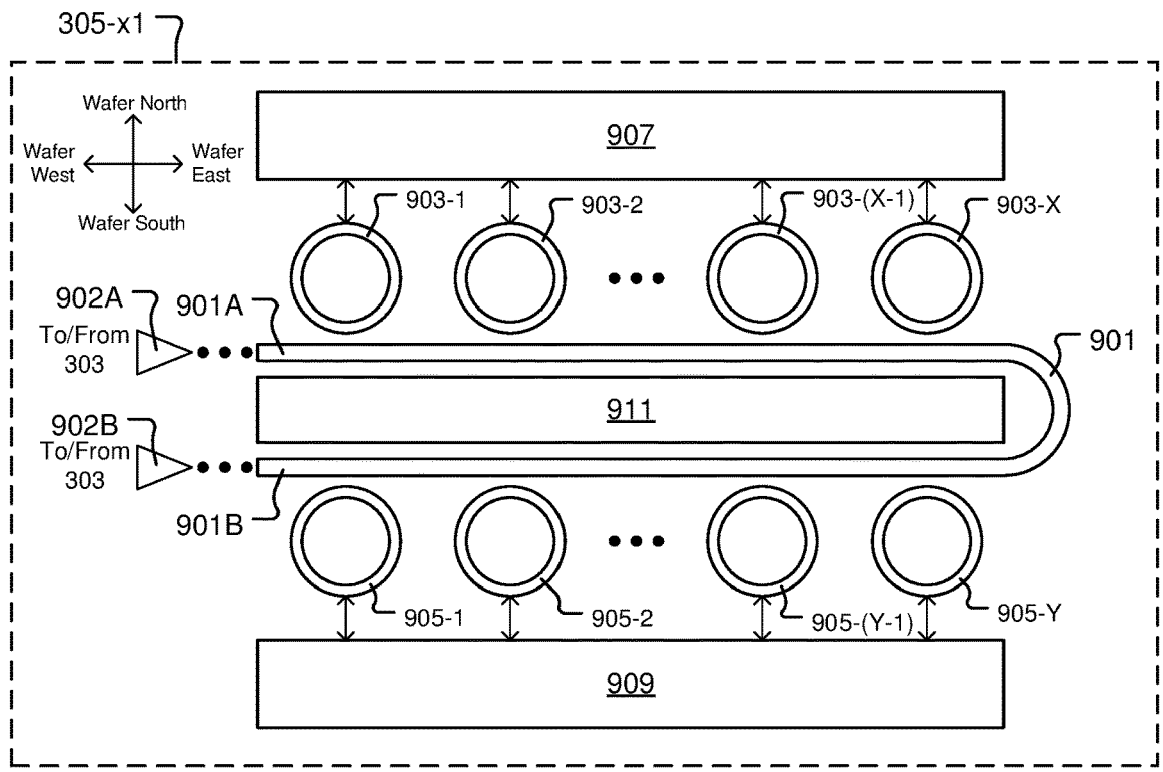
FIG. 9 shows an example optical path layout of an optical macro for data input/output to/from the TeraPHY optical I/O chiplet, where the optical path layout includes a U-shaped optical waveguide, in accordance with some embodiments.

FIG. 9 shows an example optical path layout of an optical macro 305-x1 for data input/output to/from the TeraPHY optical I/O chiplet 107, where the optical path layout includes a U-shaped optical waveguide 901, in accordance with some embodiments. The optical waveguide 901 includes a first horizontal (East-West oriented) segment 901A, a curved segment 901B, and a second horizontal (East-West oriented) segment 901C. In some embodiments, the curved segment 901B curves around about 180 degrees from the first horizontal segment 901A to the second horizontal segment 901C, vice-versa. The first horizontal segment 901A is optically connected to a first optical port 902A, and the second horizontal segment 901B is optically connected to a second optical port 902B. In various embodiments, the first optical port 902A is formed as a vertical optical grating coupler or a horizontal (edge) optical grating coupler. Also, in various embodiments, the second optical port 902B is formed as a vertical optical grating coupler or a horizontal (edge) optical grating coupler.

In some embodiments, the first horizontal segment 901A, the curved segment 901B, and the second horizontal segment 901C of the optical waveguide 901 are formed of a same material, such as silicon, polysilicon, silicon nitride, or any other material suitable for use as an optical waveguide. In some embodiments, any one or more of the first horizontal segment 901A, the curved segment 901B, and the second horizontal segment 901C of the optical waveguide 901 is/are formed of a different material than one or more others of the first horizontal segment 901A, the curved segment 901B, and the second horizontal segment 901C of the optical waveguide 901, such that the optical waveguide 901 is formed as a combination of materials, e.g., a combination of two or more of silicon, polysilicon, silicon nitride, and/or any other material suitable for use as an optical waveguide. Also, in some embodiments, each of the first horizontal segment 901A, the curved segment 901B, and the second horizontal segment 901C of the optical waveguide 901 is formed to have a substantially similar vertical cross-section shape. However, in some embodiments, any one or more of the first horizontal segment 901A, the curved segment 901B, and the second horizontal segment 901C of the optical waveguide 901 is/are formed to have a different vertical cross-section shape than one or more others of the first horizontal segment 901A, the curved segment 901B, and the second horizontal segment 901C of the optical waveguide 901. Also, in some embodiments, any one or more of the first horizontal segment 901A, the curved segment 901B, and the second horizontal segment 901C of the optical waveguide 901 is/are formed to have a vertical cross-section shape that varies along its length in the direction of light propagation through the optical waveguide 901.

The optical macro 305-x1 includes optical microring resonators 903-1 to 903-X (where X is an integer greater than zero) that are optically coupled to the first horizontal segment 901A of the U-shaped optical waveguide 901, such that light traveling through the optical waveguide 901 can be evanescently coupled into the optical microring resonators 903-1 to 903-X, and such that light traveling through the optical microring resonators 903-1 to 903-X can be evanescently coupled into the optical waveguide 901. The optical macro 305-x1 also includes optical microring resonators 905-1 to 905-Y (where Y is an integer greater than zero) that are optically coupled to the second horizontal segment 901C of the U-shaped optical waveguide 901, such that light traveling through the optical waveguide 901 can be evanescently coupled into the optical microring resonators 905-1 to 905-Y, and such that light traveling through the optical microring resonators 905-1 to 905-Y can be evanescently coupled into the optical waveguide 901. The optical macro 305-x1 shows a particular example of an optical layout in which each of the optical microring resonators 903-1 to 903-X and 905-1 to 905-Y is optically coupled to one of the two horizontal segments 901A and 901C of the U-shaped optical waveguide 901. Also, in the optical layout of the optical macro 305-x1, each of the optical microring resonators 903-1 to 903-X and 905-1 to 905-Y is positioned along an outer side/edge of the U-shaped optical waveguide 901. In some embodiments, the optical microring resonators 903-1 to 903-X and 905-1 to 905-Y are positioned relative to the optical waveguide 901 such that a respective minimum separation distance between each of the optical microring resonators 903-1 to 903-X and 905-1 to 905-Y and the optical waveguide 901 is substantially the same. However, in some embodiments, the optical microring resonators 903-1 to 903-X and 905-1 to 905-Y are positioned relative to the optical waveguide 901 such that multiple different minimum separation distances exist between different ones of the optical microring resonators 903-1 to 903-X and 905-1 to 905-Y and the optical waveguide 901.

In various embodiments, the optical microring resonators 903-1 to 903-X are positioned at a substantially constant pitch (center-to-center spacing) with respect to each other. However, in other embodiments, the optical microring resonators 903-1 to 903-X are not positioned at a substantially constant pitch with respect to each other. Also, in various embodiments, the optical microring resonators 905-1 to 905-Y are positioned at a substantially constant pitch with respect to each other. However, in other embodiments, the optical microring resonators 905-1 to 905-Y are not positioned at a substantially constant pitch with respect to each other. In some embodiments, the pitch between adjacently positioned ones of the optical microring resonators 903-1 to 903-X and 905-1 to 905-Y is set at a distance that avoids evanescent coupling of light between the adjacently positioned ones of the optical microring resonators 903-1 to 903-X and 905-1 to 905-Y. In some embodiments, the pitch between adjacently positioned ones of the optical microring resonators 903-1 to 903-X and 905-1 to 905-Y is minimized while ensuring that evanescent coupling of light does not occur between adjacently positioned ones of the optical microring resonators 903-1 to 903-X and 905-1 to 905-Y. In some embodiments, each of the optical microring resonators 903-1 to 903-X and 905-1 to 905-Y has an outer diameter greater than zero and less than or equal to about 50 micrometers. In some embodiments, each of the optical microring resonators 903-1 to 903-X and 905-1 to 905-Y has an outer diameter greater than zero and less than or equal to about 40 micrometers. In some embodiments, each of the optical microring resonators 903-1 to 903-X and 905-1 to 905-Y has an outer diameter greater than zero and less than or equal to about 30 micrometers. In some embodiments, each of the optical microring resonators 903-1 to 903-X and 905-1 to 905-Y has an outer diameter greater than zero and less than or equal to about 20 micrometers. In some embodiments, each of the optical microring resonators 903-1 to 903-X and 905-1 to 905-Y has an outer diameter greater than zero and less than or equal to about 10 micrometers.

The optical microring resonators 903-1 to 903-X are interfaced with electronic control circuitry 907. The optical microring resonators 905-1 to 905-Y are interfaced with electronic control circuitry 909. In some embodiments, the electronic control circuitry 907 and 909 includes transmit (Tx) slice circuitry for independently controlling one or more of the microring resonators 903-1 to 903-X and 905-1 to 905-Y as an optical modulator to optically modulate light at a given wavelength to generate a light stream at the given wavelength within the optical waveguide 901, where the light stream conveys digital data. In some embodiments, the electronic control circuitry 907 and 909 includes receive (Rx) slice circuitry for independently controlling one or more of the microring resonators 903-1 to 903-X and 905-1 to 905-Y as an optical receiver, e.g., photodetector, to detect a modulated light stream at a given wavelength within the optical waveguide 901 to enable generation of electrical signals representing digital data conveyed by the modulated light stream at the given wavelength. In some embodiments, the electronic control circuitry 907 and 909 includes circuitry for directing one or more of the microring resonators 903-1 to 903-X and 905-1 to 905-Y to operate as an add/drop filter for multiplexing/demultiplexing of optical signals within the optical waveguide 901. In some embodiments, the electronic control circuitry 907 and 909 includes circuitry for controlling heating devices respectively associated with one or more of the microring resonators 903-1 to 903-X and 905-1 to 905-Y to enable thermal tuning of the one or more of the microring resonators 903-1 to 903-X and 905-1 to 905-Y to operate at a particular resonant optical wavelength. Also, in some embodiments, electronics 911 are formed within the inner region of the U-shaped optical waveguide 901, where the electronics 911 support operation of the optical macro 305-x1. In some embodiments, the electronics 911 include clock signal generation and transmission circuitry, I/Q signal generation circuitry, ILO circuitry, PI circuitry, TIA circuitry, signal EQ circuitry, and/or other types of circuitry for supporting operation of the optical macro 305-x1.

In some embodiments, the optical path layout of the optical macro 305-x1 is optimized by minimizing a length of the optical waveguide 901 within the optical macro 305-x1. The length of the optical waveguide 901 within the optical macro 305-x1 is minimized by having the optical microring resonators 903-1 to 903-X and 905-1 to 905-Y respectively positioned along both the first horizontal segment 901A and the second horizontal segment 901C of the optical waveguide 901, reducing/constraining the pitch of the optical microring resonators 903-1 to 903-X and 905-1 to 905-Y, and having the first and second optical ports 902A and 902B of the optical waveguide 901 located on the same side of the optical macro 305-*x*1. However, it should be understood that in other embodiments, the optical path layout of the optical macro 305-*x*1 is configured to have all of the optical microring resonators 903-1 to 903-X and 905-1 to 905-Y positioned along a same side of the optical waveguide 901, e.g. along either the first horizontal segment 901A or the second horizontal segment 901C.

Figure 10:
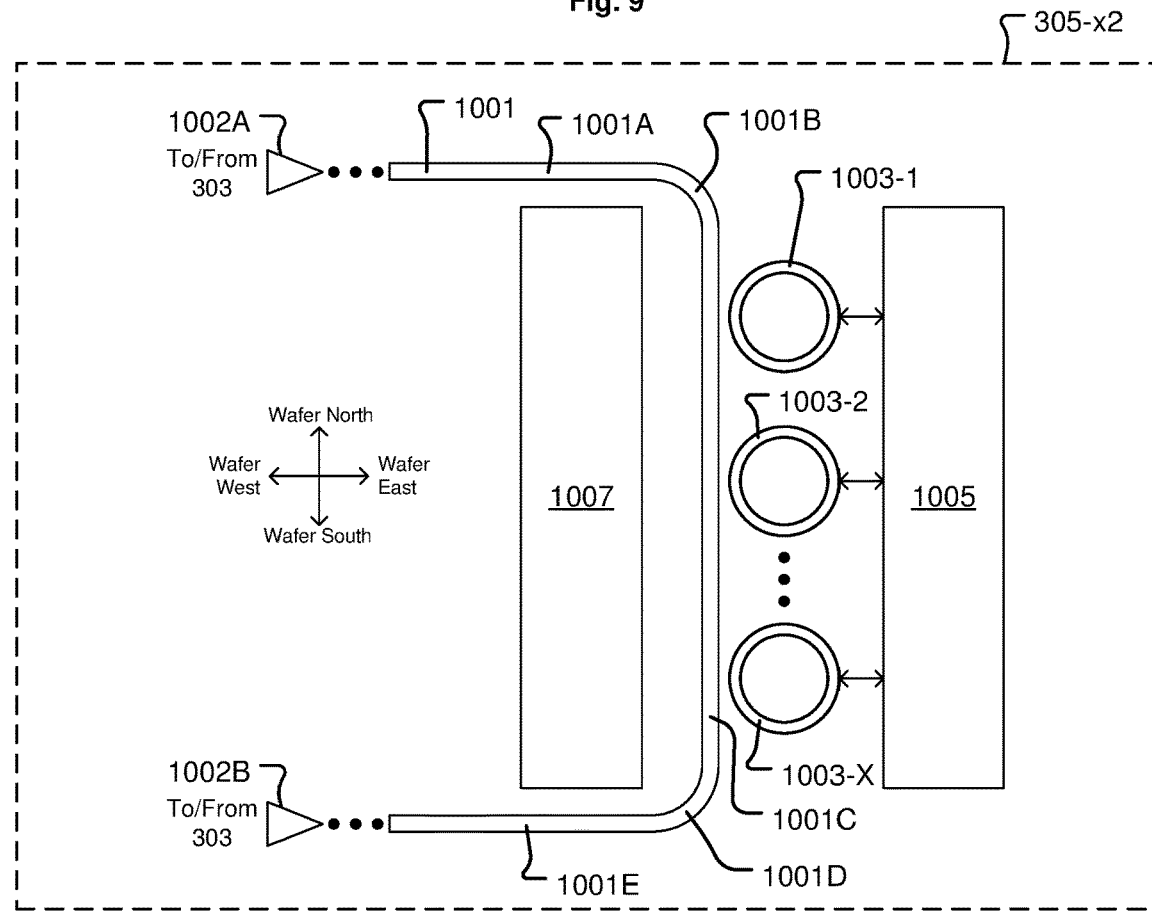
FIG. 10 shows an example optical path layout of an optical macro for data input/output to/from the TeraPHY optical I/O chiplet, where the optical path layout includes a C-shaped optical waveguide, in accordance with some embodiments.

FIG. 10 shows an example optical path layout of an optical macro 305-*x*2 for data input/output to/from the TeraPHY optical I/O chiplet 107, where the optical path layout includes a C-shaped optical waveguide 1001, in accordance with some embodiments. The C-shaped optical waveguide 1001 includes a first horizontal (East-West oriented) segment 1001A, a first curved segment 1001B, a vertical (North-South oriented) segment 1001C, a second curved segment 1001D, and a second horizontal (East-West oriented) segment 1001E. In some embodiments, the first curved segment 1001B curves around about 90 degrees from the first horizontal segment 1001A to the vertical segment 1001C, vice-versa. In some embodiments, the second curved segment 1001D curves around about 90 degrees from the vertical segment 1001C to the second horizontal segment 1001E, vice-versa. The first horizontal segment 1001A is optically connected to a first optical port 1002A, and the second horizontal segment 1001E is optically connected to a second optical port 1002B. In various embodiments, the first optical port 1002A is formed as a vertical optical grating coupler or a horizontal (edge) optical grating coupler. Also, in various embodiments, the second optical port 1002B is formed as a vertical optical grating coupler or a horizontal (edge) optical grating coupler.

In some embodiments, the first horizontal segment 1001A, the first curved segment 1001B, the vertical segment 1001C, the second curved segment 1001D, and the second horizontal segment 1001E of the optical waveguide 1001 are formed of a same material, such as silicon, polysilicon, silicon nitride, or any other material suitable for use as an optical waveguide. In some embodiments, any one or more of the first horizontal segment 1001A, the first curved segment 1001B, the vertical segment 1001C, the second curved segment 1001D, and the second horizontal segment 1001E of the optical waveguide 1001 is/are formed of a different material than one or more others of the first horizontal segment 1001A, the first curved segment 1001B, the vertical segment 1001C, the second curved segment 1001D, and the second horizontal segment 1001E of the optical waveguide 1001, such that the optical waveguide 1001 is formed as a combination of materials, e.g., a combination of two or more of silicon, polysilicon, silicon nitride, and/or any other material suitable for use as an optical waveguide. Also, in some embodiments, each of the first horizontal segment 1001A, the first curved segment 1001B, the vertical segment 1001C, the second curved segment 1001D, and the second horizontal segment 1001E of the optical waveguide 1001 is formed to have a substantially similar vertical cross-section shape. However, in some embodiments, any one or more of the first horizontal segment 1001A, the first curved segment 1001B, the vertical segment 1001C, the second curved segment 1001D, and the second horizontal segment 1001E of the optical waveguide 1001 is/are formed to have a different vertical cross-section shape than one or more others of the first horizontal segment 1001A, the first curved segment 1001*i*, the vertical segment 1001C, the second curved segment 1001D, and the second horizontal segment 1001E of the optical waveguide 1001. Also, in some embodiments, any one or more of the first horizontal segment 1001A, the first curved segment 1001*i*, the vertical segment 1001C, the second curved segment 1001D, and the second horizontal segment 1001E of the optical waveguide 1001 is/are formed to have a vertical cross-section shape that varies along its length in the direction of light propagation through the optical waveguide 1001.

The optical macro 305-*x*2 includes optical microring resonators 1003-1 to 1003-X (where X is an integer greater than zero) that are optically coupled to the vertical segment 1001C of the C-shaped optical waveguide 1001, such that light traveling through the optical waveguide 1001 can be evanescently coupled into the optical microring resonators 1003-1 to 1003-X, and such that light traveling through the optical microring resonators 1003-1 to 1003-X can be evanescently coupled into the optical waveguide 1001. In some embodiments, the optical macro 305-*x*2 does not have any microring resonator optically coupled to either the first horizontal segment 1001A, the first curved segment 1001B, the second curved segment 1001D, or the second horizontal segment 1001E of the C-shaped optical waveguide 1001. In some embodiments, all microring resonators, e.g., 1003-1 to 1003-X, within the optical macro 305-*x*2 are optically coupled to the vertical segment 1001C of the C-shaped optical waveguide 1001. In some embodiments, each of the optical microring resonators 1003-1 to 1003-X is positioned along a same side/edge the vertical segment 1001C of the C-shaped optical waveguide 1001. For example, FIG. 10 shows each of the optical microring resonators 1003-1 to 1003-X positioned along the outer side/edge of the vertical segment 1001C of the C-shaped optical waveguide 1001. In the example embodiment of FIG. 10, the first curved segment 1001B and the second curved segment 1001D are oriented such that the first optical port 1002A and the second optical port 1002B are located on a left side (West side) of the optical macro 305-*x*2. However, in some alternative embodiments, the first curved segment 1001B and the second curved segment 1001D are oriented (flipped horizontally) such that the first optical port 1002A and the second optical port 1002B are located on a right side (East side) of the optical macro 305-*x*2. In these alternative embodiments, each of the optical microring resonators 1003-1 to 1003-X is positioned along the inner side/edge of the vertical segment 1001C of the C-shaped optical waveguide 1001.

In some embodiments, the optical microring resonators 1003-1 to 1003-X are positioned relative to the optical waveguide 1001 such that a respective minimum separation distance between each of the optical microring resonators 1003-1 to 1003-X and the optical waveguide 1001 is substantially the same. However, in some embodiments, the optical microring resonators 1003-1 to 1003-X are positioned relative to the optical waveguide 1001 such that multiple different minimum separation distances exist between different ones of the optical microring resonators 1003-1 to 1003-X and the optical waveguide 1001. In various embodiments, the optical microring resonators 1003-1 to 1003-X are positioned at a substantially constant pitch with respect to each other. However, in other embodiments, the optical microring resonators 1003-1 to 1003-X are not positioned at a substantially constant pitch with respect to each other. In some embodiments, the pitch between adjacently positioned ones of the optical microring resonators 1003-1 to 1003-X is set at a distance that avoids evanescent coupling of light between the adjacently positioned ones of the optical microring resonators 1003-1 to 1003-X. In some embodiments, the pitch between adjacently positioned ones of the optical microring resonators 1003-1 to 1003-X is minimized while ensuring that evanescent coupling of light does not occur between adjacently positioned ones of the optical microring resonators 1003-1 to 1003-X. In some embodiments, the optical path layout of the optical macro **305-*x*2 is optimized by minimizing a length of the optical waveguide 1001 within the optical macro 305-*x*2. The length of the optical waveguide 1001 within the optical macro 305-*x*2 is minimized by reducing/constraining the pitch of the optical microring resonators 1003-1 to 1003-X, and having the first and second optical ports 1002A and 1002B of the optical waveguide 1001 located on the same side of the optical macro 305-*x*2**.

In some embodiments, each of the optical microring resonators 1003-1 to 1003-X has an outer diameter greater than zero and less than or equal to about 50 micrometers. In some embodiments, each of the optical microring resonators 1003-1 to 1003-X has an outer diameter greater than zero and less than or equal to about 40 micrometers. In some embodiments, each of the optical microring resonators 1003-1 to 1003-X has an outer diameter greater than zero and less than or equal to about 30 micrometers. In some embodiments, each of the optical microring resonators 1003-1 to 1003-X has an outer diameter greater than zero and less than or equal to about 20 micrometers. In some embodiments, each of the optical microring resonators 1003-1 to 1003-X has an outer diameter greater than zero and less than or equal to about 10 micrometers.

The optical microring resonators 1003-1 to 1003-X are interfaced with electronic control circuitry 1005. In some embodiments, the electronic control circuitry 1005 includes transmit (Tx) slice circuitry for independently controlling one or more of the microring resonators 1003-1 to 1003-X as an optical modulator to optically modulate light at a given wavelength to generate a light stream at the given wavelength within the optical waveguide 1001, where the light stream conveys digital data. In some embodiments, the electronic control circuitry 1005 includes receive (Rx) slice circuitry for independently controlling one or more of the microring resonators 1003-1 to 1003-X as an optical receiver, e.g., photodetector, to detect a modulated light stream at a given wavelength within the optical waveguide 1001 to enable generation of electrical signals representing digital data conveyed by the modulated light stream at the given wavelength. In some embodiments, the electronic control circuitry 1005 includes circuitry for directing one or more of the microring resonators 1003-1 to 1003-X to operate as an add/drop filter for multiplexing/demultiplexing of optical signals within the optical waveguide 1001. In some embodiments, the electronic control circuitry 1005 includes circuitry for controlling heating devices respectively associated with one or more of the microring resonators 1003-1 to 1003-X to enable thermal tuning of the one or more of the microring resonators 1003-1 to 1003-X to operate at a particular resonant optical wavelength. Also, in some embodiments, electronics 1007 are formed within the inner region of the C-shaped optical waveguide 1001, where the electronics 1007 support operation of the optical macro **305-*x*2. In some embodiments, the electronics 1007 include clock signal generation and transmission circuitry, I/Q signal generation circuitry, ILO circuitry, PI circuitry, TIA circuitry, signal EQ circuitry, and/or other types of circuitry for supporting operation of the optical macro 305-*x*2**.

Figure 11:
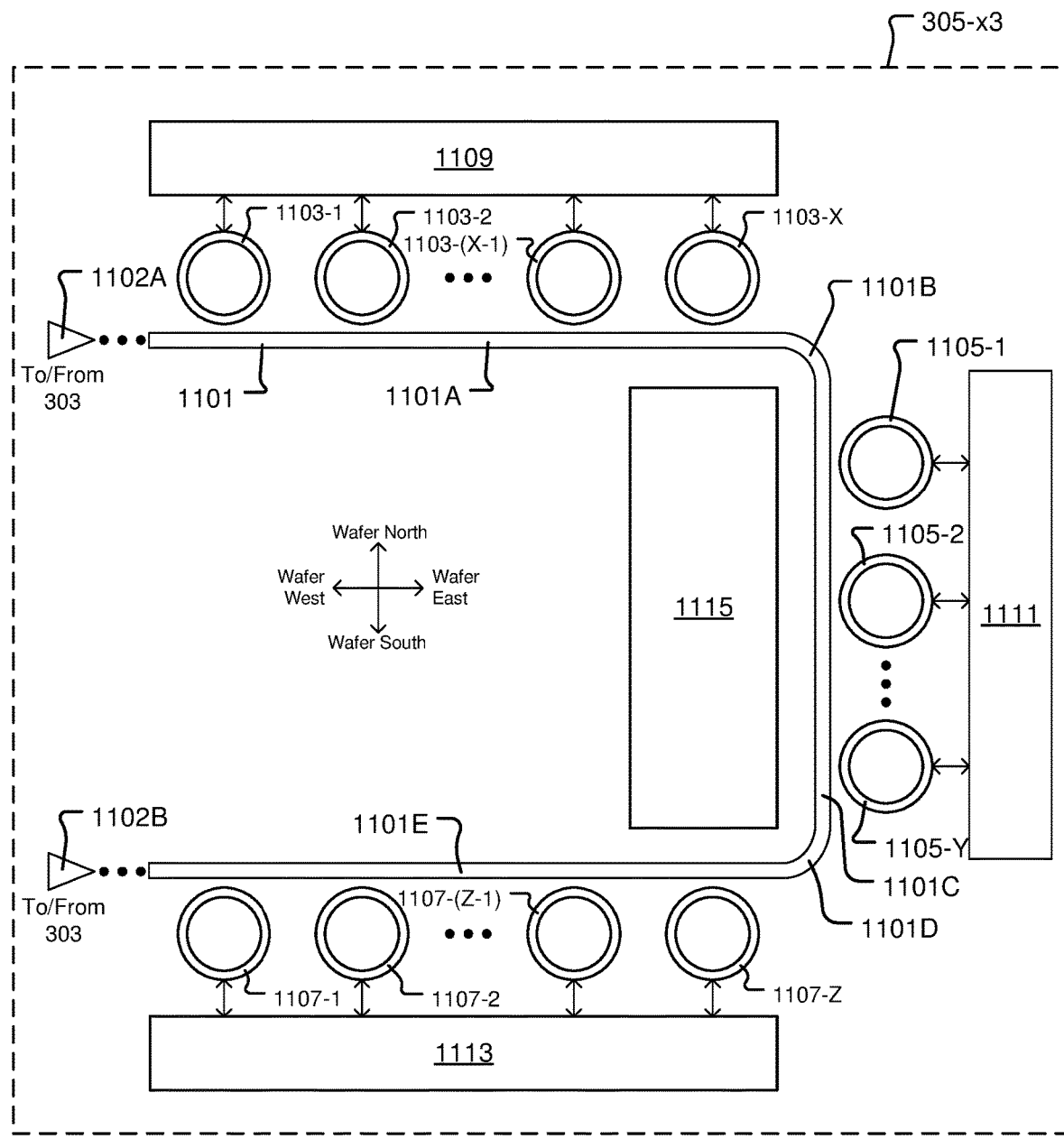
FIG. 11 shows an example optical path layout of an optical macro for data input/output to/from the TeraPHY optical I/O chiplet, where the optical path layout includes a C-shaped optical waveguide, in accordance with some embodiments.

FIG. 11 shows an example optical path layout of an optical macro **305-*x*3 for data input/output to/from the TeraPHY optical I/O chiplet 107, where the optical path layout includes a C-shaped optical waveguide 1101, in accordance with some embodiments. The C-shaped optical waveguide 1101 includes a first horizontal (East-West oriented) segment 1101A, a first curved segment 1101B, a vertical (North-South oriented) segment 1101C, a second curved segment 1101D, and a second horizontal (East-West oriented) segment 1101E. In some embodiments, the first curved segment 1101B curves around about 90 degrees from the first horizontal segment 1101A to the vertical segment 1101C, vice-versa. In some embodiments, the second curved segment 1101D curves around about 90 degrees from the vertical segment 1101C to the second horizontal segment 1101E, vice-versa. The first horizontal segment 1101A is optically connected to a first optical port 1102A, and the second horizontal segment 1101E is optically connected to a second optical port 1102B. In various embodiments, the first optical port 1102A is formed as a vertical optical grating coupler or a horizontal (edge) optical grating coupler. Also, in various embodiments, the second optical port 1102B** is formed as a vertical optical grating coupler or a horizontal (edge) optical grating coupler.

In some embodiments, the first horizontal segment 1101A, the first curved segment 1101B, the vertical segment 1101C, the second curved segment 1101D, and the second horizontal segment 1101E of the optical waveguide 1101 are formed of a same material, such as silicon, polysilicon, silicon nitride, or any other material suitable for use as an optical waveguide. In some embodiments, any one or more of the first horizontal segment 1101A, the first curved segment 1101B, the vertical segment 1101C, the second curved segment 1101D, and the second horizontal segment 1101E of the optical waveguide 1101 is/are formed of a different material than one or more others of the first horizontal segment 1101A, the first curved segment 1101B, the vertical segment 1101C, the second curved segment 1101D, and the second horizontal segment 1101E of the optical waveguide 1101, such that the optical waveguide 1101 is formed as a combination of materials, e.g., a combination of two or more of silicon, polysilicon, silicon nitride, and/or any other material suitable for use as an optical waveguide. Also, in some embodiments, each of the first horizontal segment 1101A, the first curved segment 1101B, the vertical segment 1101C, the second curved segment 1101D, and the second horizontal segment 1101E of the optical waveguide 1101 is formed to have a substantially similar vertical cross-section shape. However, in some embodiments, any one or more of the first horizontal segment 1101A, the first curved segment 1101B, the vertical segment 1101C, the second curved segment 1101D, and the second horizontal segment 1101E of the optical waveguide 1101 is/are formed to have a different vertical cross-section shape than one or more others of the first horizontal segment 1101A, the first curved segment 1101B, the vertical segment 1101C, the second curved segment 1101D, and the second horizontal segment 1101E of the optical waveguide 1101. Also, in some embodiments, any one or more of the first horizontal segment 1101A, the first curved segment 1101B, the vertical segment 1101C, the second curved segment 1101D, and the second horizontal segment 1101E of the optical waveguide 1101 is/are formed to have a vertical cross-section shape that varies along its length in the direction of light propagation through the optical waveguide 1101.

The optical macro 305-x3 includes optical microring resonators 1103-1 to 1103-X (where X is an integer greater than zero) that are optically coupled to the first horizontal segment 1101A of the C-shaped optical waveguide 1101, such that light traveling through the optical waveguide 1101 can be evanescently coupled into the optical microring resonators 1103-1 to 1103-X, and such that light traveling through the optical microring resonators 1103-1 to 1103-X can be evanescently coupled into the optical waveguide 1101. The optical macro 305-x3 includes optical microring resonators 1105-1 to 1105-Y (where Y is an integer greater than zero) that are optically coupled to the vertical segment 1101C of the C-shaped optical waveguide 1101, such that light traveling through the optical waveguide 1101 can be evanescently coupled into the optical microring resonators 1105-1 to 1105-Y, and such that light traveling through the optical microring resonators 1105-1 to 1105-Y can be evanescently coupled into the optical waveguide 1101. The optical macro 305-x3 also includes optical microring resonators 1107-1 to 1107-Z (where Z is an integer greater than zero) that are optically coupled to the second horizontal segment 1101E of the C-shaped optical waveguide 1101, such that light traveling through the optical waveguide 1101 can be evanescently coupled into the optical microring resonators 1107-1 to 1107-Z, and such that light traveling through the optical microring resonators 1107-1 to 1107-Z can be evanescently coupled into the optical waveguide 1101. In the optical layout of the optical macro 305-x3, each of the optical microring resonators 1103-1 to 1103-X, 1105-1 to 1105-Y, and 1107-1 to 1107-Z is positioned along an outer side/edge of the C-shaped optical waveguide 1101. In some embodiments, the optical microring resonators 1103-1 to 1103-X, 1105-1 to 1105-Y, and 1107-1 to 1107-Z are positioned relative to the optical waveguide 1101 such that a respective minimum separation distance between each of the optical microring resonators 1103-1 to 1103-X, 1105-1 to 1105-Y, and 1107-1 to 1107-Z and the optical waveguide 1101 is substantially the same. However, in some embodiments, the optical microring resonators 1103-1 to 1103-X, 1105-1 to 1105-Y, and 1107-1 to 1107-Z are positioned relative to the optical waveguide 1101 such that multiple different minimum separation distances exist between different ones of the optical microring resonators 1103-1 to 1103-X, 1105-1 to 1105-Y, and 1107-1 to 1107-Z and the optical waveguide 1101.

In various embodiments, the optical microring resonators 1103-1 to 1103-X are positioned at a substantially constant pitch with respect to each other. However, in other embodiments, the optical microring resonators 1103-1 to 1103-X are not positioned at a substantially constant pitch with respect to each other. In some embodiments, the pitch between adjacently positioned ones of the optical microring resonators 1103-1 to 1103-X is set at a distance that avoids evanescent coupling of light between the adjacently positioned ones of the optical microring resonators 1103-1 to 1103-X. In some embodiments, the pitch between adjacently positioned ones of the optical microring resonators 1103-1 to 1103-X is minimized while ensuring that evanescent coupling of light does not occur between adjacently positioned ones of the optical microring resonators 1103-1 to 1103-X.

In various embodiments, the optical microring resonators 1105-1 to 1105-Y are positioned at a substantially constant pitch with respect to each other. However, in other embodiments, the optical microring resonators 1105-1 to 1105-Y are not positioned at a substantially constant pitch with respect to each other. In some embodiments, the pitch between adjacently positioned ones of the optical microring resonators 1105-1 to 1105-Y is set at a distance that avoids evanescent coupling of light between the adjacently positioned ones of the optical microring resonators 1105-1 to 1105-Y. In some embodiments, the pitch between adjacently positioned ones of the optical microring resonators 1105-1 to 1105-Y is minimized while ensuring that evanescent coupling of light does not occur between adjacently positioned ones of the optical microring resonators 1105-1 to 1105-Y.

In various embodiments, the optical microring resonators 1107-1 to 1107-Z are positioned at a substantially constant pitch with respect to each other. However, in other embodiments, the optical microring resonators 1107-1 to 1107-Z are not positioned at a substantially constant pitch with respect to each other. In some embodiments, the pitch between adjacently positioned ones of the optical microring resonators 1107-1 to 1107-Z is set at a distance that avoids evanescent coupling of light between the adjacently positioned ones of the optical microring resonators 1107-1 to 1107-Z. In some embodiments, the pitch between adjacently positioned ones of the optical microring resonators 1107-1 to 1107-Z is minimized while ensuring that evanescent coupling of light does not occur between adjacently positioned ones of the optical microring resonators 1107-1 to 1107-Z.

In some embodiments, the optical path layout of the optical macro 305-x3 is optimized by minimizing a length of the optical waveguide 1101 within the optical macro 305-x3. The length of the optical waveguide 1001 within the optical macro 305-x3 is minimized by reducing/constraining the pitch of the optical microring resonators 1103-1 to 1103-X, reducing/constraining the pitch of the optical microring resonators 1105-1 to 1105-Y, reducing/constraining the pitch of the optical microring resonators 1107-1 to 1107-Z, and having the first and second optical ports 1102A and 1102B of the optical waveguide 1001 located on the same side of the optical macro 305-x3. In some embodiments, each of the optical microring resonators 1103-1 to 1103-X, 1105-1 to 1105-Y, and 1107-1 to 1107-Z has an outer diameter greater than zero and less than or equal to about 50 micrometers. In some embodiments, each of the optical microring resonators 1103-1 to 1103-X, 1105-1 to 1105-Y, and 1107-1 to 1107-Z has an outer diameter greater than zero and less than or equal to about 40 micrometers. In some embodiments, each of the optical microring resonators 1103-1 to 1103-X, 1105-1 to 1105-Y, and 1107-1 to 1107-Z has an outer diameter greater than zero and less than or equal to about 30 micrometers. In some embodiments, each of the optical microring resonators 1103-1 to 1103-X, 1105-1 to 1105-Y, and 1107-1 to 1107-Z has an outer diameter greater than zero and less than or equal to about 20 micrometers. In some embodiments, each of the optical microring resonators 1103-1 to 1103-X, 1105-1 to 1105-Y, and 1107-1 to 1107-Z has an outer diameter greater than zero and less than or equal to about 10 micrometers.

The optical microring resonators 1103-1 to 1103-X are interfaced with electronic control circuitry 1109. In some embodiments, the electronic control circuitry 1109 includes transmit (Tx) slice circuitry for independently controlling one or more of the microring resonators 1103-1 to 1103-X as an optical modulator to optically modulate light at a given wavelength to generate a light stream at the given wavelength within the optical waveguide 1101, where the light stream conveys digital data. In some embodiments, the electronic control circuitry 1109 includes receive (Rx) slice circuitry for independently controlling one or more of the microring resonators 1103-1 to 1103-X as an optical receiver, e.g., photodetector, to detect a modulated light stream at a given wavelength within the optical waveguide 1101 to enable generation of electrical signals representing digital data conveyed by the modulated light stream at the given wavelength. In some embodiments, the electronic control circuitry 1109 includes circuitry for directing one or more of the microring resonators 1103-1 to 1103-X to operate as an add/drop filter for multiplexing/demultiplexing of optical signals within the optical waveguide 1101. In some embodiments, the electronic control circuitry 1109 includes circuitry for controlling heating devices respectively associated with one or more of the microring resonators 1103-1 to 1103-X to enable thermal tuning of the one or more of the microring resonators 1103-1 to 1103-X to operate at a particular resonant optical wavelength.

The optical microring resonators 1105-1 to 1105-Y are interfaced with electronic control circuitry 1111. In some embodiments, the electronic control circuitry 1111 includes transmit (Tx) slice circuitry for independently controlling one or more of the microring resonators 1105-1 to 1105-Y as an optical modulator to optically modulate light at a given wavelength to generate a light stream at the given wavelength within the optical waveguide 1101, where the light stream conveys digital data. In some embodiments, the electronic control circuitry 1111 includes receive (Rx) slice circuitry for independently controlling one or more of the microring resonators 1105-1 to 1105-Y as an optical receiver, e.g., photodetector, to detect a modulated light stream at a given wavelength within the optical waveguide 1101 to enable generation of electrical signals representing digital data conveyed by the modulated light stream at the given wavelength. In some embodiments, the electronic control circuitry 1111 includes circuitry for directing one or more of the microring resonators 1105-1 to 1105-Y to operate as an add/drop filter for multiplexing/demultiplexing of optical signals within the optical waveguide 1101. In some embodiments, the electronic control circuitry 1111 includes circuitry for controlling heating devices respectively associated with one or more of the microring resonators 1105-1 to 1105-Y to enable thermal tuning of the one or more of the microring resonators 1105-1 to 1105-Y to operate at a particular resonant optical wavelength.

The optical microring resonators 1107-1 to 1107-Z are interfaced with electronic control circuitry 1113. In some embodiments, the electronic control circuitry 1113 includes transmit (Tx) slice circuitry for independently controlling one or more of the microring resonators 1107-1 to 1107-Z as an optical modulator to optically modulate light at a given wavelength to generate a light stream at the given wavelength within the optical waveguide 1101, where the light stream conveys digital data. In some embodiments, the electronic control circuitry 1113 includes receive (Rx) slice circuitry for independently controlling one or more of the microring resonators 1107-1 to 1107-Z as an optical receiver, e.g., photodetector, to detect a modulated light stream at a given wavelength within the optical waveguide 1101 to enable generation of electrical signals representing digital data conveyed by the modulated light stream at the given wavelength. In some embodiments, the electronic control circuitry 1113 includes circuitry for directing one or more of the microring resonators 1107-1 to 1107-Z to operate as an add/drop filter for multiplexing/demultiplexing of optical signals within the optical waveguide 1101. In some embodiments, the electronic control circuitry 1113 includes circuitry for controlling heating devices respectively associated with one or more of the microring resonators 1107-1 to 1107-Z to enable thermal tuning of the one or more of the microring resonators 1107-1 to 1107-Z to operate at a particular resonant optical wavelength.

Also, in some embodiments, electronics 1115 are formed within the inner region of the C-shaped optical waveguide 1101, where the electronics 1115 support operation of the optical macro 305-$x3$. In some embodiments, the electronics 1115 include clock signal generation and transmission circuitry, I/Q signal generation circuitry, ILO circuitry, PI circuitry, TIA circuitry, signal EQ circuitry, and/or other types of circuitry for supporting operation of the optical macro 305-$x3$.

Figure 12:
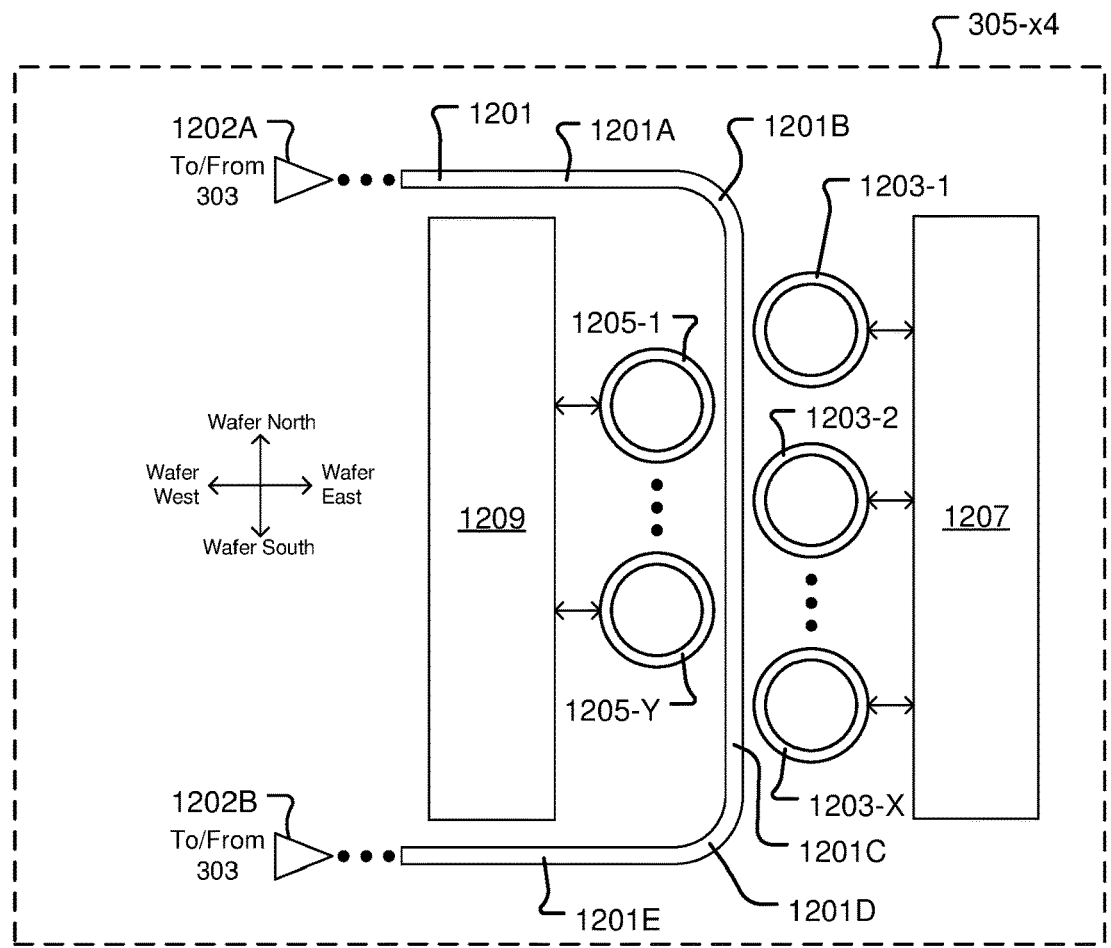
FIG. 12 shows an example optical path layout of an optical macro for data input/output to/from the TeraPHY optical I/O chiplet, where the optical path layout includes a C-shaped optical waveguide, in accordance with some embodiments.

FIG. 12 shows an example optical path layout of an optical macro 305-$x4$ for data input/output to/from the TeraPHY optical I/O chiplet 107, where the optical path layout includes a C-shaped optical waveguide 1201, in accordance with some embodiments. The C-shaped optical waveguide 1201 includes a first horizontal (East-West oriented) segment 1201A, a first curved segment 1201B, a vertical (North-South oriented) segment 1201C, a second curved segment 1201D, and a second horizontal (East-West oriented) segment 1201E. In some embodiments, the first curved segment 1201B curves around about 90 degrees from the first horizontal segment 1201A to the vertical segment 1201C, vice-versa. In some embodiments, the second curved segment 1201D curves around about 90 degrees from the vertical segment 1201C to the second horizontal segment 1201E, vice-versa. The first horizontal segment 1201A is optically connected to a first optical port 1202A, and the second horizontal segment 1201E is optically connected to a second optical port 1202B. In various embodiments, the first optical port 1202A is formed as a vertical optical grating coupler or a horizontal (edge) optical grating coupler. Also, in various embodiments, the second optical port 1202B is formed as a vertical optical grating coupler or a horizontal (edge) optical grating coupler.

In some embodiments, the first horizontal segment 1201A, the first curved segment 1201B, the vertical segment 1201C, the second curved segment 1201D, and the second horizontal segment 1201E of the optical waveguide 1201 are formed of a same material, such as silicon, polysilicon, silicon nitride, or any other material suitable for use as an optical waveguide. In some embodiments, any one or more of the first horizontal segment 1201A, the first curved segment 1201B, the vertical segment 1201C, the second curved segment 1201D, and the second horizontal segment 1201E of the optical waveguide 1201 is/are formed of a different material than one or more others of the first horizontal segment 1201A, the first curved segment 1201B, the vertical segment 1201C, the second curved segment 1201D, and the second horizontal segment 1201E of the optical waveguide 1201, such that the optical waveguide 1201 is formed as a combination of materials, e.g., a combination of two or more of silicon, polysilicon, silicon nitride, and/or any other material suitable for use as an optical waveguide. Also, in some embodiments, each of the first horizontal segment 1201A, the first curved segment 1201B, the vertical segment 1201C, the second curved segment 1201D, and the second horizontal segment 1201E of the optical waveguide 1201 is formed to have a substantially similar vertical cross-section shape. However, in some embodiments, any one or more of the first horizontal segment 1201A, the first curved segment 1201B, the vertical segment 1201C, the second curved segment 1201D, and the second horizontal segment 1201E of the optical waveguide 1201 is/are formed to have a different vertical cross-section shape than one or more others of the first horizontal segment 1201A, the first curved segment 1201B, the vertical segment 1201C, the second curved segment 1201D, and the second horizontal segment 1201E of the optical waveguide 1201.

Also, in some embodiments, any one or more of the first horizontal segment 1201A, the first curved segment 1201B, the vertical segment 1201C, the second curved segment 1201D, and the second horizontal segment 1201E of the optical waveguide 1201 is/are formed to have a vertical cross-section shape that varies along its length in the direction of light propagation through the optical waveguide 1201.

The optical macro 305-x4 includes optical microring resonators 1203-1 to 1203-X (where X is an integer greater than zero) that are optically coupled to the vertical segment 1201C of the C-shaped optical waveguide 1201, such that light traveling through the optical waveguide 1201 can be evanescently coupled into the optical microring resonators 1203-1 to 1203-X, and such that light traveling through the optical microring resonators 1203-1 to 1203-X can be evanescently coupled into the optical waveguide 1201. The optical macro 305-x4 also includes optical microring resonators 1205-1 to 1205-Y (where Y is an integer greater than zero) that are optically coupled to the vertical segment 1201C of the C-shaped optical waveguide 1201, such that light traveling through the optical waveguide 1201 can be evanescently coupled into the optical microring resonators 1205-1 to 1205-Y, and such that light traveling through the optical microring resonators 1205-1 to 1205-Y can be evanescently coupled into the optical waveguide 1201. The optical microring resonators 1203-1 to 1203-X are positioned along an outer side/edge of the optical waveguide 1201. The optical microring resonators 1205-1 to 1205-Y are positioned along an inner side/edge of the optical waveguide 1201. In some embodiments, the optical microring resonators 1203-1 to 1203-X and 1205-1 to 1205-Y are positioned so that optical coupling locations between the optical microring resonators 1203-1 to 1203-X and the optical waveguide 1201 are offset/staggered from (do not overlap with) optical coupling locations between the optical microring resonators 1205-1 to 1205-Y and the optical waveguide 1201. In this manner, the optical microring resonators 1203-1 to 1203-X and 1205-1 to 1205-Y do not optically couple to the same location along optical waveguide 1201 in order to avoid optical intercoupling between different ones of the optical microring resonators 1203-1 to 1203-X and 1205-1 to 1205-Y. In some embodiments, the optical macro 305-x4 does not have any microring resonator optically coupled to either the first horizontal segment 1201A, the first curved segment 1201B, the second curved segment 1201D, or the second horizontal segment 1201E of the C-shaped optical waveguide 1201. In some embodiments, all microring resonators, e.g., 1203-1 to 1203-X and 1205-1 to 1205-Y, within the optical macro 305-x4 are optically coupled to the vertical segment 1201C of the C-shaped optical waveguide 1201.

In some embodiments, the optical microring resonators 1203-1 to 1203-X and 1205-1 to 1205-Y are positioned relative to the optical waveguide 1201 such that a respective minimum separation distance between each of the optical microring resonators 1203-1 to 1203-X and 1205-1 to 1205-Y and the optical waveguide 1201 is substantially the same. However, in some embodiments, the optical microring resonators 1203-1 to 1203-X and 1205-1 to 1205-Y are positioned relative to the optical waveguide 1201 such that multiple different minimum separation distances exist between different ones of the optical microring resonators 1203-1 to 1203-X and 1205-1 to 1205-Y and the optical waveguide 1201. In various embodiments, the optical microring resonators 1203-1 to 1203-X are positioned at a substantially constant pitch with respect to each other. However, in other embodiments, the optical microring resonators 1203-1 to 1203-X are not positioned at a substantially constant pitch with respect to each other. In some embodiments, the pitch between adjacently positioned ones of the optical microring resonators 1203-1 to 1203-X is set at a distance that avoids evanescent coupling of light between the adjacently positioned ones of the optical microring resonators 1203-1 to 1203-X. In some embodiments, the pitch between adjacently positioned ones of the optical microring resonators 1203-1 to 1203-X is minimized while ensuring that evanescent coupling of light does not occur between adjacently positioned ones of the optical microring resonators 1203-1 to 1203-X. In various embodiments, the optical microring resonators 1205-1 to 1205-Y are positioned at a substantially constant pitch with respect to each other. However, in other embodiments, the optical microring resonators 1205-1 to 1205-Y are not positioned at a substantially constant pitch with respect to each other. In some embodiments, the pitch between adjacently positioned ones of the optical microring resonators 1205-1 to 1205-Y is set at a distance that avoids evanescent coupling of light between the adjacently positioned ones of the optical microring resonators 1205-1 to 1205-Y. In some embodiments, the pitch between adjacently positioned ones of the optical microring resonators 1205-1 to 1205-Y is minimized while ensuring that evanescent coupling of light does not occur between adjacently positioned ones of the optical microring resonators 1205-1 to 1205-Y. In some embodiments, the optical path layout of the optical macro 305-x4 is optimized by minimizing a length of the optical waveguide 1201 within the optical macro 305-x4. The length of the optical waveguide 1201 within the optical macro 305-x4 is minimized by reducing/constraining the pitch of the optical microring resonators 1203-1 to 1203-X, reducing/constraining the pitch of the optical microring resonators 1205-1 to 1205-Y, and having the first and second optical ports 1002A and 1002B of the optical waveguide 1201 located on the same side of the optical macro 305-x4.

In some embodiments, each of the optical microring resonators 1203-1 to 1203-X and 1205-1 to 1205-Y has an outer diameter greater than zero and less than or equal to about 50 micrometers. In some embodiments, each of the optical microring resonators 1203-1 to 1203-X and 1205-1 to 1205-Y has an outer diameter greater than zero and less than or equal to about 40 micrometers. In some embodiments, each of the optical microring resonators 1203-1 to 1203-X and 1205-1 to 1205-Y has an outer diameter greater than zero and less than or equal to about 30 micrometers. In some embodiments, each of the optical microring resonators 1203-1 to 1203-X and 1205-1 to 1205-Y has an outer diameter greater than zero and less than or equal to about 20 micrometers. In some embodiments, each of the optical microring resonators 1203-1 to 1203-X and 1205-1 to 1205-Y has an outer diameter greater than zero and less than or equal to about 10 micrometers.

The optical microring resonators 1203-1 to 1203-X are interfaced with electronic control circuitry 1207. In some embodiments, the electronic control circuitry 1207 includes transmit (Tx) slice circuitry for independently controlling one or more of the microring resonators 1203-1 to 1203-X as an optical modulator to optically modulate light at a given wavelength to generate a light stream at the given wavelength within the optical waveguide 1201, where the light stream conveys digital data. In some embodiments, the electronic control circuitry 1207 includes receive (Rx) slice circuitry for independently controlling one or more of the microring resonators 1203-1 to 1203-X as an optical receiver, e.g., photodetector, to detect a modulated light stream at a given wavelength within the optical waveguide 1201 to enable generation of electrical signals representing digital data conveyed by the modulated light stream at the given wavelength. In some embodiments, the electronic control circuitry 1207 includes circuitry for directing one or more of the microring resonators 1203-1 to 1203-X to operate as an add/drop filter for multiplexing/demultiplexing of optical signals within the optical waveguide 1201. In some embodiments, the electronic control circuitry 1207 includes circuitry for controlling heating devices respectively associated with one or more of the microring resonators 1203-1 to 1203-X to enable thermal tuning of the one or more of the microring resonators 1203-1 to 1203-X to operate at a particular resonant optical wavelength.

The optical microring resonators 1205-1 to 1205-Y are interfaced with electronic control circuitry 1209. In some embodiments, the electronic control circuitry 1209 includes transmit (Tx) slice circuitry for independently controlling one or more of the microring resonators 1205-1 to 1205-Y as an optical modulator to optically modulate light at a given wavelength to generate a light stream at the given wavelength within the optical waveguide 1201, where the light stream conveys digital data. In some embodiments, the electronic control circuitry 1209 includes receive (Rx) slice circuitry for independently controlling one or more of the microring resonators 1205-1 to 1205-Y as an optical receiver, e.g., photodetector, to detect a modulated light stream at a given wavelength within the optical waveguide 1201 to enable generation of electrical signals representing digital data conveyed by the modulated light stream at the given wavelength. In some embodiments, the electronic control circuitry 1209 includes circuitry for directing one or more of the microring resonators 1205-1 to 1205-Y to operate as an add/drop filter for multiplexing/demultiplexing of optical signals within the optical waveguide 1201. In some embodiments, the electronic control circuitry 1209 includes circuitry for controlling heating devices respectively associated with one or more of the microring resonators 1205-1 to 1205-Y to enable thermal tuning of the one or more of the microring resonators 1205-1 to 1205-Y to operate at a particular resonant optical wavelength. Also, in some embodiments, the electronic control circuitry 1207 and/or the electronic control circuitry 1209 include electronic components/circuitry for supporting operation of the optical macro 305-x4, such as clock signal generation and transmission circuitry, I/Q signal generation circuitry, ILO circuitry, PI circuitry, TIA circuitry, signal EQ circuitry, and/or other types of circuitry.

It should be understood that the U-shaped optical waveguide 901 of FIG. 9 and the C-shaped optical waveguides 1001, 1101, and 1201 of FIGS. 10, 11, and 12, respectively, are configured to receive input light and transmit output light on a same side of the optical macro 305-x. More specifically, the input port and the output port of the U/C-shaped optical waveguides 901, 1001, 1101, and 1201 are positioned on a same side of the optical macro 305-x. Therefore, the U/C-shaped optical waveguides 901, 1001, 1101, and 1201 are suitable for optical package escape configurations in which light both enters and exits on the same side of the TeraPHY optical I/O chiplet 107. Also, it should be understood that the inner area between the horizontal segments of the U/C-shaped optical waveguides 901, 1001, 1101, and 1201 can include electronics, when the inner area is of sufficient size and shape.

In some embodiments, it is advantageous for the optical waveguide ports of the optical macro 305-x to be on different sides of the optical macro 305-x, such as on opposite sides (coming out in opposite directions) or on adjacent sides (coming out at a 90 degree offset relative to each other). FIGS. 13, 14, 15, and 16 show example optical path layouts of the optical macro 305-x of the TeraPHY optical I/O chiplet 107 in which optical waveguide ports are located on different sides of the optical macro 305-x.

Figure 13:
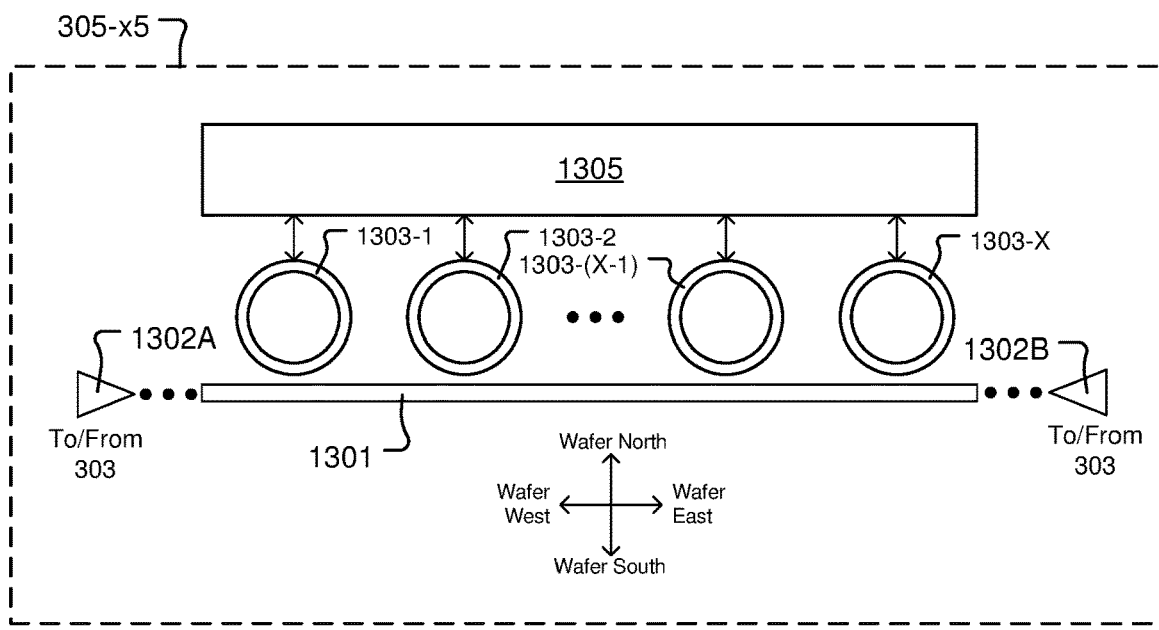
FIG. 13 shows an example optical path layout of an optical macro for data input/output to/from the TeraPHY optical I/O chiplet, where the optical path layout includes a substantially linear-shaped optical waveguide with corresponding optical ports located on opposite sides of the optical macro, in accordance with some embodiments.

FIG. 13 shows an example optical path layout of an optical macro 305-x5 for data input/output to/from the TeraPHY optical I/O chiplet 107, where the optical path layout includes a substantially linear-shaped optical waveguide 1301 with corresponding optical ports 1302A and 1302B located on opposite sides of the optical macro 305-x5, in accordance with some embodiments. The optical port 1302A is located on the left side (West side) of the optical macro 305-x5, and the optical port 1302B is located on the right side (East side) of the optical macro 305-x5. In various embodiments, the first optical port 1302A is formed as a vertical optical grating coupler or a horizontal (edge) optical grating coupler. Also, in various embodiments, the second optical port 1302B is formed as a vertical optical grating coupler or a horizontal (edge) optical grating coupler.

In some embodiments, the optical waveguide 1301 is formed of a single material, such as silicon, polysilicon, silicon nitride, or any other material suitable for use as an optical waveguide. In some embodiments, different segments of the optical waveguide 1301 are formed of different materials, such that the optical waveguide 1301 is formed as a combination of materials, e.g., a combination of two or more of silicon, polysilicon, silicon nitride, and/or any other material suitable for use as an optical waveguide. Also, in some embodiments, the optical waveguide 1301 is formed to have a substantially constant vertical cross-section shape. However, in some embodiments, different segments of the optical waveguide 1301 are formed to have different vertical cross-section shapes. Also, in some embodiments, the vertical cross-section shape of the optical waveguide 1301 varies along its length in the direction of light propagation through the optical waveguide 1301.

The optical macro 305-x5 includes optical microring resonators 1303-1 to 1303-X (where X is an integer greater than zero) that are optically coupled to the optical waveguide 1301, such that light traveling through the optical waveguide 1301 can be evanescently coupled into the optical microring resonators 1303-1 to 1303-X, and such that light traveling through the optical microring resonators 1303-1 to 1303-X can be evanescently coupled into the optical waveguide 1301. In some embodiments, each of the optical microring resonators 1303-1 to 1303-X is positioned along a same side/edge the optical waveguide 1301. For example, FIG. 13 shows each of the optical microring resonators 1303-1 to 1303-X positioned along the upper (North) side/edge of the optical waveguide 1301. In some embodiments, the optical microring resonators 1303-1 to 1303-X are positioned relative to the optical waveguide 1301 such that a respective minimum separation distance between each of the optical microring resonators 1303-1 to 1303-X and the optical waveguide 1301 is substantially the same. However, in some embodiments, the optical microring resonators 1303-1 to 1303-X are positioned relative to the optical waveguide 1301 such that multiple different minimum separation distances exist between different ones of the optical microring resonators 1303-1 to 1303-X and the optical waveguide 1301.

In some embodiments, the optical microring resonators 1303-1 to 1303-X are positioned so as to not optically couple to the same location along the optical waveguide 1301 in order to avoid intercoupling between different ones of the optical microring resonators 1303-1 to 1303-X. In various embodiments, the optical microring resonators 1303-1 to 1303-X are positioned at a substantially constant pitch (center-to-center spacing) with respect to each other. However, in other embodiments, the optical microring resonators 1303-1 to 1303-X are not positioned at a substantially constant pitch with respect to each other. In some embodiments, the pitch between adjacently positioned ones of the optical microring resonators 1303-1 to 1303-X is set at a distance that avoids evanescent coupling of light between the adjacently positioned ones of the optical microring resonators 1303-1 to 1303-X. In some embodiments, the pitch between adjacently positioned ones of the optical microring resonators 1303-1 to 1303-X is minimized while ensuring that evanescent coupling of light does not occur between adjacently positioned ones of the optical microring resonators 1303-1 to 1303-X. In some embodiments, the optical path layout of the optical macro 305-x5 is optimized by minimizing a length of the optical waveguide 1301 within the optical macro 305-x5. In some embodiments, the length of the optical waveguide 1301 within the optical macro 305-x5 is minimized by reducing/constraining the pitch of the optical microring resonators 1303-1 to 1303-X.

In some embodiments, each of the optical microring resonators 1303-1 to 1303-X has an outer diameter greater than zero and less than or equal to about 50 micrometers. In some embodiments, each of the optical microring resonators 1303-1 to 1303-X has an outer diameter greater than zero and less than or equal to about 40 micrometers. In some embodiments, each of the optical microring resonators 1303-1 to 1303-X has an outer diameter greater than zero and less than or equal to about 30 micrometers. In some embodiments, each of the optical microring resonators 1303-1 to 1303-X has an outer diameter greater than zero and less than or equal to about 20 micrometers. In some embodiments, each of the optical microring resonators 1303-1 to 1303-X has an outer diameter greater than zero and less than or equal to about 10 micrometers.

The optical microring resonators 1303-1 to 1303-X are interfaced with electronic control circuitry 1305. In some embodiments, the electronic control circuitry 1305 includes transmit (Tx) slice circuitry for independently controlling one or more of the microring resonators 1303-1 to 1303-X as an optical modulator to optically modulate light at a given wavelength to generate a light stream at the given wavelength within the optical waveguide 1301, where the light stream conveys digital data. In some embodiments, the electronic control circuitry 1305 includes receive (Rx) slice circuitry for independently controlling one or more of the microring resonators 1303-1 to 1303-X as an optical receiver, e.g., photodetector, to detect a modulated light stream at a given wavelength within the optical waveguide 1301 to enable generation of electrical signals representing digital data conveyed by the modulated light stream at the given wavelength. In some embodiments, the electronic control circuitry 1305 includes circuitry for directing one or more of the microring resonators 1303-1 to 1303-X to operate as an add/drop filter for multiplexing/demultiplexing of optical signals within the optical waveguide 1301. In some embodiments, the electronic control circuitry 1305 includes circuitry for controlling heating devices respectively associated with one or more of the microring resonators 1303-1 to 1303-X to enable thermal tuning of the one or more of the microring resonators 1303-1 to 1303-X. Also, in some embodiments, the optical macro 305-x5 includes additional electronics to support operation of the optical macro 305-x5, such as clock signal generation and transmission circuitry, I/Q signal generation circuitry, ILO circuitry, PI circuitry, TIA circuitry, signal EQ circuitry, and/or other types of circuitry for supporting operation of the optical macro 305-x5.

Figure 14:
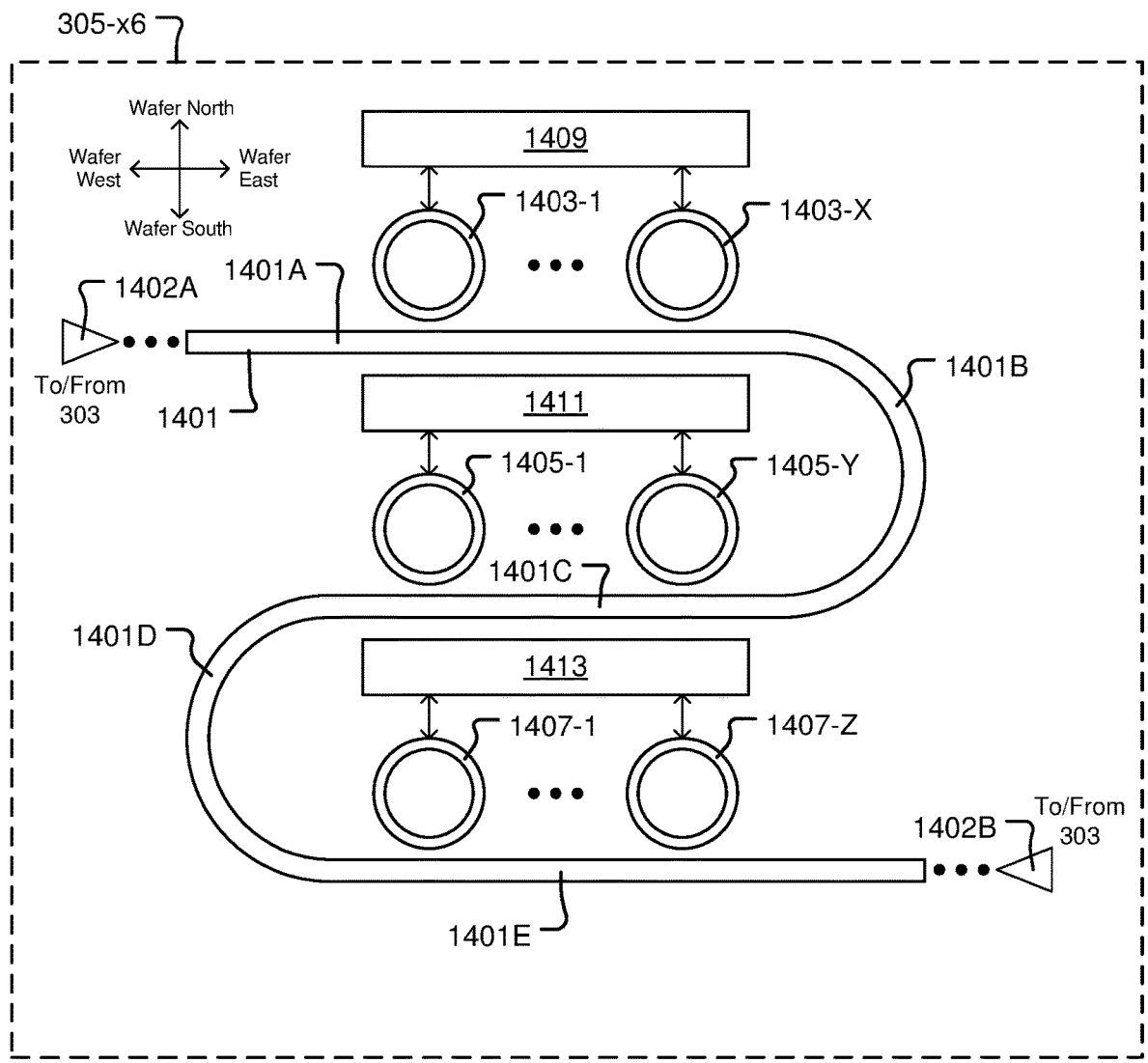
FIG. 14 shows an example optical path layout of an optical macro for data input/output to/from the TeraPHY optical I/O chiplet, where the optical path layout includes an S-shaped optical waveguide, in accordance with some embodiments.

FIG. 14 shows an example optical path layout of an optical macro 305-x6 for data input/output to/from the TeraPHY optical I/O chiplet 107, where the optical path layout includes an S-shaped optical waveguide 1401, in accordance with some embodiments. The optical waveguide 1401 includes a first horizontal (East-West oriented) segment 1401A, a first curved segment 1401B, a second horizontal (East-West oriented) segment 1401C, a second curved segment 1401D, and a third horizontal (East-West oriented) segment 1401E. In some embodiments, the first curved segment 1401B curves around about 180 degrees from the first horizontal segment 1401A to the second horizontal segment 1401C, vice-versa. In some embodiments, the second curved segment 1401D curves around about 180 degrees from the second horizontal segment 1401C to the third horizontal segment 1401E, vice-versa. The first horizontal segment 1401A is optically connected to a first optical port 1402A. The third horizontal segment 1401E is optically connected to a second optical port 1402B. The first optical port 1402A and the second optical port 1402B are located on opposite sides of the optical macro 305-x6. The first optical port 1402A is located on the left side (West side) of the optical macro 305-x6, and the optical port 1402B is located on the right side (East side) of the optical macro 305-x6. In various embodiments, the first optical port 1402A is formed as a vertical optical grating coupler or a horizontal (edge) optical grating coupler. Also, in various embodiments, the second optical port 1402B is formed as a vertical optical grating coupler or a horizontal (edge) optical grating coupler.

In some embodiments, the first horizontal segment 1401A, the first curved segment 1401B, the second horizontal segment 1401C, the second curved segment 1401D, and the third horizontal segment 1401E of the optical waveguide 1401 are formed of a same material, such as silicon, polysilicon, silicon nitride, or any other material suitable for use as an optical waveguide. In some embodiments, any one or more of the first horizontal segment 1401A, the first curved segment 1401B, the second horizontal segment 1401C, the second curved segment 1401D, and the third horizontal segment 1401E of the optical waveguide 1401 is/are formed of a different material than one or more others of the first horizontal segment 1401A, the first curved segment 1401B, the second horizontal segment 1401C, the second curved segment 1401D, and the third horizontal segment 1401E of the optical waveguide 1401, such that the optical waveguide 1401 is formed as a combination of materials, e.g., a combination of two or more of silicon, polysilicon, silicon nitride, and/or any other material suitable for use as an optical waveguide. Also, in some embodiments, each of the first horizontal segment 1401A, the first curved segment 1401B, the second horizontal segment 1401C, the second curved segment 1401D, and the third horizontal segment 1401E of the optical waveguide 1401 is formed to have a substantially similar vertical cross-section shape. However, in some embodiments, any one or more of the first horizontal segment 1401A, the first curved segment 1401B, the second horizontal segment 1401C, the second curved segment 1401D, and the third horizontal segment 1401E of the optical waveguide 1401 is/are formed to have a different vertical cross-section shape than one or more others of the first horizontal segment 1401A, the first curved segment 1401B, the second horizontal segment 1401C, the second curved segment 1401D, and the third horizontal segment 1401E of the optical waveguide 1401. Also, in some embodiments, any one or more of the first horizontal segment 1401A, the first curved segment 1401B, the second horizontal segment 1401C, the second curved segment 1401D, and the third horizontal segment 1401E of the optical waveguide 1401 is/are formed to have a vertical cross-section shape that varies along its length in the direction of light propagation through the optical waveguide 1401.

The optical macro 305-*x*6 includes optical microring resonators 1403-1 to 1403-X (where X is an integer greater than zero) that are optically coupled to the first horizontal segment 1401A of the S-shaped optical waveguide 1401, such that light traveling through the optical waveguide 1401 can be evanescently coupled into the optical microring resonators 1403-1 to 1403-X, and such that light traveling through the optical microring resonators 1403-1 to 1403-X can be evanescently coupled into the optical waveguide 1401. The optical macro 305-*x*6 also includes optical microring resonators 1405-1 to 1405-Y (where Y is an integer greater than zero) that are optically coupled to the second horizontal segment 1401C of the S-shaped optical waveguide 1401, such that light traveling through the optical waveguide 1401 can be evanescently coupled into the optical microring resonators 1405-1 to 1405-Y, and such that light traveling through the optical microring resonators 1405-1 to 1405-Y can be evanescently coupled into the optical waveguide 1401. The optical macro 305-*x*6 also includes optical microring resonators 1407-1 to 1407-Z (where Z is an integer greater than zero) that are optically coupled to the third horizontal segment 1401E of the S-shaped optical waveguide 1401, such that light traveling through the optical waveguide 1401 can be evanescently coupled into the optical microring resonators 1407-1 to 1407-Z, and such that light traveling through the optical microring resonators 1407-1 to 1407-Z can be evanescently coupled into the optical waveguide 1401.

The optical macro 305-*x*6 shows a particular example of an optical layout in which each of the optical microring resonators 1403-1 to 1403-X, 1405-1 to 1405-Y, and 1407-1 to 1407-Z is optically coupled to one of the three horizontal segments 1401A, 1401C, and 1401E of the S-shaped optical waveguide 1401. In some embodiments, the optical microring resonators 1403-1 to 1403-X, 1405-1 to 1405-Y, and 1407-1 to 1407-Z are positioned relative to the optical waveguide 1401 such that a respective minimum separation distance between each of the optical microring resonators 1403-1 to 1403-X, 1405-1 to 1405-Y, and 1407-1 to 1407-Z and the optical waveguide 1401 is substantially the same. However, in some embodiments, the optical microring resonators 1403-1 to 1403-X, 1405-1 to 1405-Y, and 1407-1 to 1407-Z are positioned relative to the optical waveguide 1401 such that multiple different minimum separation distances exist between different ones of the optical microring resonators 1403-1 to 1403-X, 1405-1 to 1405-Y, and 1407-1 to 1407-Z and the optical waveguide 1401.

In various embodiments, the optical microring resonators 1403-1 to 1403-X are positioned at a substantially constant pitch (center-to-center spacing) with respect to each other. However, in other embodiments, the optical microring resonators 1403-1 to 1403-X are not positioned at a substantially constant pitch with respect to each other. In some embodiments, the pitch between adjacently positioned ones of the optical microring resonators 1403-1 to 1403-X is set at a distance that avoids evanescent coupling of light between the adjacently positioned ones of the optical microring resonators 1403-1 to 1403-X. In some embodiments, the pitch between adjacently positioned ones of the optical microring resonators 1403-1 to 1403-X is minimized while ensuring that evanescent coupling of light does not occur between adjacently positioned ones of the optical microring resonators 1403-1 to 1403-X. In some embodiments, the optical microring resonators 1403-1 to 1403-X do not optically couple to the same location along optical waveguide 1401 in order to avoid optical intercoupling between different ones of the optical microring resonators 1403-1 to 1403-X.

Also, in various embodiments, the optical microring resonators 1405-1 to 1405-Y are positioned at a substantially constant pitch with respect to each other. However, in other embodiments, the optical microring resonators 1405-1 to 1405-Y are not positioned at a substantially constant pitch with respect to each other. In some embodiments, the pitch between adjacently positioned ones of the optical microring resonators 1405-1 to 1405-Y is set at a distance that avoids evanescent coupling of light between the adjacently positioned ones of the optical microring resonators 1405-1 to 1405-Y. In some embodiments, the pitch between adjacently positioned ones of the optical microring resonators 1405-1 to 1405-Y is minimized while ensuring that evanescent coupling of light does not occur between adjacently positioned ones of the optical microring resonators 1405-1 to 1405-Y. In some embodiments, the optical microring resonators 1405-1 to 1405-Y do not optically couple to the same location along optical waveguide 1401 in order to avoid optical intercoupling between different ones of the optical microring resonators 1405-1 to 1405-Y.

Also, in various embodiments, the optical microring resonators 1407-1 to 1407-Z are positioned at a substantially constant pitch with respect to each other. However, in other embodiments, the optical microring resonators 1407-1 to 1407-Z are not positioned at a substantially constant pitch with respect to each other. In some embodiments, the pitch between adjacently positioned ones of the optical microring resonators 1407-1 to 1407-Z is set at a distance that avoids evanescent coupling of light between the adjacently positioned ones of the optical microring resonators 1407-1 to 1407-Z. In some embodiments, the pitch between adjacently positioned ones of the optical microring resonators 1407-1 to 1407-Z is minimized while ensuring that evanescent coupling of light does not occur between adjacently positioned ones of the optical microring resonators 1407-1 to 1407-Z. In some embodiments, the optical microring resonators 1407-1 to 1407-Z do not optically couple to the same location along optical waveguide 1401 in order to avoid optical intercoupling between different ones of the optical microring resonators 1407-1 to 1407-Z.

In some embodiments, each of the optical microring resonators 1403-1 to 1403-X, 1405-1 to 1405-Y, and 1407-1 to 1407-Z has an outer diameter greater than zero and less than or equal to about 50 micrometers. In some embodiments, each of the optical microring resonators 1403-1 to 1403-X, 1405-1 to 1405-Y, and 1407-1 to 1407-Z has an outer diameter greater than zero and less than or equal to about 40 micrometers. In some embodiments, each of the optical microring resonators 1403-1 to 1403-X, 1405-1 to 1405-Y, and 1407-1 to 1407-Z has an outer diameter greater than zero and less than or equal to about 30 micrometers. In some embodiments, each of the optical microring resonators 1403-1 to 1403-X, 1405-1 to 1405-Y, and 1407-1 to 1407-Z has an outer diameter greater than zero and less than or equal to about 20 micrometers. In some embodiments, each of the optical microring resonators 1403-1 to 1403-X, 1405-1 to 1405-Y, and 1407-1 to 1407-Z has an outer diameter greater than zero and less than or equal to about 10 micrometers.

The optical microring resonators 1403-1 to 1403-X are interfaced with electronic control circuitry 1409. In some embodiments, the electronic control circuitry 1409 includes transmit (Tx) slice circuitry for independently controlling one or more of the microring resonators 1403-1 to 1403-X as an optical modulator to optically modulate light at a given wavelength to generate a light stream at the given wavelength within the optical waveguide 1401, where the light stream conveys digital data. In some embodiments, the electronic control circuitry 1409 includes receive (Rx) slice circuitry for independently controlling one or more of the microring resonators 1403-1 to 1403-X as an optical receiver, e.g., photodetector, to detect a modulated light stream at a given wavelength within the optical waveguide 1401 to enable generation of electrical signals representing digital data conveyed by the modulated light stream at the given wavelength. In some embodiments, the electronic control circuitry 1409 includes circuitry for directing one or more of the microring resonators 1403-1 to 1403-X to operate as an add/drop filter for multiplexing/demultiplexing of optical signals within the optical waveguide 1401. In some embodiments, the electronic control circuitry 1409 includes circuitry for controlling heating devices respectively associated with one or more of the microring resonators 1403-1 to 1403-X to enable thermal tuning of the one or more of the microring resonators 1403-1 to 1403-X.

The optical microring resonators 1405-1 to 1405-Y are interfaced with electronic control circuitry 1411. In some embodiments, the electronic control circuitry 1411 includes transmit (Tx) slice circuitry for independently controlling one or more of the microring resonators 1405-1 to 1405-Y as an optical modulator to optically modulate light at a given wavelength to generate a light stream at the given wavelength within the optical waveguide 1401, where the light stream conveys digital data. In some embodiments, the electronic control circuitry 1411 includes receive (Rx) slice circuitry for independently controlling one or more of the microring resonators 1405-1 to 1405-Y as an optical receiver, e.g., photodetector, to detect a modulated light stream at a given wavelength within the optical waveguide 1401 to enable generation of electrical signals representing digital data conveyed by the modulated light stream at the given wavelength. In some embodiments, the electronic control circuitry 1411 includes circuitry for directing one or more of the microring resonators 1405-1 to 1405-Y to operate as an add/drop filter for multiplexing/demultiplexing of optical signals within the optical waveguide 1401. In some embodiments, the electronic control circuitry 1411 includes circuitry for controlling heating devices respectively associated with one or more of the microring resonators 1405-1 to 1405-Y to enable thermal tuning of the one or more of the microring resonators 1405-1 to 1405-Y.

The optical microring resonators 1407-1 to 1407-Z are interfaced with electronic control circuitry 1413. In some embodiments, the electronic control circuitry 1413 includes transmit (Tx) slice circuitry for independently controlling one or more of the microring resonators 1407-1 to 1407-Z as an optical modulator to optically modulate light at a given wavelength to generate a light stream at the given wavelength within the optical waveguide 1401, where the light stream conveys digital data. In some embodiments, the electronic control circuitry 1413 includes receive (Rx) slice circuitry for independently controlling one or more of the microring resonators 1407-1 to 1407-Z as an optical receiver, e.g., photodetector, to detect a modulated light stream at a given wavelength within the optical waveguide 1401 to enable generation of electrical signals representing digital data conveyed by the modulated light stream at the given wavelength. In some embodiments, the electronic control circuitry 1413 includes circuitry for directing one or more of the microring resonators 1407-1 to 1407-Z to operate as an add/drop filter for multiplexing/demultiplexing of optical signals within the optical waveguide 1401. In some embodiments, the electronic control circuitry 1413 includes circuitry for controlling heating devices respectively associated with one or more of the microring resonators 1407-1 to 1407-Z to enable thermal tuning of the one or more of the microring resonators 1407-1 to 1407-Z. Also, in some embodiments, the optical macro **305-*x*6 includes additional electronics to support operation of the optical macro 305-*x*6, such as clock signal generation and transmission circuitry, I/Q signal generation circuitry, ILO circuitry, PI circuitry, TIA circuitry, signal EQ circuitry, and/or other types of circuitry for supporting operation of the optical macro 305-*x*6**.

In some embodiments, the optical path layout of the optical macro **305-*x*6 is optimized by minimizing a length of the optical waveguide 1401 within the optical macro 305-*x*6. The length of the optical waveguide 1401 within the optical macro 305-*x*6 is minimized by having the optical microring resonators 1403-1 to 1403-X, 1405-1 to 1405-Y, and 1407-1 to 1407-Z respectively positioned along each of the first horizontal segment 1401A, the second horizontal segment 1401C, and the third horizontal segment 1401E of the optical waveguide 1401, and reducing/constraining the pitch of the optical microring resonators 1403-1 to 1403-X, 1405-1 to 1405-Y, and 1407-1 to 1407-Z. In some embodiments of the optical path layout of the optical macro 305-*x*6 one or more additional optical microring resonators are positioned along the first curved segment 1401B and/or the second curved segment 1401D, so that the one or more additional optical microring resonators optically couple with the optical waveguide 1401. It should be understood that in various embodiments the optical path layout of the optical macro 305-*x*6 can be modified so that the S-shaped optical waveguide 1401** becomes a serpentine-shaped optical waveguide that includes essentially any number of horizontal linear-shaped segments and any number of curved segments, with essentially any number of optical microring resonators positioned along the serpentine-shaped optical waveguide so as to optically couple with the serpentine-shaped optical waveguide. Moreover, in some embodiments, the different horizontal linear-shaped segments and/or curved segments of the serpentine-shaped optical waveguide can have different lengths, such that different numbers of optical microring resonators are positioned along different ones of the horizontal linear-shaped segment of the serpentine-shaped optical waveguide.

Figure 15:
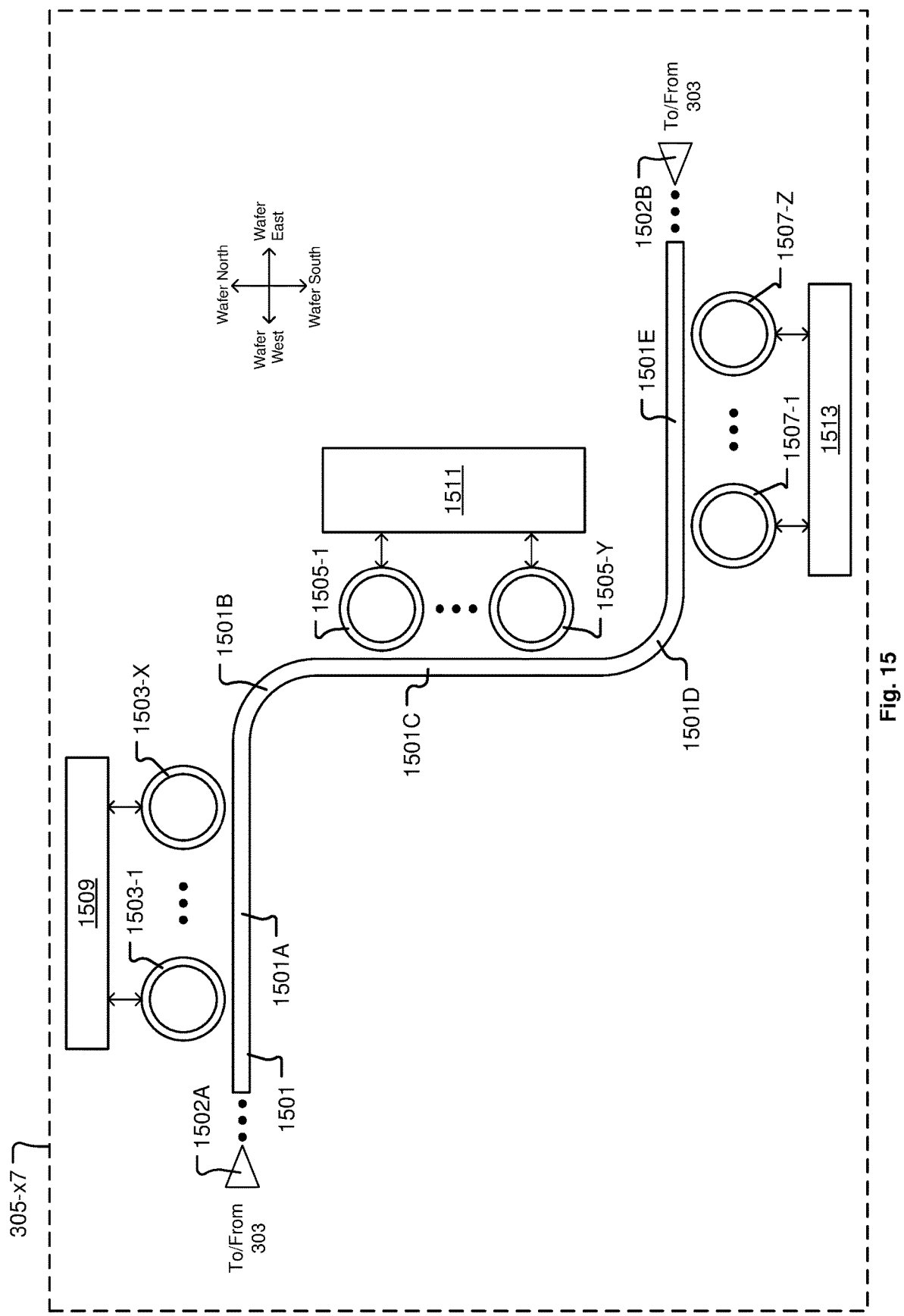
FIG. 15 shows an example optical path layout of an optical macro for data input/output to/from the TeraPHY optical I/O chiplet, where the optical path layout includes a Z-shaped optical waveguide, in accordance with some embodiments.

FIG. 15 shows an example optical path layout of an optical macro **305-*x*7 for data input/output to/from the TeraPHY optical I/O chiplet 107, where the optical path layout includes a Z-shaped optical waveguide 1501, in accordance with some embodiments. The Z-shaped optical waveguide 1501 includes a first horizontal (East-West oriented) segment 1501A, a first curved segment 1501B, a vertical (North-South oriented) segment 1501C, a second curved segment 1501D, and a second horizontal (East-West oriented) segment 1501E. In some embodiments, the first curved segment 1501B curves around about 90 degrees from the first horizontal segment 1501A** to the vertical segment 1501C, vice-versa. In some embodiments, the second curved segment 1501D curves around about 90 degrees from the vertical segment 1501C to the second horizontal segment 1501E, vice-versa. In this manner, the vertical segment 1501C of the optical waveguide 1501 extends in a direction substantially perpendicular to each of the first horizontal segment 1501A and the second horizontal segment 1501E of the optical waveguide 1501. The first curved segment 1501B and the second curved segment 1501D have mirrored orientations with respect to each other (they have horizontally flipped orientations with respect to each other). The first horizontal segment 1501A is optically connected to a first optical port 1502A, and the second horizontal segment 1501E is optically connected to a second optical port 1502B. The first optical port 1502A and the second optical port 1502B are located on opposite sides of the optical macro 305-$x$7. The first optical port 1502A is located on the left side (West side) of the optical macro 305-$x$7. The optical port 1502B is located on the right side (East side) of the optical macro 305-$x$7. In various embodiments, the first optical port 1502A is formed as a vertical optical grating coupler or a horizontal (edge) optical grating coupler. Also, in various embodiments, the second optical port 1502B is formed as a vertical optical grating coupler or a horizontal (edge) optical grating coupler.

In some embodiments, the first horizontal segment 1501A, the first curved segment 1501B, the vertical segment 1501C, the second curved segment 1501D, and the second horizontal segment 1501E of the optical waveguide 1501 are formed of a same material, such as silicon, polysilicon, silicon nitride, or any other material suitable for use as an optical waveguide. In some embodiments, any one or more of the first horizontal segment 1501A, the first curved segment 1501B, the vertical segment 1501C, the second curved segment 1501D, and the second horizontal segment 1501E of the optical waveguide 1501 is/are formed of a different material than one or more others of the first horizontal segment 1501A, the first curved segment 1501B, the vertical segment 1501C, the second curved segment 1501D, and the second horizontal segment 1501E of the optical waveguide 1501, such that the optical waveguide 1501 is formed as a combination of materials, e.g., a combination of two or more of silicon, polysilicon, silicon nitride, and/or any other material suitable for use as an optical waveguide. Also, in some embodiments, each of the first horizontal segment 1501A, the first curved segment 1501B, the vertical segment 1501C, the second curved segment 1501D, and the second horizontal segment 1501E of the optical waveguide 1501 is formed to have a substantially similar vertical cross-section shape. However, in some embodiments, any one or more of the first horizontal segment 1501A, the first curved segment 1501B, the vertical segment 1501C, the second curved segment 1501D, and the second horizontal segment 1501E of the optical waveguide 1501 is/are formed to have a different vertical cross-section shape than one or more others of the first horizontal segment 1501A, the first curved segment 1501B, the vertical segment 1501C, the second curved segment 1501D, and the second horizontal segment 1501E of the optical waveguide 1501. Also, in some embodiments, any one or more of the first horizontal segment 1501A, the first curved segment 1501B, the vertical segment 1501C, the second curved segment 1501D, and the second horizontal segment 1501E of the optical waveguide 1501 is/are formed to have a vertical cross-section shape that varies along its length in the direction of light propagation through the optical waveguide 1501.

The optical macro 305-$x$7 includes optical microring resonators 1503-1 to 1503-X (where X is an integer greater than zero) that are optically coupled to the first horizontal segment 1501A of the Z-shaped optical waveguide 1501, such that light traveling through the optical waveguide 1501 can be evanescently coupled into the optical microring resonators 1503-1 to 1503-X, and such that light traveling through the optical microring resonators 1503-1 to 1503-X can be evanescently coupled into the optical waveguide 1501. The optical macro 305-$x$7 also includes optical microring resonators 1505-1 to 1505-Y (where Y is an integer greater than zero) that are optically coupled to the vertical segment 1501C of the Z-shaped optical waveguide 1501, such that light traveling through the optical waveguide 1501 can be evanescently coupled into the optical microring resonators 1505-1 to 1505-Y, and such that light traveling through the optical microring resonators 1505-1 to 1505-Y can be evanescently coupled into the optical waveguide 1501. The optical macro 305-$x$7 also includes optical microring resonators 1507-1 to 1507-Z (where Z is an integer greater than zero) that are optically coupled to the second horizontal segment 1501E of the Z-shaped optical waveguide 1501, such that light traveling through the optical waveguide 1501 can be evanescently coupled into the optical microring resonators 1507-1 to 1507-Z, and such that light traveling through the optical microring resonators 1507-1 to 1507-Z can be evanescently coupled into the optical waveguide 1501.

In some embodiments, the optical microring resonators 1503-1 to 1503-X, 1505-1 to 1505-Y, and 1507-1 to 1507-Z are positioned relative to the optical waveguide 1501 such that a respective minimum separation distance between each of the optical microring resonators 1503-1 to 1503-X, 1505-1 to 1505-Y, and 1507-1 to 1507-Z and the optical waveguide 1501 is substantially the same. However, in some embodiments, the optical microring resonators 1503-1 to 1503-X, 1505-1 to 1505-Y, and 1507-1 to 1507-Z are positioned relative to the optical waveguide 1501 such that multiple different minimum separation distances exist between different ones of the optical microring resonators 1503-1 to 1503-X, 1505-1 to 1505-Y, and 1507-1 to 1507-Z and the optical waveguide 1501.

In various embodiments, the optical microring resonators 1503-1 to 1503-X are positioned at a substantially constant pitch (center-to-center spacing) with respect to each other. However, in other embodiments, the optical microring resonators 1503-1 to 1503-X are not positioned at a substantially constant pitch with respect to each other. In some embodiments, the pitch between adjacently positioned ones of the optical microring resonators 1503-1 to 1503-X is set at a distance that avoids evanescent coupling of light between the adjacently positioned ones of the optical microring resonators 1503-1 to 1503-X. In some embodiments, the pitch between adjacently positioned ones of the optical microring resonators 1503-1 to 1503-X is minimized while ensuring that evanescent coupling of light does not occur between adjacently positioned ones of the optical microring resonators 1503-1 to 1503-X. In some embodiments, the optical microring resonators 1503-1 to 1503-X do not optically couple to the same location along optical waveguide 1501 in order to avoid optical intercoupling between different ones of the optical microring resonators 1503-1 to 1503-X.

Also, in various embodiments, the optical microring resonators 1505-1 to 1505-Y are positioned at a substantially constant pitch with respect to each other. However, in other embodiments, the optical microring resonators 1505-1 to 1505-Y are not positioned at a substantially constant pitch with respect to each other. In some embodiments, the pitch between adjacently positioned ones of the optical microring resonators 1505-1 to 1505-Y is set at a distance that avoids evanescent coupling of light between the adjacently positioned ones of the optical microring resonators 1505-1 to 1505-Y. In some embodiments, the pitch between adjacently positioned ones of the optical microring resonators 1505-1 to 1505-Y is minimized while ensuring that evanescent coupling of light does not occur between adjacently positioned ones of the optical microring resonators 1505-1 to 1505-Y. In some embodiments, the optical microring resonators 1505-1 to 1505-Y do not optically couple to the same location along optical waveguide 1501 in order to avoid optical intercoupling between different ones of the optical microring resonators 1505-1 to 1505-Y.

Also, in various embodiments, the optical microring resonators 1507-1 to 1507-Z are positioned at a substantially constant pitch with respect to each other. However, in other embodiments, the optical microring resonators 1507-1 to 1507-Z are not positioned at a substantially constant pitch with respect to each other. In some embodiments, the pitch between adjacently positioned ones of the optical microring resonators 1507-1 to 1507-Z is set at a distance that avoids evanescent coupling of light between the adjacently positioned ones of the optical microring resonators 1507-1 to 1507-Z. In some embodiments, the pitch between adjacently positioned ones of the optical microring resonators 1507-1 to 1507-Z is minimized while ensuring that evanescent coupling of light does not occur between adjacently positioned ones of the optical microring resonators 1507-1 to 1507-Z. In some embodiments, the optical microring resonators 1507-1 to 1507-Z do not optically couple to the same location along optical waveguide 1501 in order to avoid optical intercoupling between different ones of the optical microring resonators 1507-1 to 1507-Z.

In some embodiments, each of the optical microring resonators 1503-1 to 1503-X, 1505-1 to 1505-Y, and 1507-1 to 1507-Z has an outer diameter greater than zero and less than or equal to about 50 micrometers. In some embodiments, each of the optical microring resonators 1503-1 to 1503-X, 1505-1 to 1505-Y, and 1507-1 to 1507-Z has an outer diameter greater than zero and less than or equal to about 40 micrometers. In some embodiments, each of the optical microring resonators 1503-1 to 1503-X, 1505-1 to 1505-Y, and 1507-1 to 1507-Z has an outer diameter greater than zero and less than or equal to about 30 micrometers. In some embodiments, each of the optical microring resonators 1503-1 to 1503-X, 1505-1 to 1505-Y, and 1507-1 to 1507-Z has an outer diameter greater than zero and less than or equal to about 20 micrometers. In some embodiments, each of the optical microring resonators 1503-1 to 1503-X, 1505-1 to 1505-Y, and 1507-1 to 1507-Z has an outer diameter greater than zero and less than or equal to about 10 micrometers.

The optical microring resonators 1503-1 to 1503-X are interfaced with electronic control circuitry 1509. In some embodiments, the electronic control circuitry 1509 includes transmit (Tx) slice circuitry for independently controlling one or more of the microring resonators 1503-1 to 1503-X as an optical modulator to optically modulate light at a given wavelength to generate a light stream at the given wavelength within the optical waveguide 1501, where the light stream conveys digital data. In some embodiments, the electronic control circuitry 1509 includes receive (Rx) slice circuitry for independently controlling one or more of the microring resonators 1503-1 to 1503-X as an optical receiver, e.g., photodetector, to detect a modulated light stream at a given wavelength within the optical waveguide 1501 to enable generation of electrical signals representing digital data conveyed by the modulated light stream at the given wavelength. In some embodiments, the electronic control circuitry 1509 includes circuitry for directing one or more of the microring resonators 1503-1 to 1503-X to operate as an add/drop filter for multiplexing/demultiplexing of optical signals within the optical waveguide 1501. In some embodiments, the electronic control circuitry 1509 includes circuitry for controlling heating devices respectively associated with one or more of the microring resonators 1503-1 to 1503-X to enable thermal tuning of the one or more of the microring resonators 1503-1 to 1503-X.

The optical microring resonators 1505-1 to 1505-Y are interfaced with electronic control circuitry 1511. In some embodiments, the electronic control circuitry 1511 includes transmit (Tx) slice circuitry for independently controlling one or more of the microring resonators 1505-1 to 1505-Y as an optical modulator to optically modulate light at a given wavelength to generate a light stream at the given wavelength within the optical waveguide 1501, where the light stream conveys digital data. In some embodiments, the electronic control circuitry 1511 includes receive (Rx) slice circuitry for independently controlling one or more of the microring resonators 1505-1 to 1505-Y as an optical receiver, e.g., photodetector, to detect a modulated light stream at a given wavelength within the optical waveguide 1501 to enable generation of electrical signals representing digital data conveyed by the modulated light stream at the given wavelength. In some embodiments, the electronic control circuitry 1511 includes circuitry for directing one or more of the microring resonators 1505-1 to 1505-Y to operate as an add/drop filter for multiplexing/demultiplexing of optical signals within the optical waveguide 1501. In some embodiments, the electronic control circuitry 1511 includes circuitry for controlling heating devices respectively associated with one or more of the microring resonators 1505-1 to 1505-Y to enable thermal tuning of the one or more of the microring resonators 1505-1 to 1505-Y.

The optical microring resonators 1507-1 to 1507-Z are interfaced with electronic control circuitry 1513. In some embodiments, the electronic control circuitry 1513 includes transmit (Tx) slice circuitry for independently controlling one or more of the microring resonators 1507-1 to 1507-Z as an optical modulator to optically modulate light at a given wavelength to generate a light stream at the given wavelength within the optical waveguide 1501, where the light stream conveys digital data. In some embodiments, the electronic control circuitry 1513 includes receive (Rx) slice circuitry for independently controlling one or more of the microring resonators 1507-1 to 1507-Z as an optical receiver, e.g., photodetector, to detect a modulated light stream at a given wavelength within the optical waveguide 1501 to enable generation of electrical signals representing digital data conveyed by the modulated light stream at the given wavelength. In some embodiments, the electronic control circuitry 1513 includes circuitry for directing one or more of the microring resonators 1507-1 to 1507-Z to operate as an add/drop filter for multiplexing/demultiplexing of optical signals within the optical waveguide 1501. In some embodiments, the electronic control circuitry 1513 includes circuitry for controlling heating devices respectively associated with one or more of the microring resonators 1507-1 to 1507-Z to enable thermal tuning of the one or more of the microring resonators 1507-1 to 1507-Z. Also, in some embodiments, the optical macro 305-*x*7 includes additional electronics to support operation of the optical macro 305-*x*7, such as clock signal generation and transmission circuitry, I/Q signal generation circuitry, ILO circuitry, PI circuitry, TIA circuitry, signal EQ circuitry, and/or other types of circuitry for supporting operation of the optical macro 305-*x*7.

In some embodiments, the optical path layout of the optical macro 305-*x*7 is optimized by minimizing a length of the optical waveguide 1501 within the optical macro 305-*x*7. The length of the optical waveguide 1501 within the optical macro 305-*x*7 is minimized by reducing/constraining the pitch of the optical microring resonators 1503-1 to 1503-X, 1505-1 to 1505-Y, and 1507-1 to 1507-Z. In some embodiments of the optical path layout of the optical macro 305-*x*7 one or more additional optical microring resonators are positioned along the first curved segment 1501B and/or the second curved segment 1501D, so that the one or more additional optical microring resonators optically couple with the optical waveguide 1501. It should be understood that in various embodiments the optical path layout of the optical macro 305-*x*7 can be modified so that vertical segment 1501C of the Z-shaped optical waveguide 1501 is replaced by a linear-shaped segment 1501C' that extends at a non-right angle (either than about 90 degrees or greater than about 90 degrees) with respect to each of the first horizontal segment 1501A and the second horizontal segment 1501E of the Z-shaped optical waveguide 1501. Moreover, in some embodiments, the first horizontal segment 1501A, the vertical segment 1501C, and/or the second horizontal segment 1501E of the Z-shaped optical waveguide 1501 have different lengths, such that different numbers X, Y, and Z of the optical microring resonators 1503-1 to 1503-X, 1505-1 to 1505-Y, and 1507-1 to 1507-Z are positioned along different ones of the first horizontal segment 1501A, the vertical segment 1501C, and the second horizontal segment 1501E, respectively, of the optical waveguide 1501.

Figure 16:
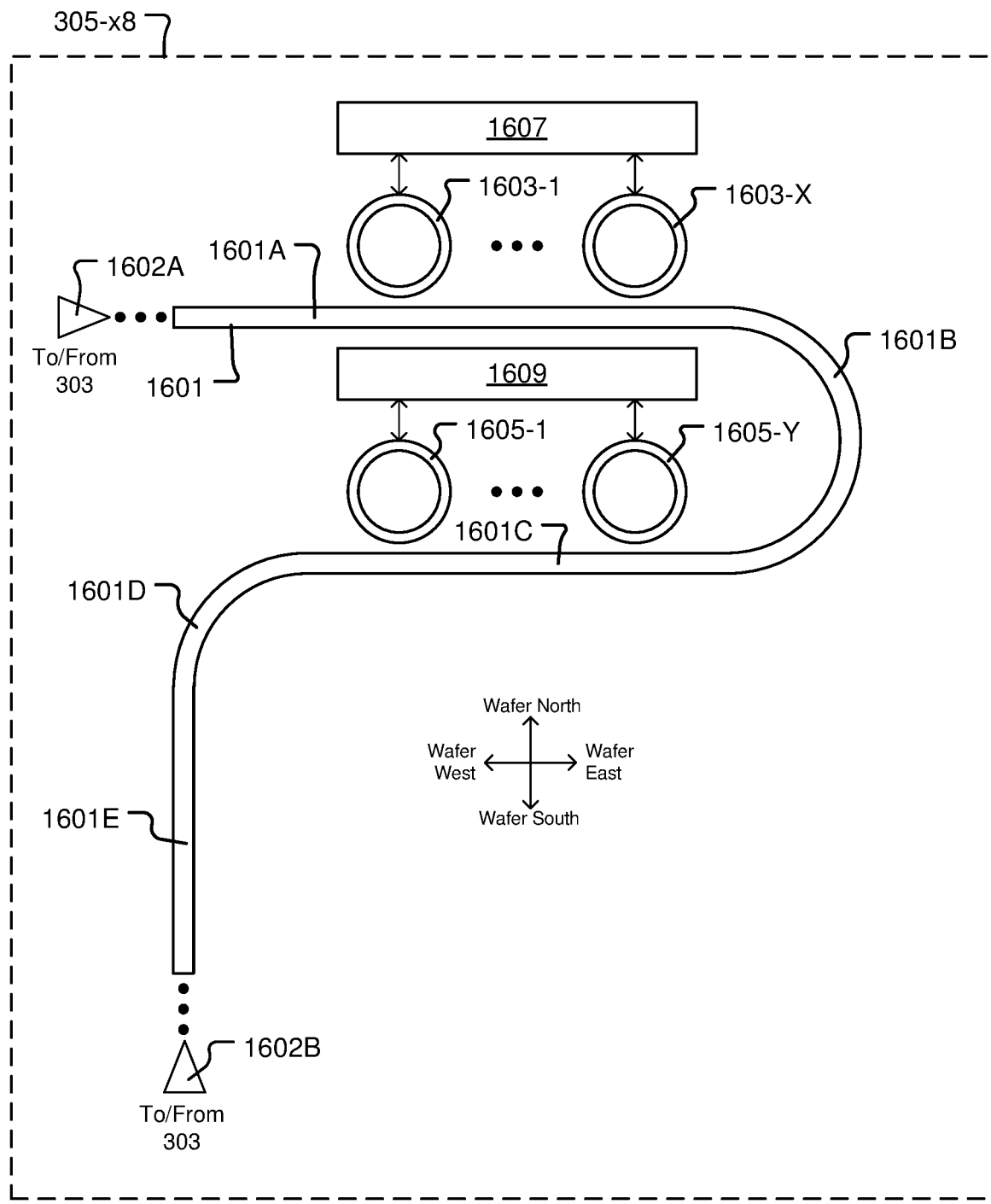
FIG. 16 shows an example optical path layout of an optical macro for data input/output to/from the TeraPHY optical I/O chiplet, where the optical path layout includes a hook-shaped optical waveguide, in accordance with some embodiments.

FIG. 16 shows an example optical path layout of an optical macro 305-*x*8 for data input/output to/from the TeraPHY optical I/O chiplet 107, where the optical path layout includes a hook-shaped optical waveguide 1601, in accordance with some embodiments. The optical waveguide 1601 includes a first horizontal (East-West oriented) segment 1601A, a first curved segment 1601B, a second horizontal (East-West oriented) segment 1601C, a second curved segment 1601D, and a vertical segment (North-South oriented) segment 1601E. In some embodiments, the first curved segment 1601B curves around about 180 degrees from the first horizontal segment 1601A to the second horizontal segment 1601C, vice-versa. In some embodiments, the second curved segment 1601D curves around about 90 degrees from the second horizontal segment 1601C to the vertical segment 1601E, vice-versa. The first horizontal segment 1601A is optically connected to a first optical port 1602A. The vertical segment 1601E is optically connected to a second optical port 1602B. The first optical port 1602A and the second optical port 1602B are located on adjacent sides of the optical macro 305-*x*8. The first optical port 1602A is located on the left side (West side) of the optical macro 305-*x*8, and the optical port 1602B is located on the lower side (South side) of the optical macro 305-*x*8. In various embodiments, the first optical port 1602A is formed as a vertical optical grating coupler or a horizontal (edge) optical grating coupler. Also, in various embodiments, the second optical port 1602B is formed as a vertical optical grating coupler or a horizontal (edge) optical grating coupler.

In some embodiments, the first horizontal segment 1601A, the first curved segment 1601B, the second horizontal segment 1601C, the second curved segment 1601D, and the vertical segment 1601E of the optical waveguide 1601 are formed of a same material, such as silicon, polysilicon, silicon nitride, or any other material suitable for use as an optical waveguide. In some embodiments, any one or more of the first horizontal segment 1601A, the first curved segment 1601B, the second horizontal segment 1601C, the second curved segment 1601D, and the vertical segment 1601E of the optical waveguide 1601 is/are formed of a different material than one or more others of the first horizontal segment 1601A, the first curved segment 1601B, the second horizontal segment 1601C, the second curved segment 1601D, and the vertical segment 1601E of the optical waveguide 1601, such that the optical waveguide 1601 is formed as a combination of materials, e.g., a combination of two or more of silicon, polysilicon, silicon nitride, and/or any other material suitable for use as an optical waveguide. Also, in some embodiments, each of the first horizontal segment 1601A, the first curved segment 1601B, the second horizontal segment 1601C, the second curved segment 1601D, and the vertical segment 1601E of the optical waveguide 1601 is formed to have a substantially similar vertical cross-section shape. However, in some embodiments, any one or more of the first horizontal segment 1601A, the first curved segment 1601B, the second horizontal segment 1601C, the second curved segment 1601D, and the vertical segment 1601E of the optical waveguide 1601 is/are formed to have a different vertical cross-section shape than one or more others of the first horizontal segment 1601A, the first curved segment 1601B, the second horizontal segment 1601C, the second curved segment 1601D, and the vertical segment 1601E of the optical waveguide 1601. Also, in some embodiments, any one or more of the first horizontal segment 1601A, the first curved segment 1601B, the second horizontal segment 1601C, the second curved segment 1601D, and the vertical segment 1601E of the optical waveguide 1601 is/are formed to have a vertical cross-section shape that varies along its length in the direction of light propagation through the optical waveguide 1601.

The optical macro 305-*x*8 includes optical microring resonators 1603-1 to 1603-X (where X is an integer greater than zero) that are optically coupled to the first horizontal segment 1601A of the hook-shaped optical waveguide 1601, such that light traveling through the optical waveguide 1601 can be evanescently coupled into the optical microring resonators 1603-1 to 1603-X, and such that light traveling through the optical microring resonators 1603-1 to 1603-X can be evanescently coupled into the optical waveguide 1601. The optical macro 305-*x*8 also includes optical microring resonators 1605-1 to 1605-Y (where Y is an integer greater than zero) that are optically coupled to the second horizontal segment 1601C of the hook-shaped optical waveguide 1601, such that light traveling through the optical waveguide 1601 can be evanescently coupled into the optical microring resonators 1605-1 to 1605-Y, and such that light traveling through the optical microring resonators 1605-1 to 1605-Y can be evanescently coupled into the optical waveguide 1601.

The optical macro 305-*x*8 shows a particular example of an optical layout in which each of the optical microring resonators 1603-1 to 1603-X and 1605-1 to 1605-Y is optically coupled to one of the two horizontal segments 1601A and 1601C of the hook-shaped optical waveguide 1601. In some embodiments, the optical microring resonators 1603-1 to 1603-X and 1605-1 to 1605-Y are positioned relative to the optical waveguide 1601 such that a respective minimum separation distance between each of the optical microring resonators 1603-1 to 1603-X and 1605-1 to 1605-Y and the optical waveguide 1601 is substantially the same. However, in some embodiments, the optical microring resonators 1603-1 to 1603-X and 1605-1 to 1605-Y are positioned relative to the optical waveguide 1601 such that multiple different minimum separation distances exist between different ones of the optical microring resonators 1603-1 to 1603-X and 1605-1 to 1605-Y and the optical waveguide 1601.

In various embodiments, the optical microring resonators 1603-1 to 1603-X are positioned at a substantially constant pitch (center-to-center spacing) with respect to each other. However, in other embodiments, the optical microring resonators 1603-1 to 1603-X are not positioned at a substantially constant pitch with respect to each other. In some embodiments, the pitch between adjacently positioned ones of the optical microring resonators 1603-1 to 1603-X is set at a distance that avoids evanescent coupling of light between the adjacently positioned ones of the optical microring resonators 1603-1 to 1603-X. In some embodiments, the pitch between adjacently positioned ones of the optical microring resonators 1603-1 to 1603-X is minimized while ensuring that evanescent coupling of light does not occur between adjacently positioned ones of the optical microring resonators 1603-1 to 1603-X. In some embodiments, the optical microring resonators 1603-1 to 1603-X do not optically couple to the same location along optical waveguide 1601 in order to avoid optical intercoupling between different ones of the optical microring resonators 1603-1 to 1603-X.

Also, in various embodiments, the optical microring resonators 1605-1 to 1605-Y are positioned at a substantially constant pitch with respect to each other. However, in other embodiments, the optical microring resonators 1605-1 to 1605-Y are not positioned at a substantially constant pitch with respect to each other. In some embodiments, the pitch between adjacently positioned ones of the optical microring resonators 1605-1 to 1605-Y is set at a distance that avoids evanescent coupling of light between the adjacently positioned ones of the optical microring resonators 1605-1 to 1605-Y. In some embodiments, the pitch between adjacently positioned ones of the optical microring resonators 1605-1 to 1605-Y is minimized while ensuring that evanescent coupling of light does not occur between adjacently positioned ones of the optical microring resonators 1605-1 to 1605-Y. In some embodiments, the optical microring resonators 1605-1 to 1605-Y do not optically couple to the same location along optical waveguide 1601 in order to avoid optical intercoupling between different ones of the optical microring resonators 1605-1 to 1605-Y.

In some embodiments, each of the optical microring resonators 1603-1 to 1603-X and 1605-1 to 1605-Y has an outer diameter greater than zero and less than or equal to about 50 micrometers. In some embodiments, each of the optical microring resonators 1603-1 to 1603-X and 1605-1 to 1605-Y has an outer diameter greater than zero and less than or equal to about 40 micrometers. In some embodiments, each of the optical microring resonators 1603-1 to 1603-X and 1605-1 to 1605-Y has an outer diameter greater than zero and less than or equal to about 30 micrometers. In some embodiments, each of the optical microring resonators 1603-1 to 1603-X and 1605-1 to 1605-Y has an outer diameter greater than zero and less than or equal to about 20 micrometers. In some embodiments, each of the optical microring resonators 1603-1 to 1603-X and 1605-1 to 1605-Y has an outer diameter greater than zero and less than or equal to about 10 micrometers.

The optical microring resonators 1603-1 to 1603-X are interfaced with electronic control circuitry 1607. In some embodiments, the electronic control circuitry 1607 includes transmit (Tx) slice circuitry for independently controlling one or more of the microring resonators 1603-1 to 1603-X as an optical modulator to optically modulate light at a given wavelength to generate a light stream at the given wavelength within the optical waveguide 1601, where the light stream conveys digital data. In some embodiments, the electronic control circuitry 1607 includes receive (Rx) slice circuitry for independently controlling one or more of the microring resonators 1603-1 to 1603-X as an optical receiver, e.g., photodetector, to detect a modulated light stream at a given wavelength within the optical waveguide 1601 to enable generation of electrical signals representing digital data conveyed by the modulated light stream at the given wavelength. In some embodiments, the electronic control circuitry 1607 includes circuitry for directing one or more of the microring resonators 1603-1 to 1603-X to operate as an add/drop filter for multiplexing/demultiplexing of optical signals within the optical waveguide 1601. In some embodiments, the electronic control circuitry 1607 includes circuitry for controlling heating devices respectively associated with one or more of the microring resonators 1603-1 to 1603-X to enable thermal tuning of the one or more of the microring resonators 1603-1 to 1603-X.

The optical microring resonators 1605-1 to 1605-Y are interfaced with electronic control circuitry 1609. In some embodiments, the electronic control circuitry 1609 includes transmit (Tx) slice circuitry for independently controlling one or more of the microring resonators 1605-1 to 1605-Y as an optical modulator to optically modulate light at a given wavelength to generate a light stream at the given wavelength within the optical waveguide 1601, where the light stream conveys digital data. In some embodiments, the electronic control circuitry 1609 includes receive (Rx) slice circuitry for independently controlling one or more of the microring resonators 1605-1 to 1605-Y as an optical receiver, e.g., photodetector, to detect a modulated light stream at a given wavelength within the optical waveguide 1601 to enable generation of electrical signals representing digital data conveyed by the modulated light stream at the given wavelength. In some embodiments, the electronic control circuitry 1609 includes circuitry for directing one or more of the microring resonators 1605-1 to 1605-Y to operate as an add/drop filter for multiplexing/demultiplexing of optical signals within the optical waveguide 1601. In some embodiments, the electronic control circuitry 1609 includes circuitry for controlling heating devices respectively associated with one or more of the microring resonators 1605-1 to 1605-Y to enable thermal tuning of the one or more of the microring resonators 1605-1 to 1605-Y. Also, in some embodiments, the optical macro 305-$x$8 includes additional electronics to support operation of the optical macro 305-$x$8, such as clock signal generation and transmission circuitry, I/Q signal generation circuitry, ILO circuitry, PI circuitry, TIA circuitry, signal EQ circuitry, and/or other types of circuitry for supporting operation of the optical macro 305-$x$8.

In some embodiments, the optical path layout of the optical macro 305-$x$8 is optimized by minimizing a length of the optical waveguide 1601 within the optical macro 305-$x$8. The length of the optical waveguide 1601 within the optical macro 305-$x$8 is minimized by having the optical microring resonators 1603-1 to 1603-X and 1605-1 to 1605-Y respectively positioned along each of the first horizontal segment 1601A and the second horizontal segment 1601C of the optical waveguide 1601, and reducing/constraining the pitch of the optical microring resonators 1603-1 to 1603-X and 1605-1 to 1605-Y. In some embodiments of the optical path layout of the optical macro 305-x8 one or more additional optical microring resonators are positioned along the first curved segment 1601B and/or the second curved segment 1601D, so that the one or more additional optical microring resonators optically couple with the optical waveguide 1601. It should be understood that in various embodiments the optical path layout of the optical macro 305-x8 can be modified so that the hook-shaped optical waveguide 1601 becomes a serpentine-shaped optical waveguide that includes essentially any number of horizontal linear-shaped segments and any number of curved segments, with essentially any number of optical microring resonators positioned along the serpentine-shaped optical waveguide so as to optically couple with the serpentine-shaped optical waveguide. Moreover, in some embodiments, the different horizontal linear-shaped segments and/or curved segments of the serpentine-shaped optical waveguide can have different lengths, such that different numbers of optical microring resonators are positioned along different ones of the horizontal linear-shaped segment of the serpentine-shaped optical waveguide.

Various embodiments are disclosed herein for an electro-optical chip, such as the TeraPHY optical I/O chiplet 107, that includes an optical input port located on a first side of the electro-optical chip and an optical output port also located on the first side of the electro-optical chip. The electro-optical chip also includes an optical waveguide having a first end optically connected to the optical input port. The optical waveguide also has a second end optically connected to the optical output port. In some embodiments, the optical waveguide extends through an optical macro, such as the optical macro 305-x. The optical waveguide includes a first segment extending in a first direction. The optical waveguide also includes a second segment that extends from the first segment and that turns from the first direction to a second direction that is substantially opposite of the first direction. The optical waveguide also includes a third segment that extends from the second segment in the second direction. The first, second, and third segments of the optical waveguide collectively form a substantially U-shaped portion of the optical waveguide, such as the optical waveguide 901 of FIG. 9. The electro-optical chip also includes a plurality of optical microring resonators positioned along the first segment of the optical waveguide. Each microring resonator of the plurality of optical microring resonators is optically coupled to a different location along the first segment of the optical waveguide. In some embodiments, the plurality of optical microring resonators are positioned in accordance with a substantially constant center-to-center spacing (pitch) as measured in the first direction. In some embodiments, the plurality of optical microring resonators are positioned such that at least two different center-to-center spacings as measured in the first direction exist between adjacent ones of the plurality of optical microring resonators.

The electro-optical chip also includes electronic circuitry for controlling a resonant wavelength of each microring resonator of the plurality of optical microring resonators. In some embodiments, the electro-optical chip includes electronic circuitry for controlling at least some of the plurality of optical microring resonators to modulate light at a specified wavelength traveling through the optical waveguide between the optical input and the optical output. In some embodiments, the electro-optical chip includes electronic circuitry for controlling at least some of the plurality of optical microring resonators to operate as part of a respective photodetector device to detect light of a specified wavelength traveling through the optical waveguide. In some embodiments, the plurality of optical microring resonators is a first plurality of optical microring resonators, with the electro-optical chip also including a second plurality of optical microring resonators positioned along the third segment of the optical waveguide. Each microring resonator of the second plurality of optical microring resonators is optically coupled to a different location along the third segment of the optical waveguide. In some embodiments, the second plurality of optical microring resonators are positioned in accordance with a substantially constant center-to-center spacing (pitch) as measured in the second direction. In some embodiments, the second plurality of optical microring resonators are positioned such that at least two different center-to-center spacings as measured in the second direction exist between adjacent ones of the second plurality of optical microring resonators. The electro-optical chip also includes electronic circuitry for controlling a resonant wavelength of each microring resonator of the second plurality of optical microring resonators. In some embodiments, the electro-optical chip includes electronic circuitry for controlling at least some of the second plurality of optical microring resonators to modulate light at a specified wavelength traveling through the optical waveguide between the optical input and the optical output. In some embodiments, the electro-optical chip includes electronic circuitry for controlling at least some of the second plurality of optical microring resonators to operate as part of a respective photodetector device to detect light of a specified wavelength traveling through the optical waveguide.

In some embodiments, the U-shaped portion of the optical waveguide delineates a first region and a second region of the electro-optical chip, where the first region is partially circumscribed by the U-shaped portion of the optical waveguide, and where the second region is located on an opposite side of the U-shaped portion of the optical waveguide from the first region. In some embodiments, each of the above-mentioned first and second pluralities of optical microring resonators is positioned within the second region. In some embodiments, the electronic circuitry for controlling the resonant wavelength of each microring resonator of the first plurality of optical microring resonators is formed within the second region alongside the first plurality of optical microring resonators. Also, in some embodiments, the electronic circuitry for controlling the resonant wavelength of each microring resonator of the second plurality of optical microring resonators is formed within the second region alongside the second plurality of optical microring resonators.

In some embodiments, the electro-optical chip includes a third plurality of optical microring resonators positioned along the second segment of the optical waveguide. Each microring resonator of the third plurality of optical microring resonators is optically coupled to a different location along the second segment of the optical waveguide. In some embodiments, the third plurality of optical microring resonators are positioned in accordance with a substantially constant center-to-center spacing (pitch) as measured in a third direction extending substantially perpendicular to both the first and second directions. In some embodiments, the third plurality of optical microring resonators are positioned such that at least two different center-to-center spacings as measured in the third direction exist between adjacent ones of the third plurality of optical microring resonators. In some embodiments, the electro-optical chip includes electronic circuitry for controlling a resonant wavelength of each microring resonator of the third plurality of optical microring resonators. In some embodiments, the electro-optical chip includes electronic circuitry for controlling at least some of the third plurality of optical microring resonators to modulate light at a specified wavelength traveling through the optical waveguide between the optical input and the optical output. In some embodiments, the electro-optical chip includes electronic circuitry for controlling at least some of the third plurality of optical microring resonators to operate as part of a respective photodetector device to detect light of a specified wavelength traveling through the optical waveguide.

In some embodiments, the substantially U-shaped portion of the optical waveguide delineates a first region and a second region of the electro-optical chip, where the first region is partially circumscribed by the U-shaped portion of the optical waveguide, and where the second region is located on an opposite side of the U-shaped portion of the optical waveguide from the first region, and where each of the first, second, and third pluralities of optical microring resonators is positioned within the second region. In some embodiments, the electronic circuitry for controlling the resonant wavelength of each microring resonator of the first plurality of optical microring resonators is formed within the second region alongside the first plurality of optical microring resonators. Also, in these embodiments, the electronic circuitry for controlling the resonant wavelength of each microring resonator of the second plurality of optical microring resonators is formed within the second region alongside the second plurality of optical microring resonators. Also, in these embodiments, the electronic circuitry for controlling the resonant wavelength of each microring resonator of the third plurality of optical microring resonators is formed within the second region alongside the third plurality of optical microring resonators.

Various embodiments are disclosed herein for an electro-optical chip, such as the TeraPHY optical I/O chiplet 107, that includes an optical input port located on a first side of the electro-optical chip and an optical output port also located on the first side of the electro-optical chip. The electro-optical chip also includes an optical waveguide having a first end optically connected to the optical input port. The optical waveguide also has a second end optically connected to the optical output port. In some embodiments, the optical waveguide extends through an optical macro, such as the optical macro 305-$x$. The optical waveguide includes: 1) a first segment extending in a first direction, 2) a second segment that extends from the first segment and that turns from the first direction to a second direction that is substantially perpendicular to the first direction, 3) a third segment that extends from the second segment in the second direction, 4) a fourth segment that extends from the third segment and that turns from the second direction to a third direction that is substantially opposite of the first direction, and 5) a fifth segment that extends from the fourth segment in the third direction, where the first, second, third, fourth, and fifth segments collectively form a substantially C-shaped portion of the optical waveguide, such as the optical waveguides 1001, 1101, and 1201 of FIGS. 10, 11, and 12, respectively. The electro-optical chip also includes a plurality of optical microring resonators positioned along the third segment of the optical waveguide. Each microring resonator of the plurality of optical microring resonators is optically coupled to a different location along the third segment of the optical waveguide. In some embodiments, the plurality of optical microring resonators are positioned in accordance with a substantially constant center-to-center spacing (pitch) as measured in the second direction. In some embodiments, the plurality of optical microring resonators are positioned such that at least two different center-to-center spacings as measured in the second direction exist between adjacent ones of the plurality of optical microring resonators.

The electro-optical chip also includes electronic circuitry for controlling a resonant wavelength of each microring resonator of the plurality of optical microring resonators positioned along the third segment of the optical waveguide. In some embodiments, the electro-optical chip includes electronic circuitry for controlling at least some of the plurality of optical microring resonators to modulate light at a specified wavelength traveling through the optical waveguide between the optical input and the optical output. In some embodiments, the electro-optical chip includes electronic circuitry for controlling at least some of the plurality of optical microring resonators to operate as a respective photodetector device to detect light of a specified wavelength traveling through the optical waveguide. In some embodiments, the substantially C-shaped portion of the optical waveguide delineates a first region and a second region of the electro-optical chip, where the first region is partially circumscribed by the C-shaped portion of the optical waveguide, and where the second region is located on an opposite side of the C-shaped portion of the optical waveguide from the first region. In some embodiments, the plurality of optical microring resonators positioned along the third segment of the optical waveguide is a first plurality of optical microring resonators positioned within the second region. In some embodiments, the electro-optical chip includes a second plurality of optical microring resonators positioned along the third segment of the optical waveguide within the first region. In some embodiments, each microring resonator of the first and second pluralities of optical microring resonators is optically coupled to a different location along the third segment of the optical waveguide. In some embodiments, the second plurality of optical microring resonators are positioned in accordance with a substantially constant center-to-center spacing (pitch) as measured in the second direction. In some embodiments, the second plurality of optical microring resonators are positioned such that at least two different center-to-center spacings as measured in the second direction exist between adjacent ones of the second plurality of optical microring resonators.

In some embodiments, the electro-optical chip includes electronic circuitry for controlling a resonant wavelength of each microring resonator of the second plurality of optical microring resonators. In some embodiments, the electro-optical chip includes electronic circuitry for controlling at least some of the second plurality of optical microring resonators to modulate light at a specified wavelength traveling through the optical waveguide between the optical input and the optical output. In some embodiments, the electro-optical chip includes electronic circuitry for controlling at least some of the second plurality of optical microring resonators to operate as a respective photodetector device to detect light of a specified wavelength traveling through the optical waveguide. In some embodiments, the electronic circuitry for controlling the resonant wavelength of each microring resonator of the first plurality of optical microring resonators is formed within the second region alongside the first plurality of optical microring resonators, and the electronic circuitry for controlling the resonant wavelength of each microring resonator of the second plurality of optical microring resonators is formed within the first region alongside the second plurality of optical microring resonators.

Various embodiments are disclosed herein for an electro-optical chip, such as the TeraPHY optical I/O chiplet 107, that includes an optical input port located on a first side of the electro-optical chip and an optical output port also located on a second side of the electro-optical chip. The electro-optical chip also includes an optical waveguide having a first end optically connected to the optical input port. The optical waveguide also has a second end optically connected to the optical output port. In some embodiments, the optical waveguide extends through an optical macro, such as the optical macro 305-x. In various embodiments, the optical waveguide is configured as either of the optical waveguides 1301, 1401, 1501, and 1601 of FIGS. 13, 14, 15, and 16, respectively. The electro-optical chip also includes a plurality of optical microring resonators positioned along the optical waveguide. Each microring resonator of the plurality of optical microring resonators is optically coupled to a different location along the optical waveguide. The electro-optical chip also includes electronic circuitry formed alongside the plurality of optical microring resonators for controlling a resonant wavelength of each microring resonator of the plurality of optical microring resonators. In some embodiments, the first and second sides of the electro-optical chip corresponding to the optical input port and the optical output port, respectively, are opposite sides of the electro-optical chip. In some embodiments, the first and second sides of the electro-optical chip corresponding to the optical input port and the optical output port, respectively, are adjacent sides of the electro-optical chip.

In some embodiments, the optical waveguide includes: 1) a first segment extending in a first direction, 2) a second segment that extends from the first segment and that turns from the first direction to a second direction different from the first direction, 3) a third segment that extends from the second segment in the second direction, 4) a fourth segment that extends from the third segment and that turns from the second direction back to the first direction, and 5) a fifth segment that extends from the fourth segment in the first direction. In some embodiments, the second direction is about 180 degrees offset from the first direction. In some embodiments, the second direction is about 90 degrees offset from the first direction. In some embodiments, the plurality of optical microring resonators is a first plurality of optical microring resonators positioned along the first segment of the optical waveguide. In some embodiments, the electro-optical chip includes a second plurality of optical microring resonators positioned along the third segment of the optical waveguide and between the first and third segments of the optical waveguide, where each microring resonator of the second plurality of optical microring resonators is optically coupled to a different location along the third segment of the optical waveguide. In some embodiments, the electro-optical chip also includes electronic circuitry formed alongside the second plurality of optical microring resonators for controlling a resonant wavelength of each microring resonator of the second plurality of optical microring resonators. In some embodiments, the electro-optical chip includes a third plurality of optical microring resonators positioned along the fifth segment of the optical waveguide and between the third and fifth segments of the optical waveguide, where each microring resonator of the third plurality of optical microring resonators is optically coupled to a different location along the fifth segment of the optical waveguide. In some embodiments, the electro-optical chip includes electronic circuitry formed alongside the third plurality of optical microring resonators for controlling a resonant wavelength of each microring resonator of the third plurality of optical microring resonators.

In some embodiments, the optical waveguide includes: 1) a first segment extending in a first direction, 2) a second segment that extends from the first segment and that turns from the first direction to a second direction different from the first direction, 3) a third segment that extends from the second segment in the second direction, 4) a fourth segment that extends from the third segment and that turns from the second direction to a third direction different from both the first and second directions, and 5) a fifth segment that extends from the fourth segment in the third direction. In some embodiments, the second direction is about 180 degrees offset from the first direction, and the third direction is about 90 degrees offset from the second direction. In some embodiments, the plurality of optical microring resonators is a first plurality of optical microring resonators positioned along the first segment of the optical waveguide. In some embodiments, the electro-optical chip includes a second plurality of optical microring resonators positioned along the third segment of the optical waveguide and between the first and third segments of the optical waveguide, where each microring resonator of the second plurality of optical microring resonators is optically coupled to a different location along the third segment of the optical waveguide. In some embodiments, the electro-optical chip includes electronic circuitry formed alongside the second plurality of optical microring resonators for controlling a resonant wavelength of each microring resonator of the second plurality of optical microring resonators.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Although the foregoing disclosure includes some detail for purposes of clarity of understanding, it will be apparent that certain changes and modifications can be practiced within the scope of the appended claims. For example, it should be understood that one or more features from any embodiment disclosed herein may be combined with one or more features of any other embodiment disclosed herein. Accordingly, the present embodiments are to be considered as illustrative and not restrictive, and what is claimed is not to be limited to the details given herein, but may be modified within the scope and equivalents of the described embodiments.

What is claimed is:

1. An electro-optical chip, comprising:
    an optical waveguide having a first end and a second end, the optical waveguide including a first segment extending from the first end in a first direction, a second segment that extends from the first segment and that turns from the first direction to a second direction that is substantially opposite of the first direction, a third segment that extends from the second segment in the second direction, a fourth segment that extends from the third segment and that turns from the second direction to a third direction that is substantially perpendicular to the second direction, and a fifth segment that extends in the third direction from the fourth segment to the second end; and a plurality of optical microring resonators positioned along at least one of the first segment and the third segment.

2. The electro-optical chip as recited in claim 1, wherein each microring resonator of the plurality of optical microring resonators is optically coupled to a different location along the optical waveguide.

3. The electro-optical chip as recited in claim 1, wherein the fifth segment extends in the third direction away from the first segment.

4. The electro-optical chip as recited in claim 1, wherein the first optical port is disposed at a first side of the electro-optical chip and the second optical port is disposed at a second side of the electro-optical chip.

5. The electro-optical chip as recited in claim 4, wherein the second side of the electro-optical chip is next to the first side of the electro-optical chip along a periphery of the electro-optical chip.

6. The electro-optical chip as recited in claim 1, wherein the second segment extends along a substantially uniform radius of curvature.

7. The electro-optical chip as recited in claim 1, wherein the first segment, the second segment, and the third segment collectively form a substantially U-shaped portion of the optical waveguide, wherein the substantially U-shaped portion of the optical waveguide delineates a first region and a second region of the electro-optical chip, wherein the first region is partially circumscribed by the substantially U-shaped portion of the optical waveguide, and wherein the second region is located on an opposite side of the substantially U-shaped portion of the optical waveguide from the first region.

8. The electro-optical chip as recited in claim 7, wherein the plurality of optical microring resonators is disposed within the first region.

9. The electro-optical chip as recited in claim 8, further comprising:

electronic circuitry disposed within the first region for controlling a resonant wavelength of each microring resonator of the plurality of optical microring resonators.

10. The electro-optical chip as recited in claim 8, further comprising:

electronic circuitry disposed within the first region for controlling at least some of the plurality of optical microring resonators to modulate light at a specified wavelength traveling through the optical waveguide.

11. The electro-optical chip as recited in claim 8, further comprising:

electronic circuitry disposed within the first region for controlling at least some of the plurality of optical microring resonators to operate as part of a respective photodetector device to detect light of a specified wavelength traveling through the optical waveguide.

12. The electro-optical chip as recited in claim 7, wherein the plurality of optical microring resonators is disposed within the second region.

13. The electro-optical chip as recited in claim 12, further comprising:

electronic circuitry disposed within the second region for controlling a resonant wavelength of each microring resonator of the plurality of optical microring resonators.

14. The electro-optical chip as recited in claim 12, further comprising:

electronic circuitry disposed within the second region for controlling at least some of the plurality of optical microring resonators to modulate light at a specified wavelength traveling through the optical waveguide.

15. The electro-optical chip as recited in claim 12, further comprising:

electronic circuitry disposed within the second region for controlling at least some of the plurality of optical microring resonators to operate as part of a respective photodetector device to detect light of a specified wavelength traveling through the optical waveguide.

16. The electro-optical chip as recited in claim 1, wherein the plurality of optical microring resonators is a first plurality of optical microring resonators positioned along the first segment of the optical waveguide, wherein the electro-optical chip further comprises a second plurality of optical microring resonators positioned along the third segment of the optical waveguide.

17. The electro-optical chip as recited in claim 16, wherein the first segment, the second segment, and the third segment collectively form a substantially U-shaped portion of the optical waveguide, wherein the substantially U-shaped portion of the optical waveguide delineates a first region and a second region of the electro-optical chip, wherein the first region is partially circumscribed by the substantially U-shaped portion of the optical waveguide, and wherein the second region is located on an opposite side of the substantially U-shaped portion of the optical waveguide from the first region, wherein the first plurality of optical microring resonators is disposed within the first region, and wherein the second plurality of optical microring resonators is disposed within the second region.

18. The electro-optical chip as recited in claim 17, further comprising:

a first electronic control circuit disposed within the first region for controlling a resonant wavelength of each microring resonator of the first plurality of optical microring resonators; and a second electronic control circuit disposed within the second region for controlling a resonant wavelength of each microring resonator of the second plurality of optical microring resonators.

19. The electro-optical chip as recited in claim 1, further comprising:

a first optical port optically connected to the first end of the optical waveguide; and a second optical port optically connected to the second end of the optical waveguide.

20. The electro-optical chip as recited in claim 19, wherein the first optical port and the second optical port are located on a same half the electro-optical chip.

* * * * *